US009442624B2

(12) United States Patent
Yang et al.

(10) Patent No.: US 9,442,624 B2
(45) Date of Patent: Sep. 13, 2016

(54) MOBILE TERMINAL FOR UNLOCKING A TOUCHSCREEN AND CONTROLLING METHOD THEREOF

(71) Applicant: LG ELECTRONICS INC., Seoul (KR)

(72) Inventors: Yoonseok Yang, Seoul (KR); Jinyong Choi, Seoul (KR); Jungho Baek, Seoul (KR); Yoonhee Kim, Seoul (KR); Hyemi Jung, Seoul (KR); Yunjueng Mhun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 14/526,019

(22) Filed: Oct. 28, 2014

(65) Prior Publication Data

US 2015/0116218 A1    Apr. 30, 2015

(30) Foreign Application Priority Data

Oct. 28, 2013  (KR) .................. 10-2013-0128732
Dec. 13, 2013  (KR) .................. 10-2013-0155245

(51) Int. Cl.
*G06F 3/0481* (2013.01)
*G06F 21/31* (2013.01)
*G06F 3/041* (2006.01)
*G06F 3/0486* (2013.01)
*G06F 3/0488* (2013.01)

(52) U.S. Cl.
CPC .......... *G06F 3/04812* (2013.01); *G06F 3/0416* (2013.01); *G06F 3/0486* (2013.01); *G06F 3/04886* (2013.01); *G06F 21/31* (2013.01)

(58) Field of Classification Search
CPC ........ G06F 21/31; G06F 21/32; G06F 21/36; G06F 3/04886; G06F 3/04883; G06F 3/04812
See application file for complete search history.

(56) References Cited

U.S. PATENT DOCUMENTS

| 6,476,797 | B1 | 11/2002 | Kurihara et al. | |
|---|---|---|---|---|
| 8,174,503 | B2* | 5/2012 | Chin | G06F 3/04883 345/156 |
| 9,202,099 | B2* | 12/2015 | Han | G06K 9/00006 |
| 2010/0257490 | A1 | 10/2010 | Lyon et al. | |
| 2011/0271181 | A1 | 11/2011 | Tsai et al. | |
| 2011/0316797 | A1* | 12/2011 | Johansson | G06F 3/04847 345/173 |
| 2012/0027267 | A1* | 2/2012 | Kim | G06F 3/0418 382/118 |
| 2012/0098639 | A1* | 4/2012 | Ijas | G06F 3/04883 340/5.51 |
| 2012/0293456 | A1* | 11/2012 | Ikeda | G06F 1/1626 345/174 |
| 2013/0191911 | A1* | 7/2013 | Dellinger | G06F 21/36 726/19 |
| 2013/0342512 | A1* | 12/2013 | Smith | G09G 3/3406 345/204 |

FOREIGN PATENT DOCUMENTS

| EP | 2 562 631 A2 | 2/2013 |
|---|---|---|
| EP | 2 600 233 A1 | 6/2013 |

* cited by examiner

*Primary Examiner* — Quan-Zhen Wang
*Assistant Examiner* — Xuemei Zheng
(74) *Attorney, Agent, or Firm* — Birch, Stewart, Kolasch & Birch, LLP

(57) ABSTRACT

A mobile terminal including a wireless communication unit configured to provide wireless communication; a touchscreen configured to receive a touch input; and a controller configured to partition the touchscreen into a first display region and a second display region, when the touchscreen is in a locked state and is touched with a first pointer and a second pointer, reduce sizes of the first and second display regions when the first and second pointers are dragged in opposite directions, and unlock the touchscreen or display a password input object for unlocking the touchscreen based on whether a password for unlocking the touchscreen is set, when a moving distance of at least one of the first and second pointers is greater than a preset moving distance or a size of at least one of the first and second display regions is smaller than a preset size.

19 Claims, 55 Drawing Sheets

FIG. 6
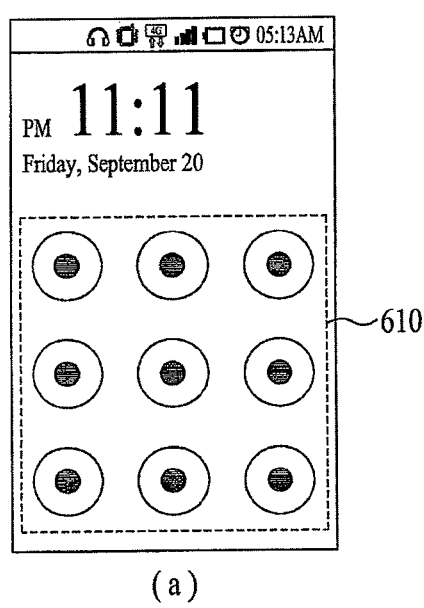
(a)
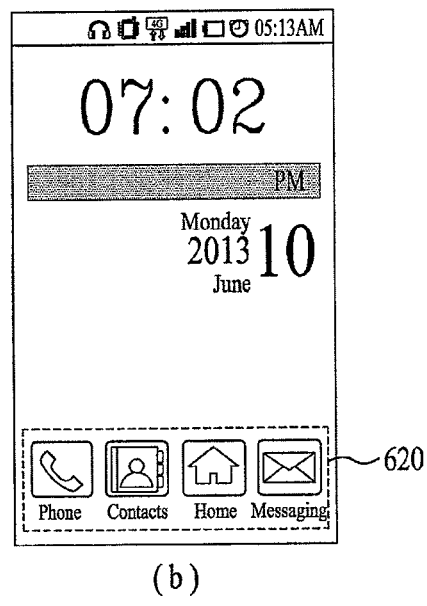
(b)

FIG. 7
first Home Screen
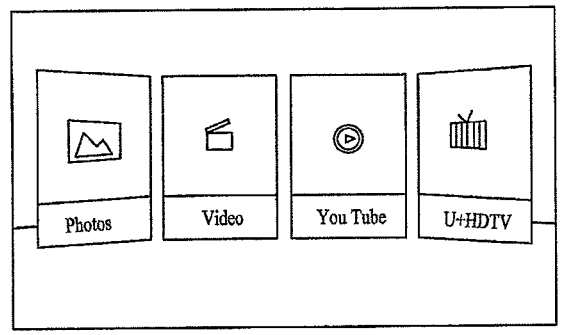
second Home Screen
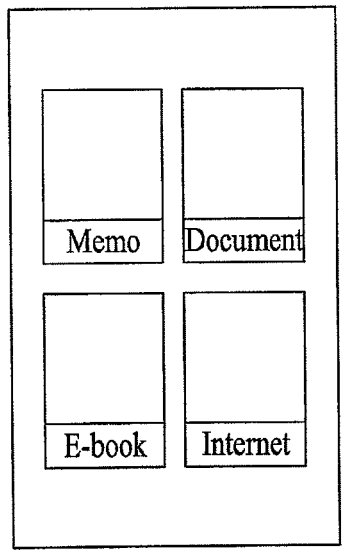
third Home Screen
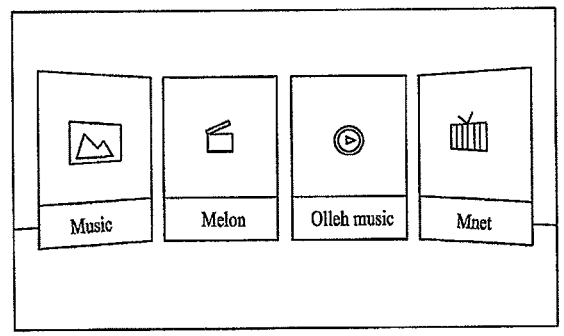
fourth Home Screen

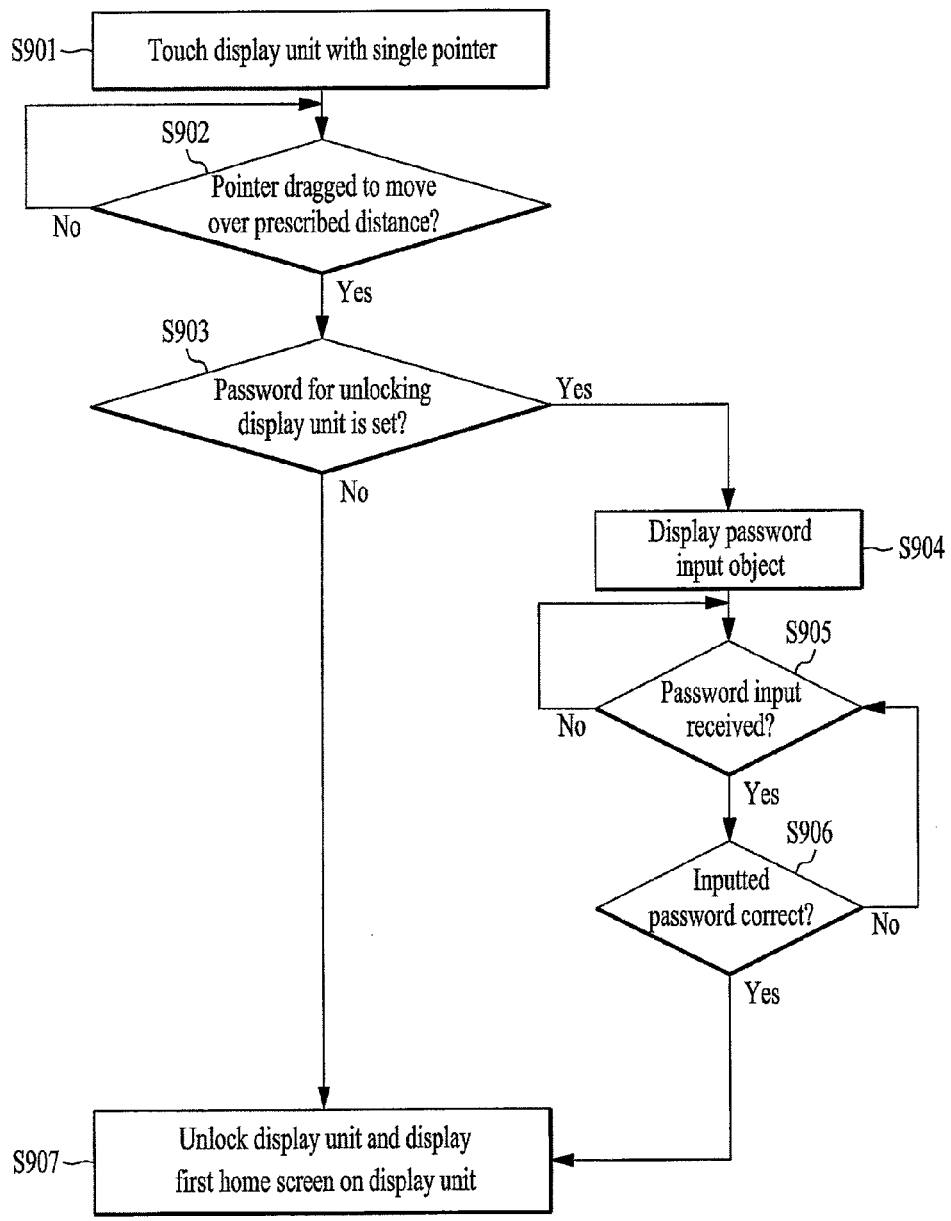

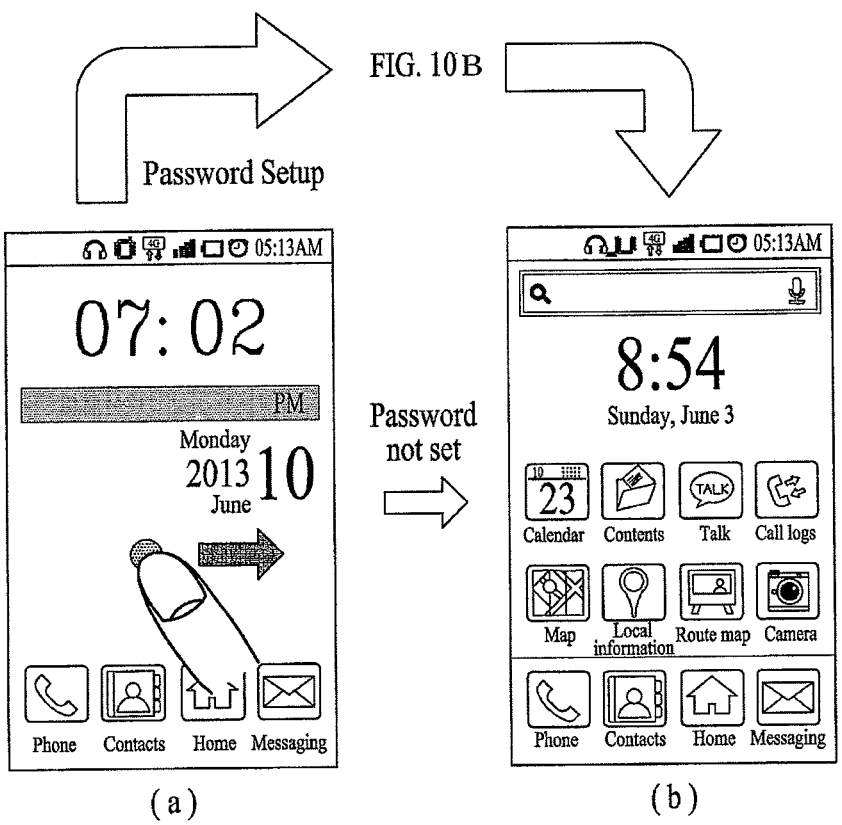

FIG. 15B
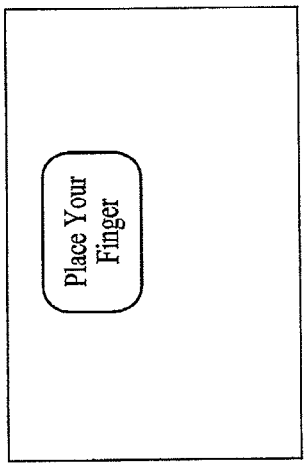
(a)
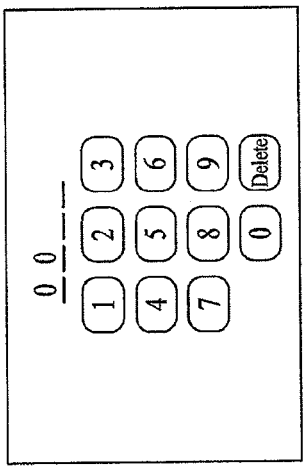
(b)
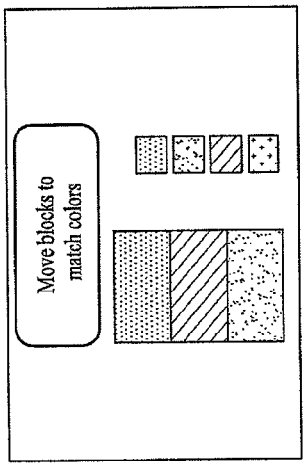
(c)
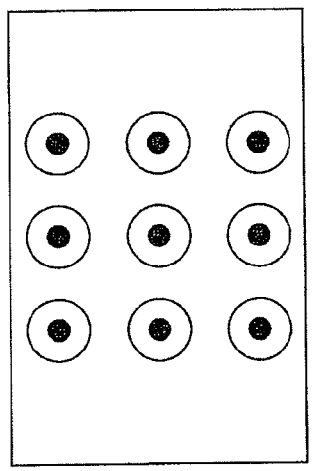
(d)
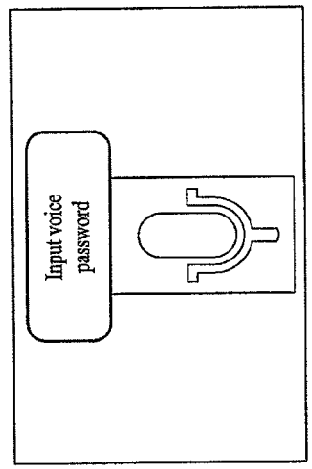
(e)
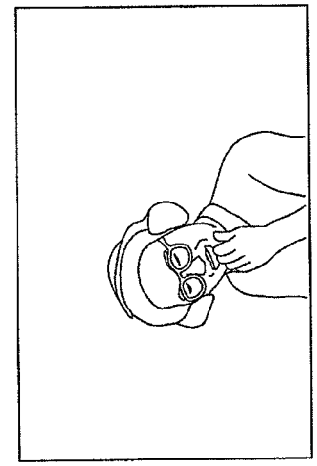
(f)

(a)           (b)

(a)           (b)

(a)  (b)

FIG. 25B
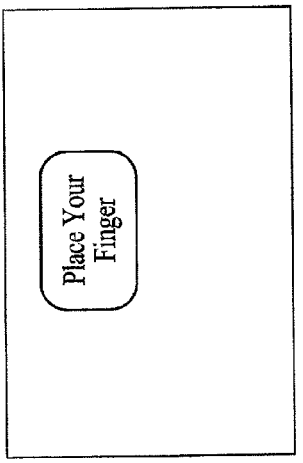
(c)
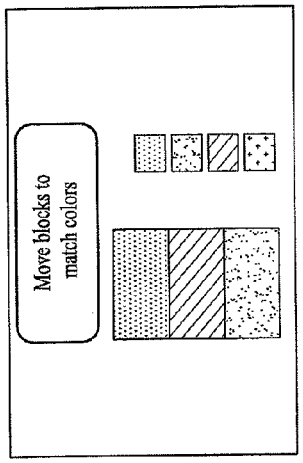
(f)
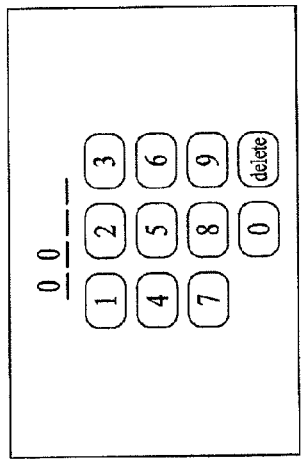
(b)
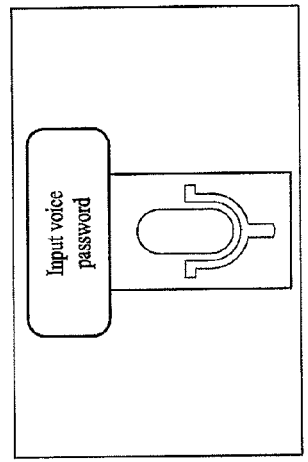
(e)
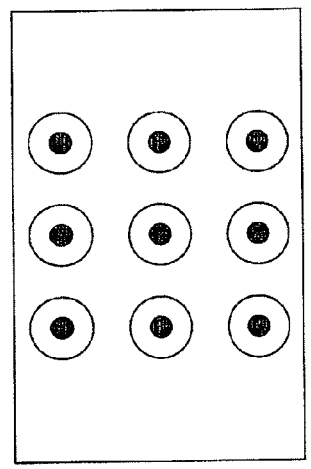
(a)
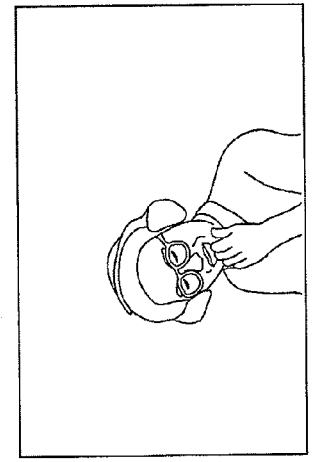
(d)

(a)  (b) Video output (a)  (b) Photo output

FIG. 30A
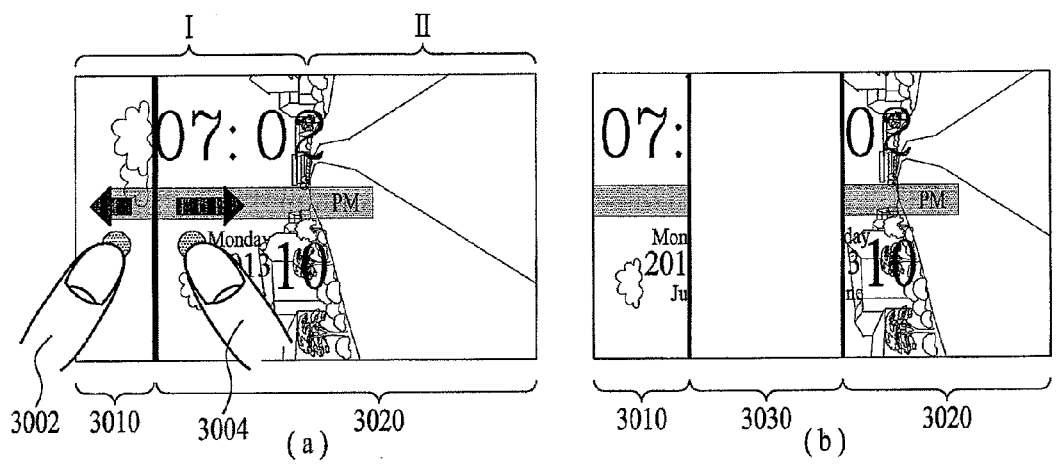
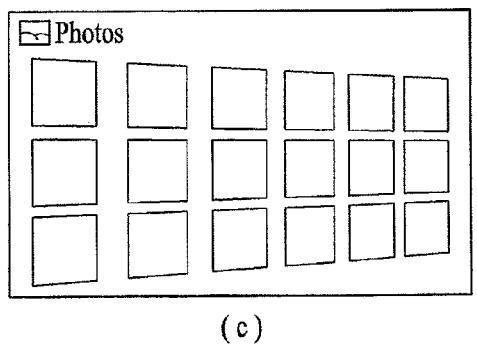

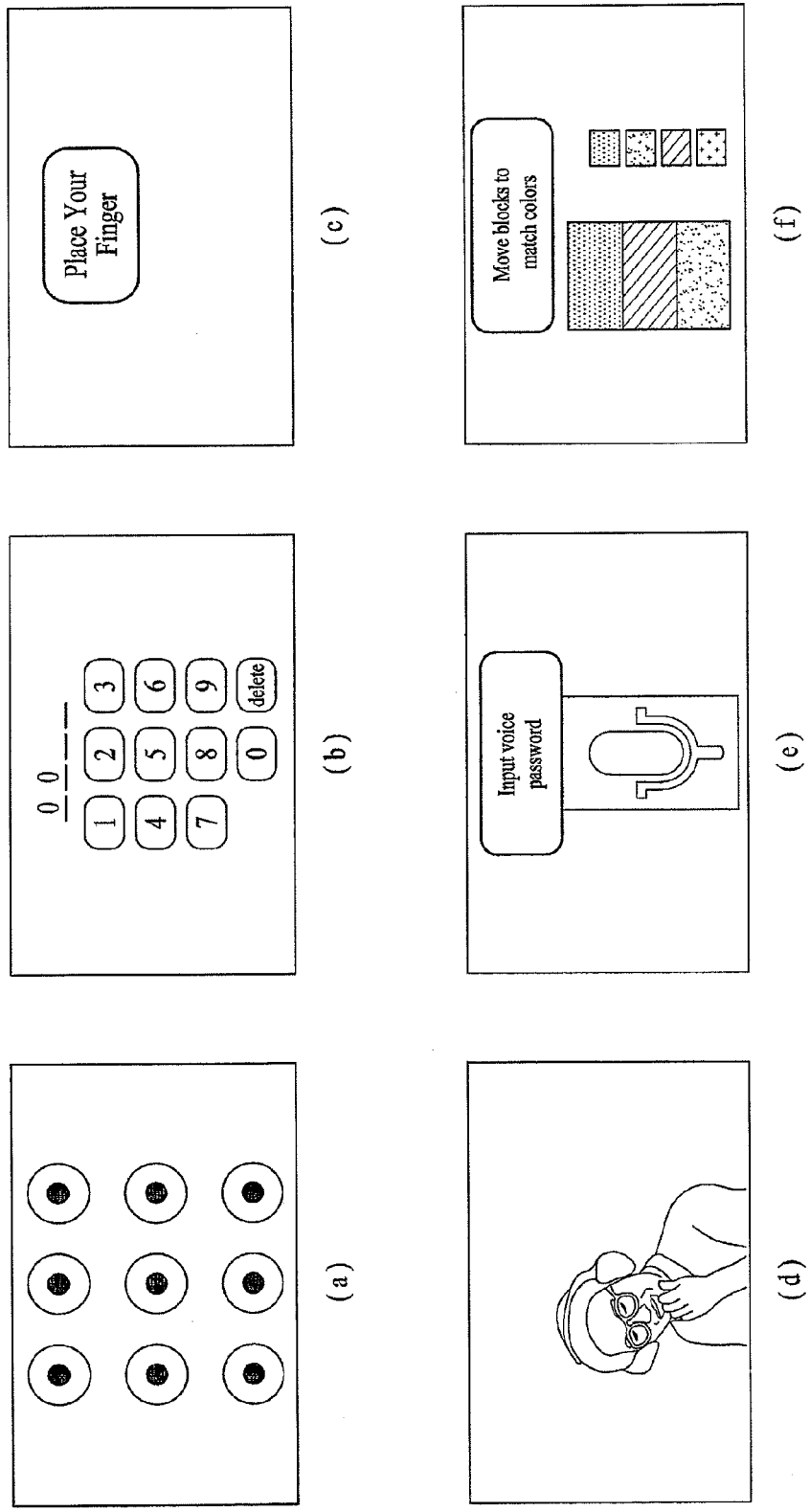

FIG. 37
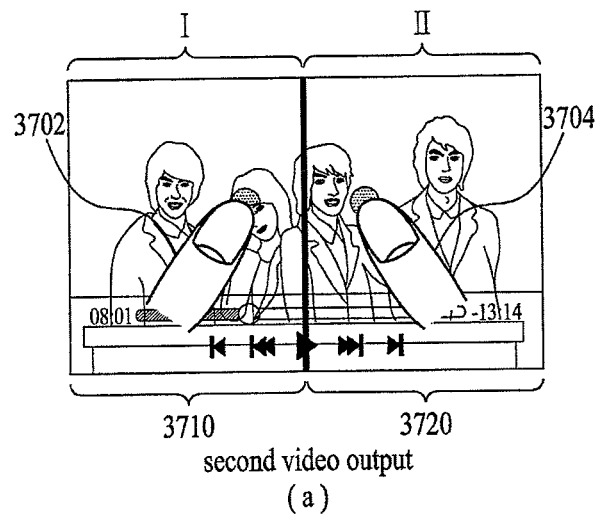
(a) second video output
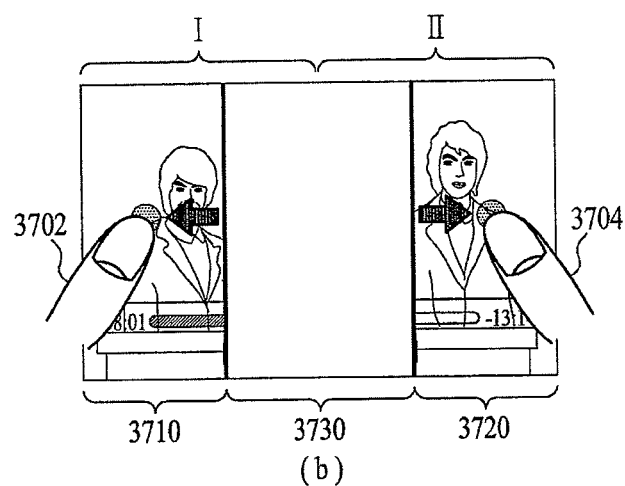
(b)
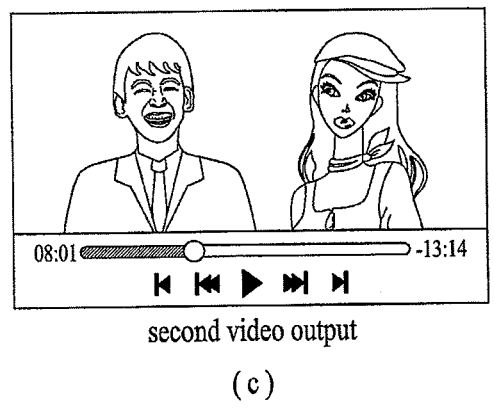
second video output
(c)

FIG. 38
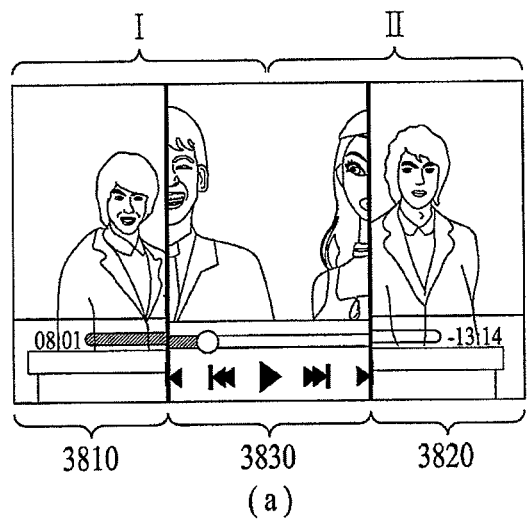
(a)
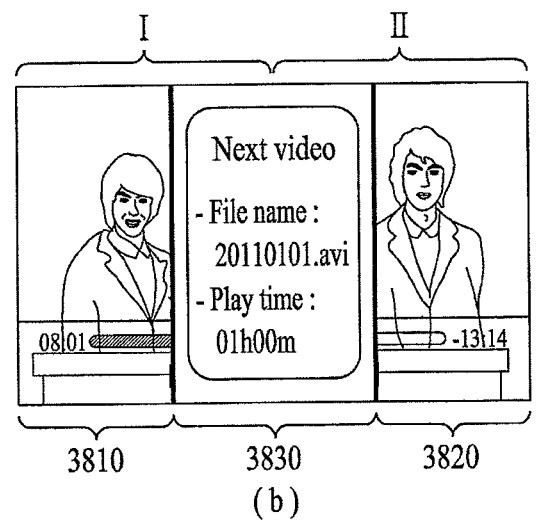
(b)

FIG. 39
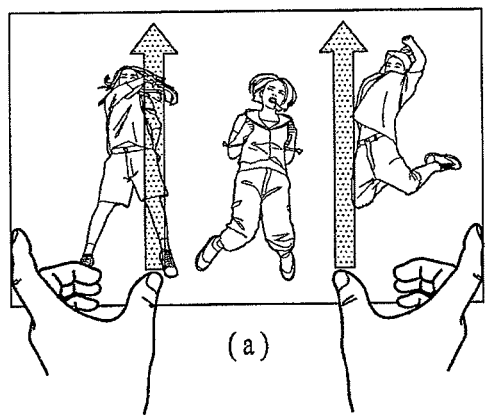
(a)
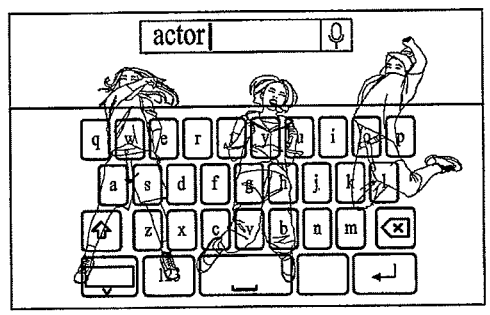
(b)
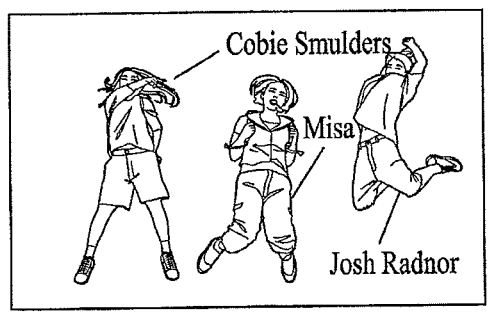
(c)

FIG. 44
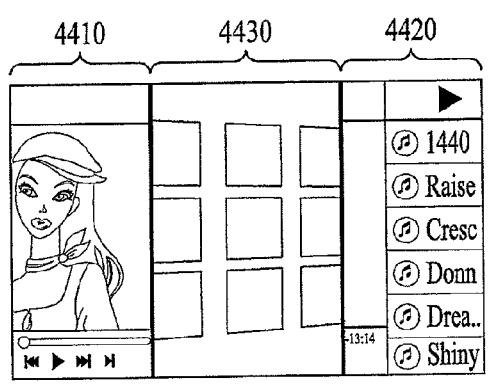
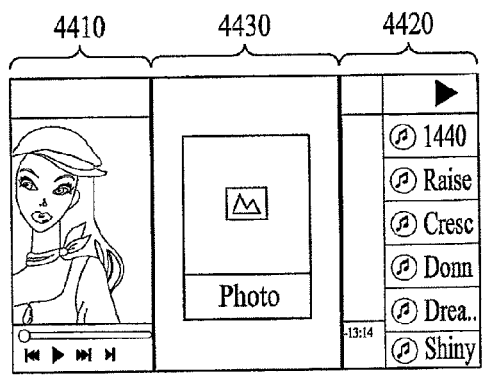
(a)  (b)

FIG. 46
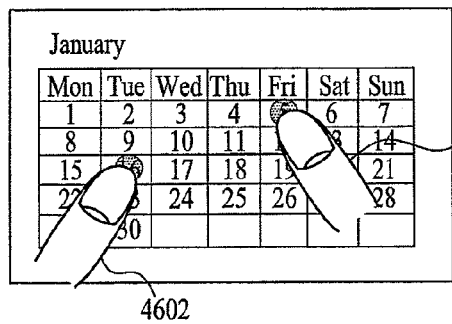
(a)
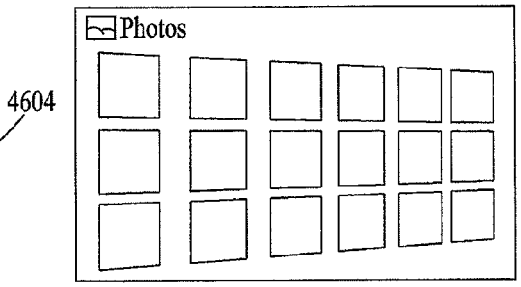
Display list of photos taken between January 5 and January 12
(c)
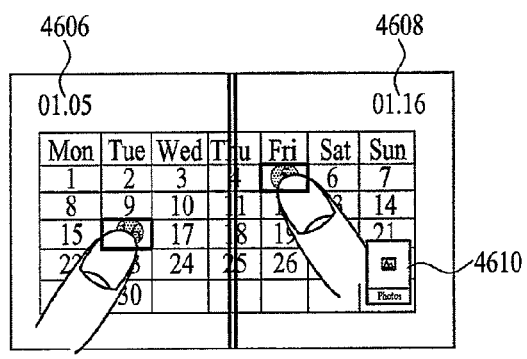
(b)
FIG. 47
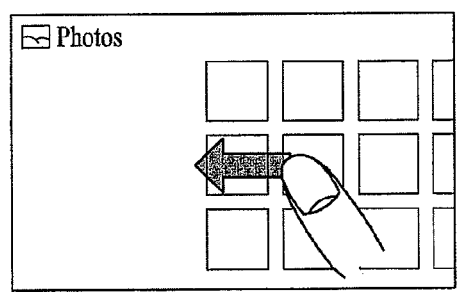
(a)
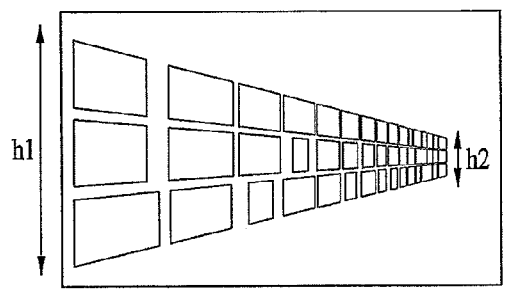
(b)

(a)  (b)

FIG. 52
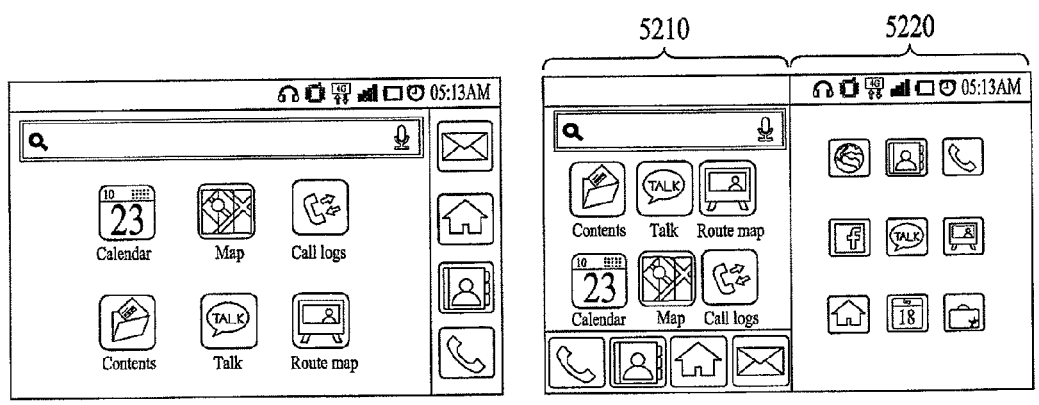
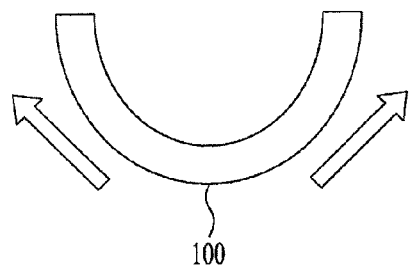
Mobile terminal bent inward

MOBILE TERMINAL FOR UNLOCKING A TOUCHSCREEN AND CONTROLLING METHOD THEREOF

Pursuant to 35 U.S.C. §119(a), this application claims the benefit of earlier filing date and right of priority to Korean Application No. 10-2013-0128732, filed on Oct. 28, 2013 and Korean Application No. 10-2013-0155245, filed on Dec. 13, 2013, the contents of which are hereby incorporated by reference herein in their entireties.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for unlocking a display unit using a plurality of pointers.

2. Discussion of the Related Art

A mobile terminal can perform various functions such as data and voice communications, capturing images and video via a camera, recording audio, playing music files and outputting music via a speaker system, and displaying images and video on a display. Generally, terminals can be classified into mobile terminals and stationary terminals. In addition, the mobile terminals can be further classified into handheld terminals and vehicle mounted terminals.

Generally, a touchscreen is used as an input mechanism of a mobile terminal. When using a touchscreen, it is highly probable that a mobile terminal malfunctions due to a touch input unintentionally applied by a user. Hence, the mobile terminal can enter a locked state to prevent the mobile terminal from malfunctioning due to a touch input that is input when a user is not using the mobile terminal. However, unlocking the terminal is often cumbersome and inconvenient for the user.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a display unit can be unlocked using a plurality of pointers.

Another object of the present invention is to provide a mobile terminal and controlling method thereof, by which a function activated on unlocking a display unit can be determined based on a pattern of a user input.

Additional advantages, objects, and features of the invention will be set forth in the invention herein as well as the accompanying drawings. Such aspects may also be appreciated by those skilled in the art based on the invention herein.

To achieve these objects and other advantages and in accordance with the purpose of the invention, as embodied and broadly described herein, a mobile terminal according to one embodiment of the present invention may include a touchscreen configured to receive a touch input and a controller, if the touchscreen in locked state is touched with a first pointer and a second pointer, controlling the touchscreen to be partitioned into a first display region and a second display region, the controller, if the first pointer and the second pointer are dragged to move in opposite directions, respectively, controlling sizes of the first display region and the second display region to be reduced, the controller, if a moving distance of at least one of the first pointer and the second pointer is greater than a preset moving distance or a size of at least one of the first display region and the second display region is smaller than a preset size, controlling the touchscreen to be unlocked or controlling a password input object for unlocking the touchscreen to be displayed depending on whether a password for unlocking the touchscreen is set.

In another aspect of the present invention, a method of controlling a mobile terminal according to another embodiment of the present invention may include the steps of if a touchscreen in locked state is touched with a first pointer and a second pointer, partitioning the touchscreen into a first display region and a second display region, if the first pointer and the second pointer are dragged to move in opposite directions, respectively, reducing sizes of the first display region and the second display region, and if a moving distance of at least one of the first pointer and the second pointer is greater than a preset moving distance or a size of at least one of the first display region and the second display region is smaller than a preset size, unlocking the touchscreen or displaying a password input object for unlocking the touchscreen depending on whether a password for unlocking the touchscreen is set.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram illustrating one example of a lock screen;

FIG. 7 is a diagram illustrating one example of first to fourth home screens;

FIG. 9 is a flowchart illustrating an operation of a mobile terminal according to an embodiment of the present invention;

FIG. 10A and FIG. 10B are diagrams illustrating examples of displaying a first home screen as a display unit is unlocked;

FIG. 15A and FIG. 15B are diagrams illustrating another example of displaying a password input object before a display unit is unlocked;

FIG. 25A and FIG. 25B are diagrams illustrating examples of unlocking a display unit when a first pointer and a second pointer are moved in the same direction;

FIG. 30A and FIG. 30B are diagrams illustrating one example of outputting an active screen of a prescribed application as a display unit is unlocked;

FIG. 37 is a diagram illustrating one example of starting to play a new video by stopping playing a video;

FIG. 38 is a diagram illustrating one example that a still cut of a second video or information on the second video is displayed on a third display region;

FIG. 39 is a diagram illustrating one example of activating a search function for searching for a related information on a currently played video;

FIG. 44 is a diagram illustrating one example that an active screen of a second application or information on the second application is displayed on a third display region;

FIG. 46 is a diagram illustrating In another example of newly running a second application by stopping running a first application;

FIG. 47 is a diagram illustrating one example to describe an animation effect applied to a content list;

FIG. 52 is a diagram illustrating one example that a mobile terminal is partitioned into a first virtual region and a second virtual region.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and it is understood that the 'module', 'unit' and 'part' can be used together or interchangeably. The present invention can be applicable to a various types of mobile terminals. Examples of such terminals include mobile phones, user equipment, smart phones, digital broadcast receivers, personal digital assistants, laptop computers, portable multimedia players (PMP), navigators and the like. Yet, it is apparent to those skilled in the art that a configuration according to an embodiment disclosed in this specification is applicable to such a fixed terminal as a digital TV, a desktop computer and the like as well as a mobile terminal.

Figure 1:
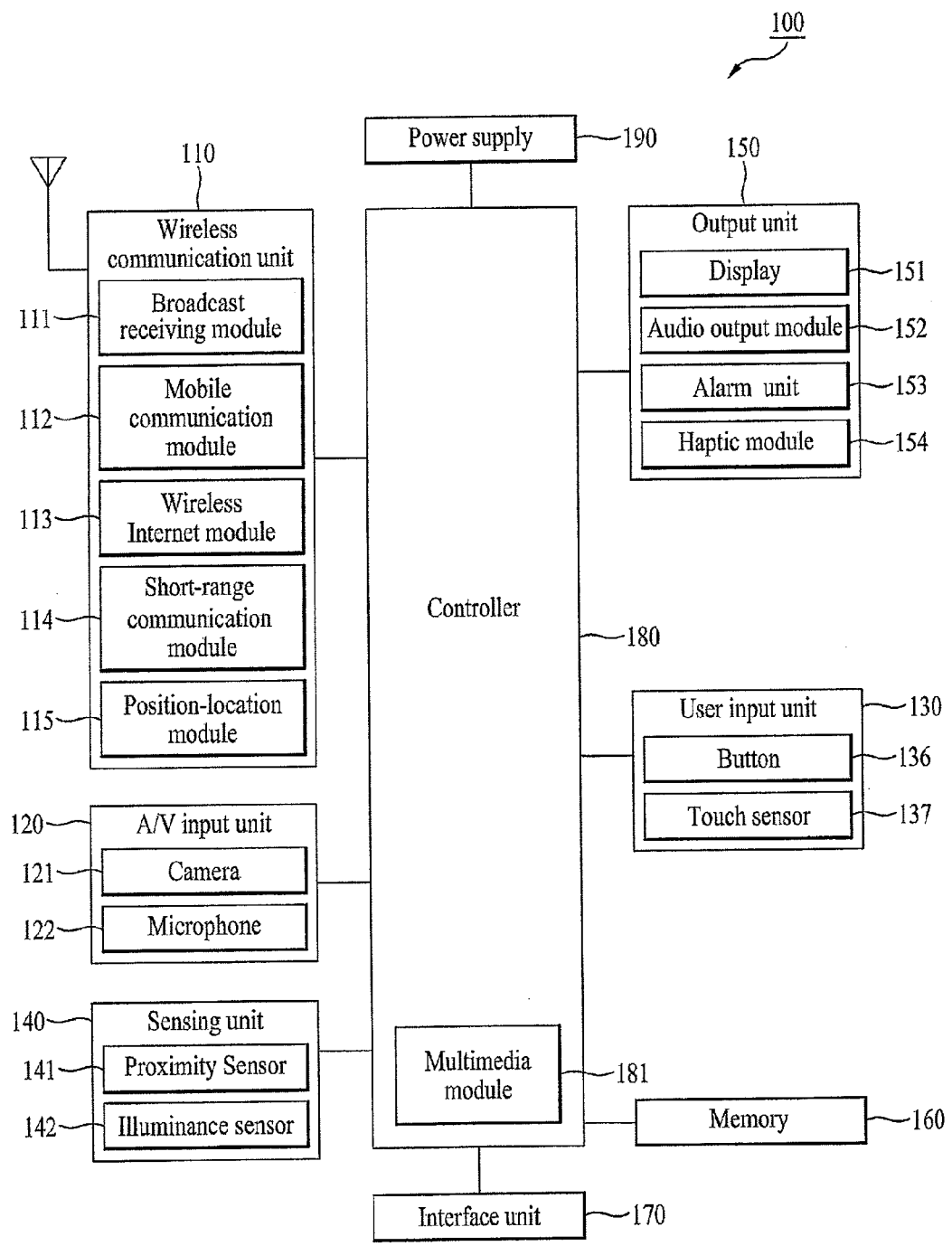
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc. Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation)

by calculating distance information and precise time information from at least three satellites and then applying triangulation to the calculated information. Currently, location and time information are calculated using three satellites, and errors of the calculated location position and time information are then amended using another satellite. In addition, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like. The mobile terminal 100 may further include a fingerprint authentication sensor. Fingerprint information sensed via the fingerprint authentication sensor may be utilized as authentication mean. The fingerprint authentication sensor may be included in the display 151 or in a user input unit 130.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. In a non-limiting example, such sensing unit 140 include, gyro sensor, accelerate sensor, geomagnetic sensor and fingerprint authentication sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141. An illumination sensor 142 such as an LED can also be included with the mobile terminal.

The output unit 150 generates outputs relevant to the senses of sight, hearing, touch and the like. In addition, the output unit 150 includes the display 151, an audio output module 152, an alarm unit 153, and a haptic module 154 and the like. The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like. The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
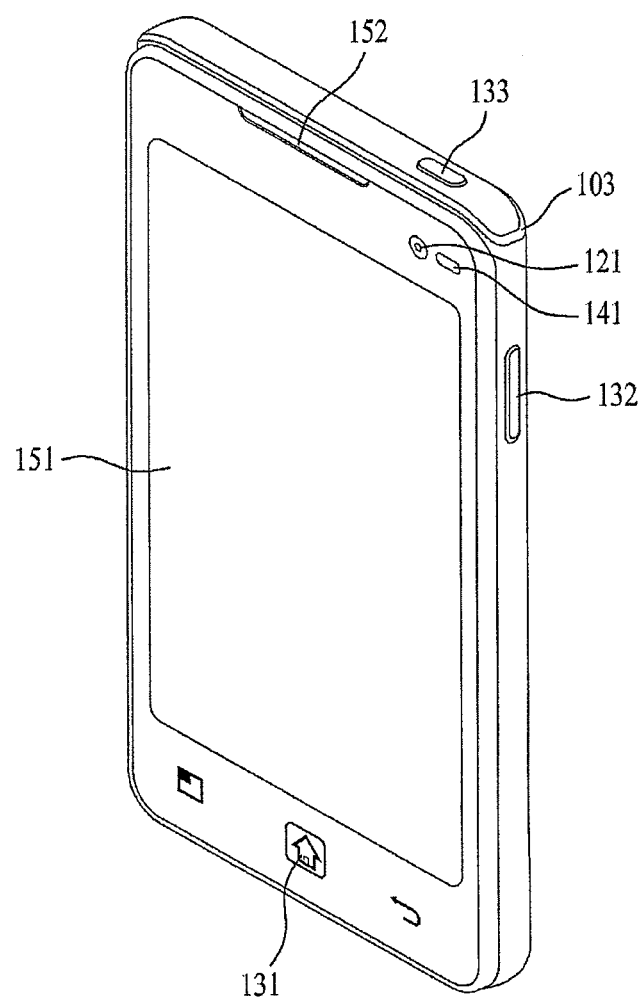
FIG. 2 is a front perspective diagram of a mobile terminal according to one embodiment of the present invention.

Next, FIG. 2 is a front perspective diagram of a mobile terminal according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further invention will primarily relate to a bar-type mobile terminal 100. However such teachings apply equally to other types of mobile terminals.

Figure 3:
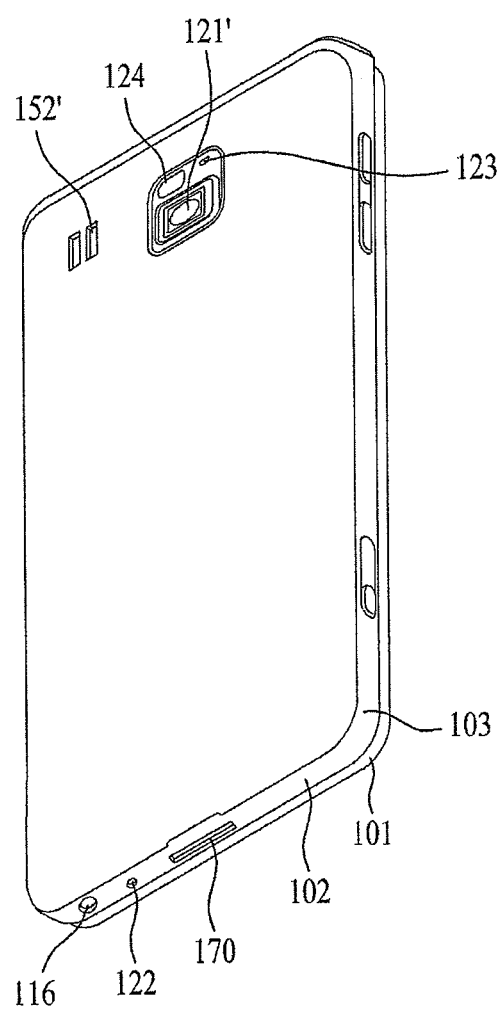
FIG. 3 is a rear perspective diagram of a mobile terminal according to one embodiment of the present invention.

Referring to FIGS. 2 and 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102. Occasionally, electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, proximity sensor, an interface 170 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the second manipulating unit 133.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal. A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Meanwhile, the display unit 151 according to one embodiment of the present invention may include a flexible display in a curved shape (i.e., a shape having a curved surface). Moreover, a body of the mobile terminal 100 including the above-configured display unit 151 may be configured to have a curved exterior. For instance, a front side, through which the display unit 151 is exposed, of the body of the mobile terminal 100 is curved concavely and a rear side of the body of the mobile terminal 100 may be configured to have a convexly curved shape.

Figure 4:
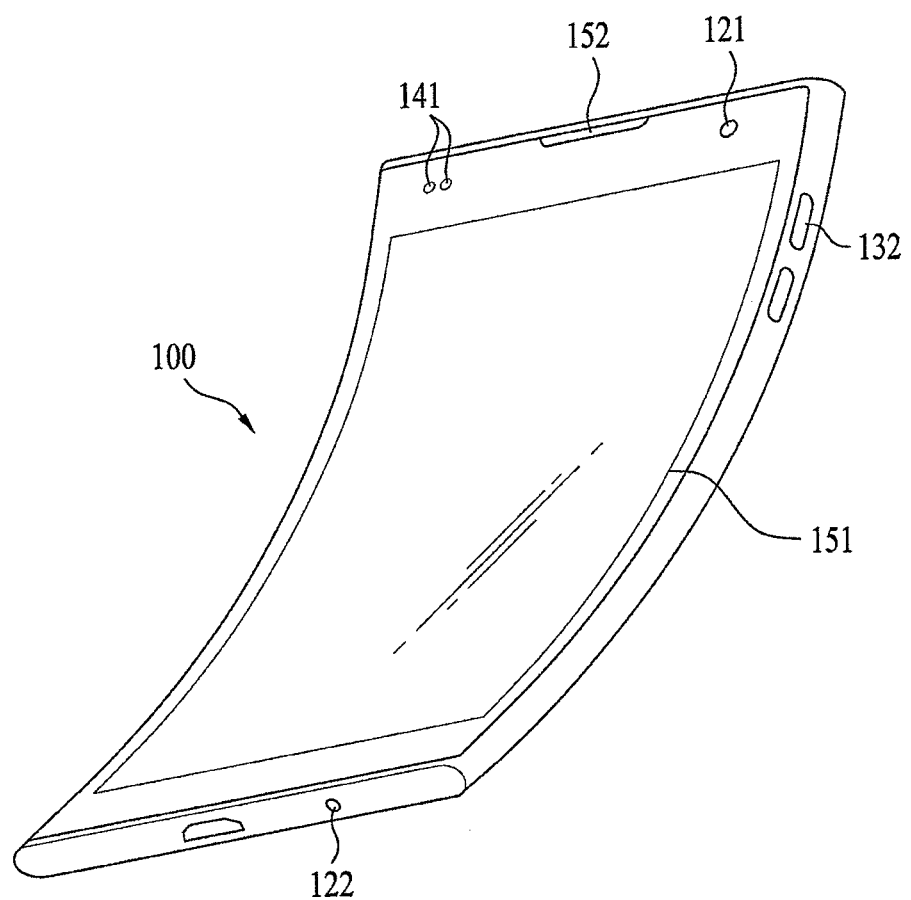
FIG. 4 is a diagram illustrating one example of a configuration of a mobile terminal including a curved display unit.
Figure 5:
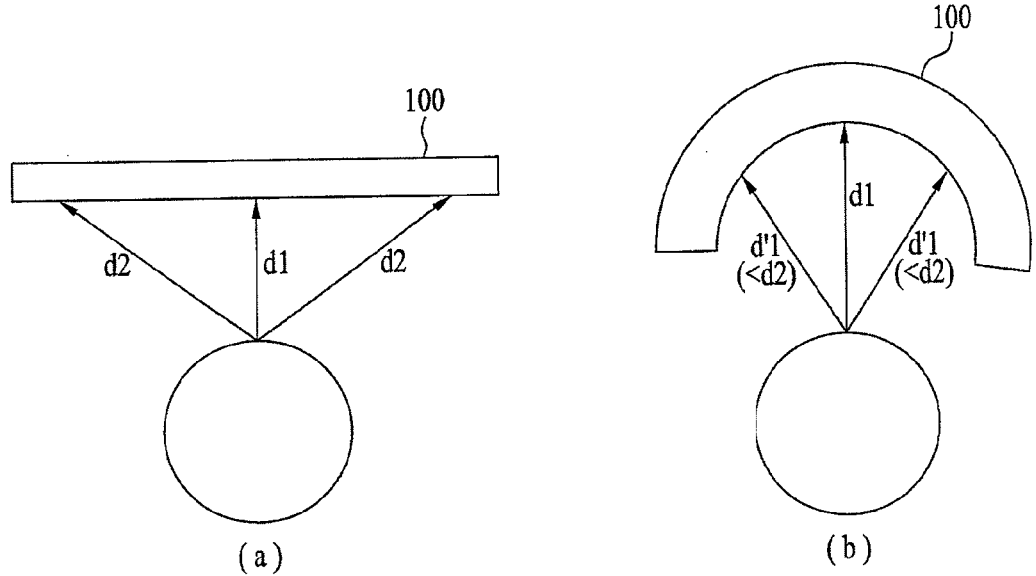
FIG. 5 is a diagram illustrating a change of a viewing distance depending on a configuration of a mobile terminal.

Like the example shown in FIG. 4, when the mobile terminal 100 includes the display unit 151 in a curved shape, an immersion level of a user who uses the mobile terminal 100 is increased. For instance, like the example shown in FIG. 5, if the mobile terminal 100 has a planar display unit 151, a difference between a viewing distance d1 to a center of the display unit 151 and a viewing distance d2 to a lateral part of the display unit 151 is large. However, if the mobile terminal 100 has a curved display unit 151, since a difference between a viewing distance d1 to a center of the display unit 151 and a viewing distance d'1 to a lateral part of the display unit 151 is small, it can increase an immersion level of a user who uses the mobile terminal 100.

For clarity and convenience of the following description, assume that a mobile terminal 100 according to an embodiment of the present invention includes at least one of the components shown in FIG. 1. In particular, assume that a mobile terminal 100 according to an embodiment of the present invention includes the display unit 151, the memory 160 and the controller 180 among the components shown in FIG. 1. In some instances, assume that the mobile terminal 100 according to an embodiment of the present invention further includes the wireless communication unit 110, the sensing unit 140 and the like.

The display unit 151 of the mobile terminal 100 according to an embodiment of the present invention can be configured in the planar shape like the examples shown in FIG. 2 and FIG. 3 or in the curved shape like the example shown in FIG. 4. If the display unit 151 includes a touchscreen, since implementation of the present invention can be further facilitated, the display unit 151 shall be assumed as including the touchscreen 151 in the following description. Hence, the display unit 151 of the present invention can receive a touch input applied in a manner that the display unit 151 is touched with a pointer. In this instance, the pointer can include such a means appropriate for touching the display unit 151 as a user's finger, a stylus pen and the like. In addition, the display unit 151 may include a capacitive touchscreen configured to receive a touch input by sensing static electricity generated from a pointer or a pressure type touchscreen configured to receive a touch input by sensing a pressure applied to the display unit 151 by a pointer.

The mobile terminal 100 according to an embodiment of the present invention discloses a method of cancelling a locked state of the display unit 151. If a state of the display unit 151 is set to a locked state, it can prevent the mobile terminal 100 from operating by a user's unintentional touch input. Once the display unit 151 enters the locked state, the controller 180 can display a lock screen on the display unit 151.

For instance, FIG. 6 is a diagram illustrating one example of a lock screen. FIG. 6(*a*) is a diagram illustrating one example of a lock screen if a password for unlocking the display unit 151 is set up. While a password for unlocking the display unit 151 is set up, like the example shown in FIG. 6(*a*), a mechanism for inputting a password can be included in a lock screen. In FIG. 6(*a*), a plurality of objects for inputting a pattern password are illustrated as a password input mechanism, for example. Moreover, if a password includes a text, a virtual keypad for inputting a text can be displayed on a lock screen. The controller 180 determines whether a password input through a password input mechanism is correct, thereby being able to determine whether to unlock the display unit 151. Moreover, such a means for verifying user's identification as a fingerprint, a face, a voice and the like can be set as a password. In addition, only if a correct answer for a puzzle, a simple arithmetical problem or the like is input, a locked state of the display unit can be cancelled (i.e., the display unit can be unlocked).

FIG. 6(*b*) shows one example of a lock screen if a password for unlocking the display unit 151 is not set up yet. While the password for unlocking the display unit 151 is not set up yet, if a touch input of a preset type is applied, the controller 180 can control the display unit 151 to be unlocked. If the password for unlocking the display unit 151 is not set up yet, at least one application icon may be included in the lock screen. While the application icon is touched, if a touch input of a preset type is applied, the controller 180 unlocks the display unit 151 and can also control an application corresponding to the selected icon to be run.

Except for such a special case when the display unit 151 is unlocked while an application included in a lock screen is selected, a home screen is generally output if the display unit 151 is unlocked. In this instance, the home screen may mean a basic screen on which an icon for running an application program, a widget of a mini-application program frequently used by a user and the like are arranged. As such a mobile terminal 100 as a smartphone, a tablet and the like tends to be equipped with a home button, if the home button is pushed or pressed, a home screen is generally displayed in direct.

The mobile terminal 100 according to an embodiment of the present invention can display a different home screen in accordance with a type of a user input for unlocking the display unit 151. For instance, according to an embodiment mentioned in the following description, if the display unit 151 is unlocked by a single pointer, a first home screen can be displayed. If the display unit 151 is unlocked by at least two pointers, at least one of second to fourth home screens can be displayed.

The home screen (i.e., the first home screen) output when unlocking the display unit 151 using a single pointer may differ from the home screen (i.e., at least one of the second to fourth screens) output when unlocking the display unit 151 using at least two pointers in at least one of a type of a displayed icon, an arranged formation of icons, and the maximum number of displayable icons. In another instance, the above-mentioned two screens can be identified depending on whether an icon type arranged by a user, an icon arranging method and the like can be freely adjusted. For example, if the first home screen can freely adjust an icon type arranged by a user, an icon arranging method and the like, the second to fourth home screens can be set not to freely adjust an icon type arranged by a user, an icon arranging method and the like.

The home screens (i.e., the second to fourth home screens) output when unlocking the display unit 151 using two pointers may differ from each other in at least one of a type of a displayed icon, an arranged formation of icons, and the maximum number of displayable icons. In another instance, the second to fourth home screens may differ from each other in attributes of displayable icons. For example, the second home screen can include an icon of an application for handling images (e.g., photos, videos, etc.), the third home screen can include an icon of an application for handling texts (e.g., memos, documents, etc.), and the fourth home screen can include an icon of an application for handling music.

For clarity, according to the embodiments in the following descriptions, assume that first to fourth home screens differ from each other in at least one of a type of an included icon and an arrangement formation of the included icon. In particular, assuming that the first to fourth home screens have the configuration shown in FIG. 7, the mobile terminal 100 according to an embodiment of the present invention shall be described in detail. However, the first to fourth home screens are non-limited by the drawing shown in FIG. 7.

The mobile terminal 100 according to an embodiment of the present invention can provide an unlocking method using a single pointer and an unlocking method using two pointers. In order to provide the unlocking method using the two pointers, the mobile terminal 100 according to an embodiment of the present invention can configure two virtual touch regions for determining whether appropriate positions of the display unit 151 are touched with two pointers, respectively. For instance, FIG. 8 is a diagram illustrating one example of configuring 2 touch regions on a display unit 151.

Figure 8:
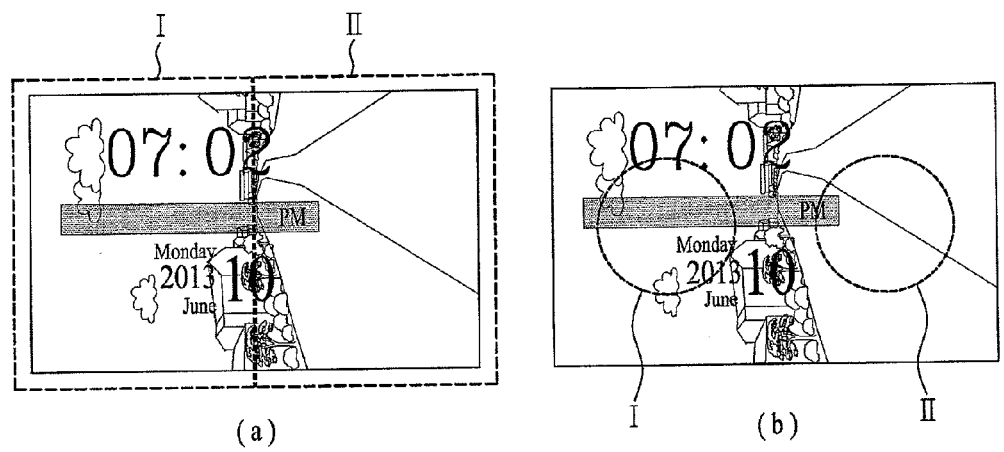
FIG. 8 is a diagram illustrating one example of configuring 2 touch regions on a display unit.

Referring to FIG. 8(*a*) and FIG. 8(*b*), if the display unit 151 is in a locked state, the controller 180 can configure two touch regions I and II on the display unit 151. In particular, like the example shown in FIG. 8(*a*), the controller 180 can configure the two touch regions I and II by dividing the display unit 151 into two equal parts. Alternatively, like the example shown in FIG. 8(*b*), the controller 180 can configure the two touch regions I and II at preset positions, respectively. The controller 180 can control the two touch regions to be displayed on the display unit 151 by being visually identifiable, by which the present invention is non-limited.

In the example shown in FIG. 8, a first touch region I is configured on a left part of the display unit 151 while a second touch region II is configured on a right part of the display unit 15. However, it is not necessary for the positions of the first and second touch regions I and II to be dependent on the configuration shown in FIG. 8. For instance, the positions of the first and second touch regions I and II may be located in order reverse to that shown in FIG. 8. Moreover, when the mobile terminal 100 operates in a portrait mode, the first touch region I is located on a top part (or bottom part) of the display unit and the second touch region II can be located on the bottom part (or top part) of the display unit. When the mobile terminal 100 operates in landscape mode, the first touch region I is located on a left part (or right part) of the display unit and the second touch region II can be located on the right part (or left part) of the display unit.

The first and second touch regions mentioned in the description of the present invention are provided only to determine whether first and second pointers touch appropriate positions, respectively but do not mean regions for receiving touch inputs limitedly. Moreover, the touch regions are previously defined regions to determine whether first and second pointers touch appropriate positions, respectively, and can differ from a display region, which will be described later, in that positions of the touch regions are not changed due to drag inputs of the first and second pointers.

For clarity of the following description, two touch regions on the display unit 151 shall be named a first touch region I and a second touch region II, respectively. When the mobile terminal 100 operates in landscape mode, assume that the first touch region I is located on a left part of the display unit 151 and the second touch region II is located on a right part of the display unit 151. When the mobile terminal 100 operates in portrait mode, assume that the first touch region I is located on a top part of the display unit 151 and the second touch region II is located on a bottom part of the display unit 151. Moreover, like the example shown in FIG. 8 (*a*), according to embodiments mentioned in the following description, assume that the first touch region I and the second touch region II are configured by dividing the display unit 151 into two equal parts.

Various unlocking methods according to embodiments of the present invention are described in detail with reference to the accompanying drawings as follows.

Embodiment 1

FIG. 9 is a flowchart illustrating an operation of the mobile terminal 100 according to one embodiment of the present invention. In particular, FIG. 9 shows a method of unlocking the display unit 151 using a single pointer. Referring to FIG. 9, a single pointer touches the display unit 151 (S901). If the pointer currently touching the display unit 151 is dragged over a prescribed distance (Yes in S902), the controller 180 can check whether a password for unlocking the display unit 151 is set (S903). If the password is not set (No in S903), the controller 180 unlocks the display unit 151 and can display a first home screen on the display unit 151 (S907).

Otherwise, if the password for unlocking the display unit 151 is set (Yes in S903), the controller 180 can display a password input object (S904). In this instance, the password input object is configured to receive an input of a password from a user and can vary in accordance with a type of the set password. For instance, if the set password is a pattern password, a plurality of objects for drawing a pattern can be displayed as the password input object. If the set password includes a personal identification number (PIN) or a text, a virtual keypad for receiving an input of numerals and/or texts can be displayed as the password input object.

Alternatively, if the set password is a fingerprint, a fingerprint input window for guiding to input a fingerprint can be displayed as the password input object. If the set password is a user's face, an image input to a camera for recognizing a user's face can be displayed as the password input object. If the set password is a correct answer of a quiz, a quiz question can be displayed as the password input object. In particular, in accordance with a type of the set password, the password input object can include a plurality of objects for a pattern input, a virtual keypad for a numeral or text input, a fingerprint input window for receiving an input of a fingerprint, a preview image input from a camera, a quiz question and the like.

Figure 10B:
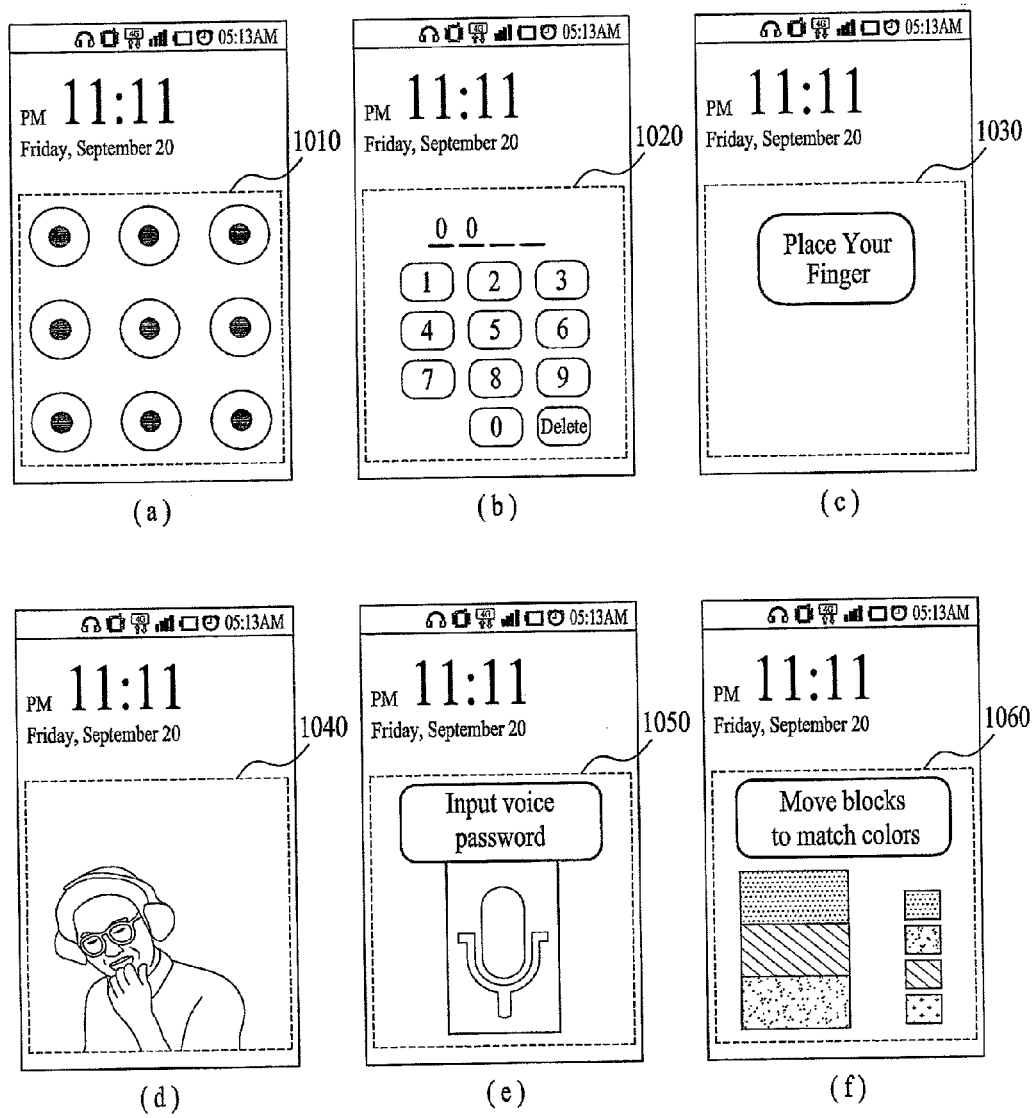

Once a password is input (Yes in S905), the controller 180 checks the input password (S906). If the input password is correct, the controller 180 can display the first home screen (S907). For instance, FIG. 10A and FIG. 10B are diagrams illustrating examples of displaying a first home screen as the display unit 151 is unlocked. Like the example shown in FIG. 10A (*a*), if a single pointer currently touching the display unit 151 is dragged over a prescribed distance, the controller 180 can check whether a password for unlocking the mobile terminal 100 is set. If the password is not set, like the example shown in FIG. 10(*b*), the controller 180 unlocks the display unit 151 and can display a first home screen.

On the contrary, if the password for unlocking the mobile terminal 100 is set, the controller 180 can display a password input object through the display unit 151 before displaying the first home screen. For instance, if the set password is a pattern password, like the example shown in FIG. 10B (a), the controller 180 can display a plurality of figure objects through the display unit to enable a user to draw a pattern before displaying the first home screen. In the example shown in FIG. 10B (a), nine figure objects are displayed to enable a user to input a pattern password. A user can draw a pattern by connecting at least one or more of the nine figure objects to one another. Based on whether the pattern drawn through the nine figure objects matches a preset password, the controller 180 can determine whether to unlock the display unit 151. If the pattern drawn through the nine figure objects matches the preset password, the controller 180 unlocks the display unit 151 and can display the first home screen like the example shown in FIG. 10A (b).

If the set password is a PIN (personal identification number), like the example shown in FIG. 10B (b), the controller 180 can display a virtual keypad through the display unit 151 to enable a user to input numerals. If numerals are input through the virtual keypad, the controller 180 checks whether the input numerals matches the set password and can then determine whether to unlock the display unit 151. If the input numerals matches the preset password, the controller 180 unlocks the display unit 151 and can display the first home screen like the example shown in FIG. 10A (b). Moreover, if the set password includes a text, keys for inputting texts can be further included in the virtual keypad.

If the set password is a finger print, like the example shown in FIG. 10B (c), the controller 180 can display a fingerprint input window, which suggests a user to input a fingerprint. If a fingerprint recognition sensor is built in the display unit 151, the fingerprint input window may indicate a region on which a user should put user's finger for a fingerprint input. Further, if a fingerprint recognition sensor is configured separate from the display unit 151, the fingerprint input window may be provided to guide a user to put user's finger on the fingerprint recognition sensor. If a fingerprint is input, the controller 180 checks whether the input fingerprint matches the set password and can then determine whether to unlock the display unit 151. If the input fingerprint matches the preset password, the controller 180 unlocks the display unit 151 and can display the first home screen like the example shown in FIG. 10A (b).

If the set password is a user's face, like the example shown in FIG. 10B (d), the controller 180 can display an image input through a camera. As a result from analyzing the image input from the camera, if it is determined that the user's face set as the password is recognized, the controller 180 unlocks the display unit 151 and can display the first home screen like the example shown in FIG. 10A (b). A preview image shown in FIG. 10B (d) preferably includes an image input through the camera exposed from a front side of the mobile terminal so that a user can check an output of the display unit 151. However, an image input from a rear camera can be output as the preview image.

If the set password is an input of a voice corresponding to a preset text, like the example shown in FIG. 10B (e), the controller 180 can display a voice input window, which suggests to input a voice. If a user's voice is input through a microphone, the controller 180 analyzes the input voice, checks whether the input voice matches the set password, and can then determine whether to unlock the display unit 151. If the input voice matches the preset password, the controller 180 unlocks the display unit 151 and can display the first home screen like the example shown in FIG. 10A (b).

If the set password is a correct answer of a quiz, like the example shown in FIG. 10B (f), the controller 180 can display a quiz question. For instance, in the example shown in FIG. 10B (f), matching a displayed block to a mini-block of the same pattern is the quiz question. If a user solves the quiz correctly, the controller 180 unlocks the display unit 151 and can display the first home screen like the example shown in FIG. 10A (b).

In addition, the controller 180 can display information, which had been output last before the display unit 151 was locked, to be displayed in substitution for the first home screen. Although FIG. 10A and FIG. 10B show the example that the mobile terminal 100 is in portrait mode, the present embodiment can apply to a case that the mobile terminal 100 is in landscape mode as well.

Embodiment 2

Figure 11:
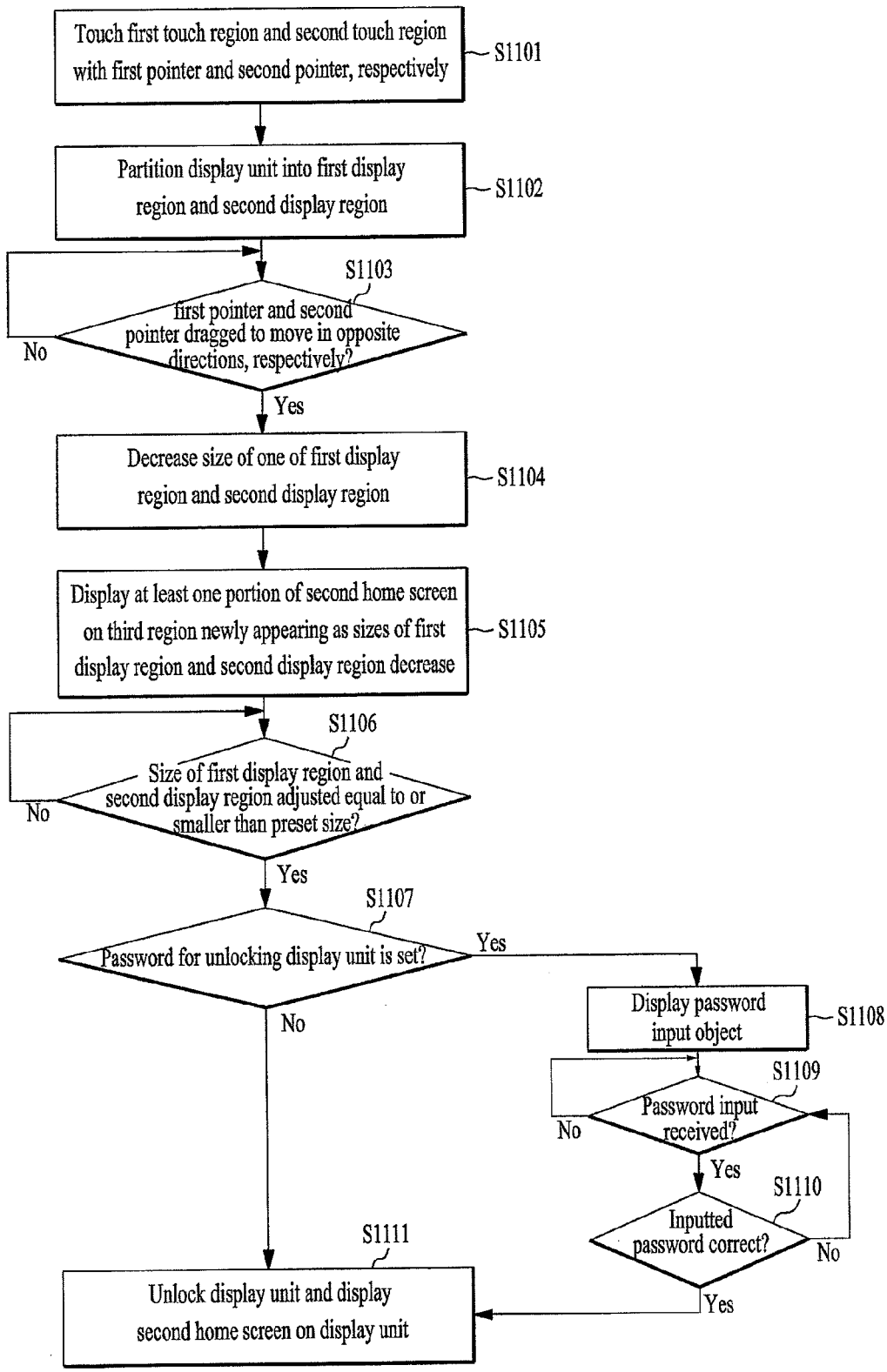
FIG. 11 is a flowchart illustrating an operation of a mobile terminal according to one embodiment of the present invention.

FIG. 11 is a flowchart illustrating an operation of the mobile terminal 100 according to one embodiment of the present invention. In particular, FIG. 11 relates to a method of unlocking the display unit 151 using two pointers. Referring to FIG. 11, if a first touch region and a second touch region of the display unit 151 are touched with a first pointer and a second pointer, respectively (S1101), the controller 180 can partition the display unit 151 into a first display region and a second display region (S1102). In this instance, the action of respectively touching the first touch region and second touch region of the display unit 151 with the first pointer and the second pointer may include one of i) that the second pointer touches the second touch region while the first pointer touches the first touch region, ii) that the first pointer touches the first touch region while the second pointer touches the second touch region, iii) that the first pointer and the second pointer touch the first touch region and the second touch region, respectively, and the like.

Figure 12:
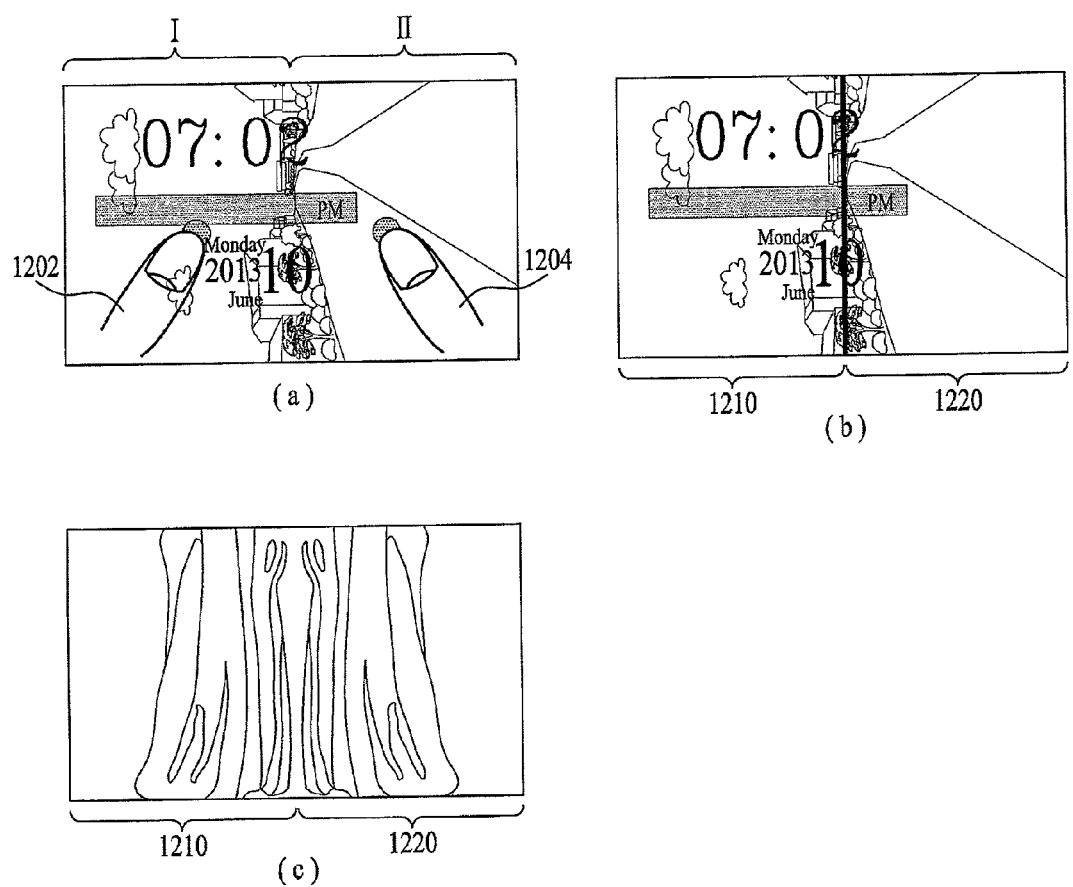
FIG. 12 is a diagram illustrating one example of partitioning a display unit into 2 display regions.

FIG. 12 is a diagram illustrating one example of partitioning the display unit 151 into two display regions. For clarity of the following description, assume that a first touch region I and a second touch region II are configured on a left part and a right part of the display unit 151, respectively. Referring to FIG. 12, if a first pointer 1202 and a second pointer 1204 touch the first touch region I and the second touch region II, respectively (FIG. 12(*a*)), the controller 180 can control the display unit 151 to be partitioned into two display regions 1210 and 1220 (FIG. 12(*b*)). In the example shown in FIG. 12(*b*), as the display unit 151 is divided into two equal parts, the two display regions 1210 and 1220 are configured.

When the display unit 151 is partitioned into the two display regions 1210 and 1220, a lock screen output through the display unit 151 is partitioned into two screens. For instance, a left part of the lock screen is displayed through the first display region 1210 and a right part of the lock screen can be displayed through the second display region 1220. In the following example mentioned later, if the first display region 1210 and the second display region 1220 are reduced in size due to drag movements of the first and second pointers, the size of information displayed through each of the first display region 1210 and the second display region 1220 is reduced as well.

Once the display unit 151 is partitioned into the two display regions 1210 and 1220, the controller 180 can control the partitioned two display regions 1210 and 1220 to be visually identifiable. For instance, like the example shown in FIG. 12(b), the controller 180 displays a boundary line, which discriminates the first display region 1210 from the second display region 1220, on a boundary between the first display region 1210 and the second display region 1220, thereby controlling the first display region 1210 and the second display region 1220 to become visually identifiable.

In another instance, like the example shown in FIG. 12(c), the controller 180 controls one of images configuring a pair of right and left images to be displayed through the first display region 1210 and also controls the other to be displayed through the second display region 1220, thereby controlling the first display region 1210 and the second display region 1220 to become visually identifiable. In particular, in the example shown in FIG. 12(c), a left part of a curtain is displayed on the first display region 1210 and a right part of the curtain is displayed on the second display region 1220.

In addition to the examples shown in FIG. 12(b) and FIG. 12(c), the controller 180 can display the first display region and the second display region in different colors or patterns, respectively. Therefore, the controller 180 can control the first display region and the second display region to become visually identifiable from each other.

Thereafter, as the first pointer currently touching the first touch region and the second pointer currently touching the second touch region are dragged in directions opposite to each other, if a spaced distance between the first pointer and the second pointer increases (Yes in S1103), the controller 180 can control at least one of the first display region and the second display region to be reduced in size (S1104). In particular, the controller 180 controls the size of the first display region to be reduced in proportion to a drag moving distance of the first pointer and also controls the size of the second display region to be reduced in proportion to a drag moving distance of the second pointer. Moreover, the controller 180 can control the first display region and the second display region to be reduced in size at the same rate with reference to a longer (or shorter) one of the drag moving distances of the first and second pointers.

As at least one of the first display region and the second display region is reduced in size, a third display region amounting to the reduced sizes of the first display region and the second display region can be newly displayed on the display unit 151. This is described in detail with reference to FIG. 13 as follows.

Figure 13:
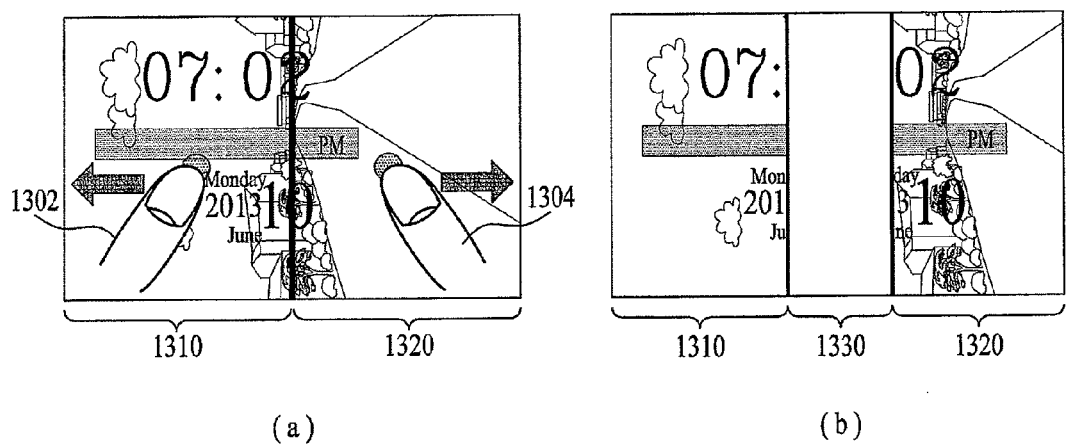
FIG. 13 is a diagram illustrating one example of newly exposing a third display region if a size of at least one of a first display region and a second display region is reduced.

FIG. 13 is a diagram illustrating one example of newly exposing a third display region if a size of at least one of a first display region and a second display region is reduced. Like the example shown in FIG. 13(a), if a first pointer 1302 and a second pointer 1304 are dragged in opposite directions, respectively, the controller 180 can control a size of a first display region 1310 to be reduced along a moving direction of the first pointer 1302 and can also control a size of a second display region 1320 to be reduced along a moving direction of the second pointer 1304.

If the first display region 1310 and the second display region 1320 are reduced in size, like the example shown in FIG. 13(b), a third display region 1330 amounting to a sum of the reduced sizes of the first display region 1310 and the second display region 1320 can newly appear on the display unit 151. If a moving distance of at least one of the first pointer and the second pointer becomes equal to or greater than a preset moving distance or a size of at least one of the first display region and the second display region becomes equal to or smaller than a preset size (Yes in S1106), the controller 180 can display a second home screen or a password input object to the displayed depending on whether a password for unlocking the display unit 151 is set.

In particular, if the password for unlocking the display unit 151 is not set (No in S1107), the controller 180 unlocks the display unit 151 and can display the second home screen (S1111). In particular, the controller 180 stops displaying the first display region and the second display region, extends the third display region to a full region of the display unit 151, and can display the second home screen through the third display region.

Otherwise, if the password for unlocking the display unit 151 is set (Yes in S1107), the controller 180 can display a password input object before the second home screen is output (S1108). As mentioned in the foregoing description of Embodiment 1, in accordance with a type of the set password, the password input object can include a plurality of objects for a pattern input, a virtual keypad for a numeral or text input, a fingerprint input window for receiving an input of a fingerprint, a preview image input from a camera, a voice input window for guiding a voice input, a quiz question and the like, of which details shall be omitted from the following description.

Figure 14A:
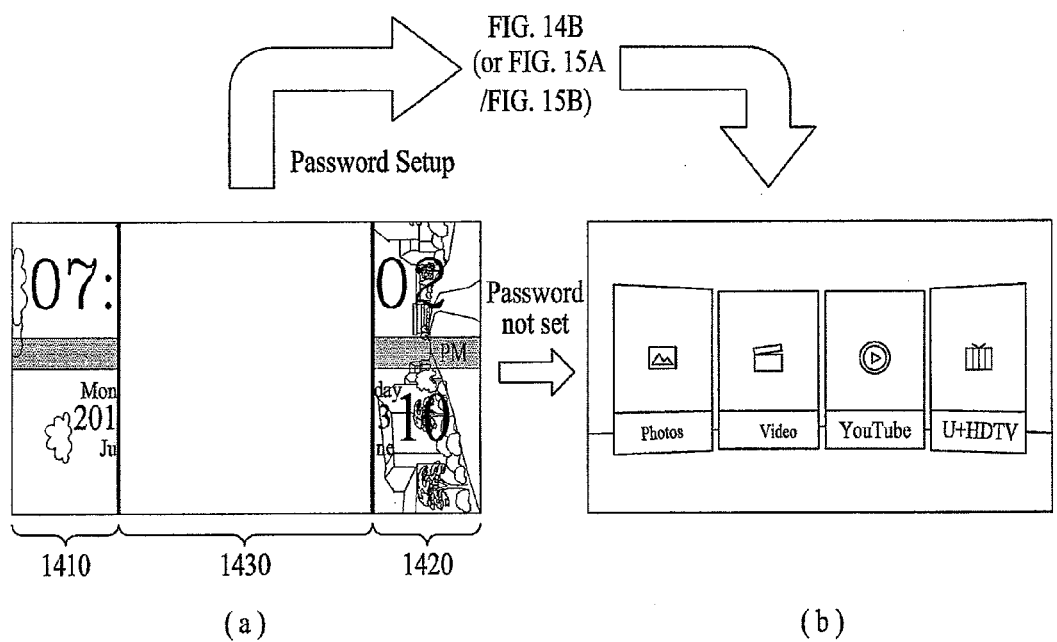
FIG. 14A and FIG. 14B are diagrams illustrating one example of displaying a second home screen as a display unit is unlocked.
Figure 14B:
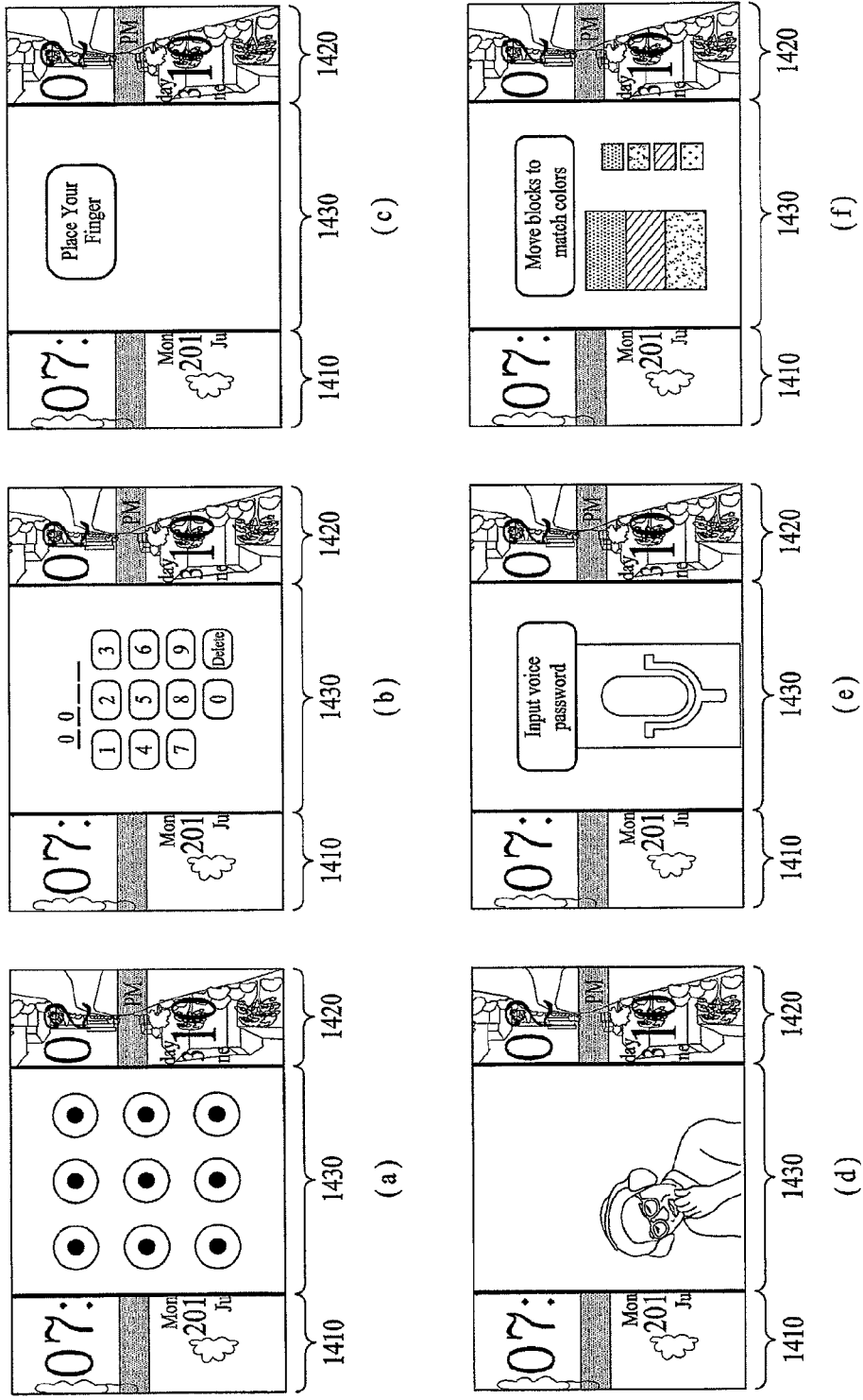

For instance, FIG. 14A and FIG. 14B are diagrams illustrating one example of displaying a second home screen as the display unit 151 is unlocked. Referring to FIG. 14A, if a size of at least one of a first display region 1410 and a second display region becomes equal to or smaller than a preset size and a password for unlocking the display unit 151 is not set (FIG. 14 (a)), the controller 180 displaying the first display region 1410 and the second display region 1420, extends a third display region 1430 to a full screen of the display unit 151, and can display a second home screen through the display unit 151.

Further, although a size of at least one of a first display region 1410 and a second display region becomes equal to or smaller than a preset size, if the password for unlocking the display unit 151 is set, like the example shown in FIGS. 14B (a) to 14B (f), the controller 180 can display a password input object. For instance, if the set password is a pattern password, like the example shown in FIG. 14B (a), the controller 180 can display a plurality of figure objects through the display unit to enable a user to draw a pattern before displaying the second home screen.

In the example shown in FIG. 14B (a), nine figure objects are displayed to enable a user to input a pattern password. A user can draw a pattern by connecting at least one or more of the nine figure objects to one another. Based on whether the pattern drawn through the nine figure objects matches a preset password, the controller 180 can determine whether to unlock the display unit 151. If the pattern drawn through the nine figure objects matches the preset password, the controller 180 unlocks the display unit 151 and can display the second home screen like the example shown in FIG. 14A (b).

If the set password is a PIN (personal identification number), like the example shown in FIG. 14B (b), the controller 180 can display a virtual keypad through the display unit 151 to enable a user to input numerals. If numerals are input through the virtual keypad, the controller 180 checks whether the input numerals matches the set password and can then determine whether to unlock the display unit 151. If the input numerals matches the preset password, the controller 180 unlocks the display unit 151 and can display the second home screen like the example shown in FIG. 14A (b). Moreover, if the set password includes a text, keys for inputting texts can be further included in the virtual keypad.

If the set password is a finger print, like the example shown in FIG. 14B (c), the controller 180 can display a fingerprint input window, which suggests a user to input a fingerprint. If a fingerprint recognition sensor is built in the display unit 151, the fingerprint input window may indicate a region on which a user should put user's finger for a fingerprint input. Further, if a fingerprint recognition sensor is configured separate from the display unit 151, the fingerprint input window may be provided to guide a user to put user's finger on the fingerprint recognition sensor. If a fingerprint is input, the controller 180 checks whether the input fingerprint matches the set password and can then determine whether to unlock the display unit 151. If the input fingerprint matches the preset password, the controller 180 unlocks the display unit 151 and can display the second home screen like the example shown in FIG. 14A (b).

If the set password is a user's face, like the example shown in FIG. 14B (d), the controller 180 can display an image input through a camera. As a result from analyzing the image input from the camera, if it is determined that the user's face set as the password is recognized, the controller 180 unlocks the display unit 151 and can display the second home screen like the example shown in FIG. 14A (b). A preview image shown in FIG. 14B (d) preferably includes an image input through the camera exposed from a front side of the mobile terminal so that a user can check an output of the display unit 151. Yet, it is a matter of course that an image input from a rear camera can be output as the preview image.

If the set password is an input of a voice corresponding to a preset text, like the example shown in FIG. 14B (e), the controller 180 can display a voice input window, which suggests to input a voice. If a user's voice is input through a microphone, the controller 180 analyzes the input voice, checks whether the input voice matches the set password, and can then determine whether to unlock the display unit 151. If the input voice matches the preset password, the controller 180 unlocks the display unit 151 and can display the second home screen like the example shown in FIG. 14A (b).

If the set password is a correct answer of a quiz, like the example shown in FIG. 14B (f), the controller 180 can display a quiz question. For instance, in the example shown in FIG. 14B (f), matching a displayed block to a mini-block of the same pattern is the quiz question. If a user solves the quiz correctly, the controller 180 unlocks the display unit 151 and can display the second home screen like the example shown in FIG. 14A (b).

In the examples shown in FIGS. 14B (a) to 14B (f), the password input object is displayed through the third display region 1430 that newly appears as the first display region 1410 and the second display region 1420 are reduced in size. Further, the controller 180 can display the password input object one of the first display region and the second display region. Alternatively, the controller 180 stops displaying the first display region and the second display region and also display the password input object on a whole region of the display unit.

Figure 15A:
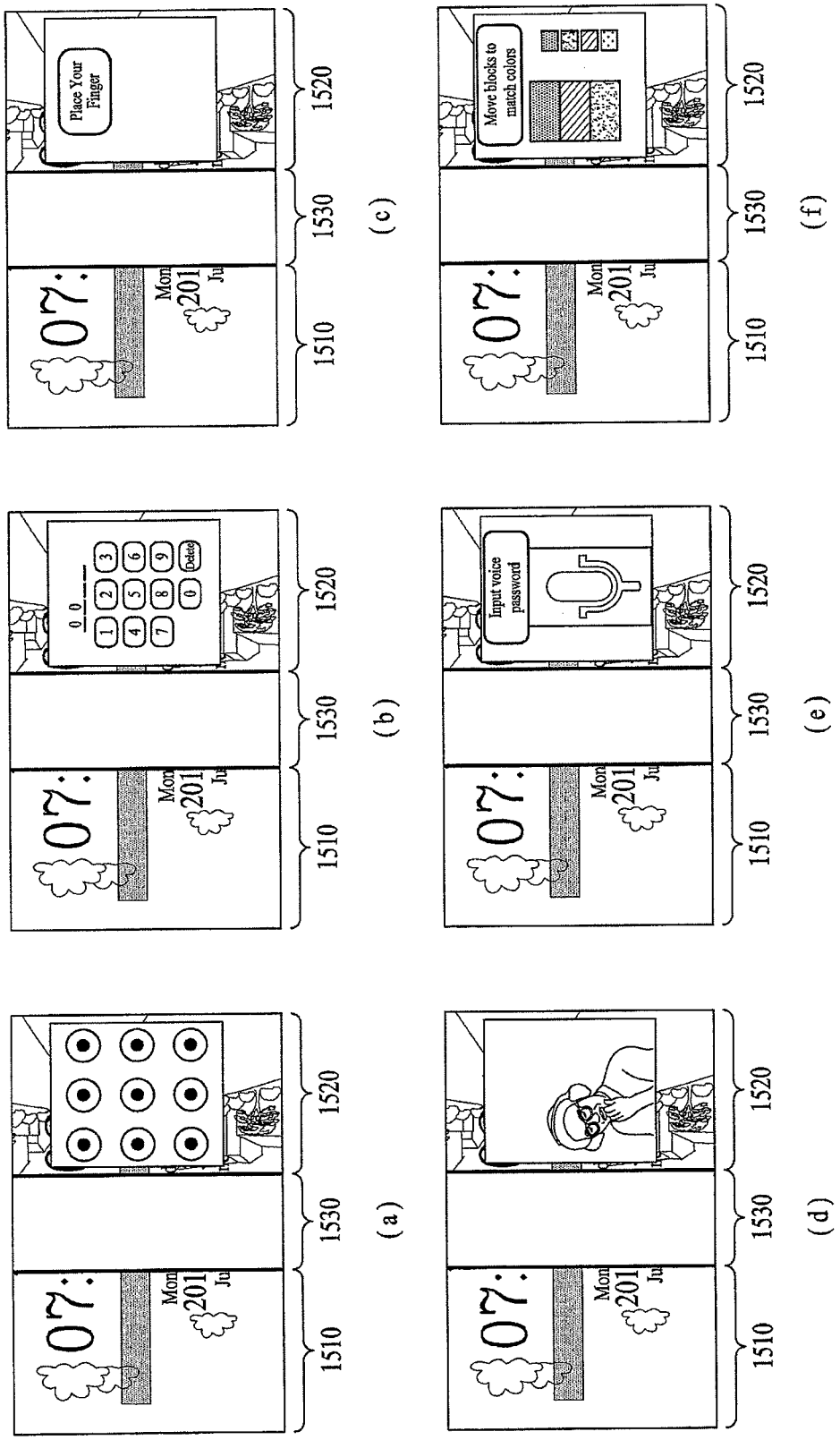

For instance, FIG. 15A and FIG. 15B are diagrams illustrating another example of displaying a password input object before a display unit is unlocked. Like the example shown in FIG. 15A, the controller 180 can display a password input object one of a first display region 1510 and a second display region 1520. Like the example shown in FIG. 15B, the controller 180 stops displaying the first display region and the second display region and also display the password input object on a whole region of the display unit. If a condition for unlocking the display unit 151 is met, the controller 180 can control a feedback, which indicates that the display unit 151 is unlocked, to be output.

For instance, while the password for unlocking the display unit 151 is not set, in one of a case that a moving distance of at least one of a first pointer and a second pointer becomes equal to or greater than a preset moving distance, a case that a size of at least one of the first display region and the second display region becomes equal to or smaller than a preset size, a case that a user input matching the password for unlocking the display unit 151 is received through the password input object, and the like, the controller 180 can control the feedback, which indicates that the display unit 151 is unlocked, to be output. Thus, a type of the feedback may include at least one of vibration, sound and LED flicker.

In the example shown in FIG. 11, if the first pointer touches the first touch region and the second pointer touches the second touch region, the display unit 151 is partitioned into the first display region and the second display region. Further, from the timing point of dragging to move the first pointer and the second pointer in directions opposite to each other, respectively, the controller 180 can control the display unit to be partitioned into the first display region and the second display region. Although FIG. 14A and FIG. 14B show the example that the mobile terminal 100 is in landscape mode, the present embodiment can apply to when the mobile terminal 100 is in a portrait mode as well.

Embodiment 2-1

As mentioned in the foregoing description with reference to FIG. 13, as a first pointer and a second pointer move in opposite directions, respectively, if a first display region and a second display region are reduced in size, a third display region amounting to a sum of the reduced portions of the first display region and the second display region can newly appear. In this instance, the controller 180 can display at least one portion of a second home screen or at least one portion of a password input object through the newly appearing third display region.

Figure 16A:
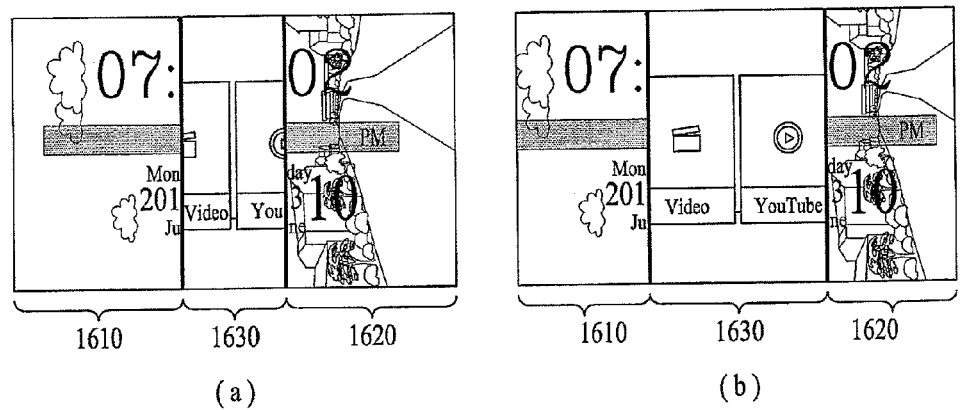
FIG. 16A and FIG. 16B are diagrams illustrating one example of displaying at least one portion of a second home screen or a password input object on a third display region.
Figure 16B:
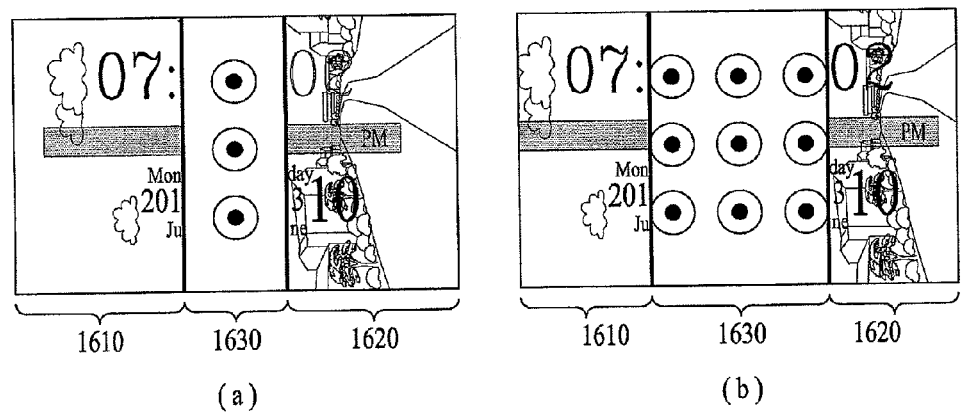

For instance, FIG. 16A and FIG. 16B are diagrams illustrating one example of displaying at least one portion of a second home screen or a password input object on a third display region. In particular, FIG. 16A shows one example that at least one portion of a second home screen is displayed. In addition, FIG. 16B shows one example that at least one portion of a password input object is displayed. For clarity of the following description with reference to FIG. 16B, assume that the password input object includes nine figure objects configured to draw a pattern.

Referring to FIG. 16A, while a password for unlocking the display unit 151 is not set, as a first display region 1610 and a second display region 1620 are reduced in size, if a third display region 1630 newly appears (or is newly exposed), like the example shown in FIG. 16A (a), the controller 180 can display at least one portion of a second home screen on the newly appearing third display region 1630. As the first display region 1610 and the second display region 1620 are further reduced in size, if a size of the third display region 1630 further increases, like the example shown in FIG. 16A (b), more portions of the second home screen can be displayed on the third display region 1630.

While a password for unlocking the display unit 151 is set, as a first display region 1610 and a second display region 1620 are reduced in size, if a third display region 1630 newly appears (or is newly exposed), like the example shown in FIG. 16B (a), the controller 180 can display at least one portion of a password input object on the newly appearing third display region 1630. As the first display region 1610 and the second display region 1620 are further reduced in size, if a size of the third display region 1630 further increases, like the example shown in FIG. 16B (b), more portions of the password input object can be displayed on the third display region 1630.

In the similar vein, if a first display region and a second display region are touched with a first pointer and a second pointer, respectively, the controller 180 controls a second home screen or a password input object to be unclearly displayed across the first display region and the second display region. As the first display region and the second display region are reduced in size, if a third display region newly appears, the controller 180 can control at least one portion of the second display region to be clearly displayed through the third display region.

Figure 17A:
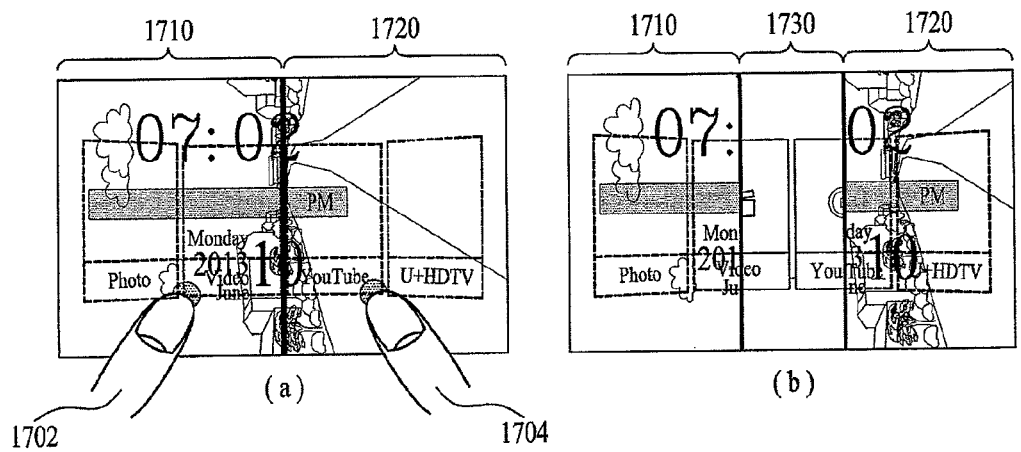
FIG. 17A and FIG. 17B are diagrams illustrating one example of clearly displaying a second home screen and at least one portion of a password input object on a third display region.
Figure 17B:
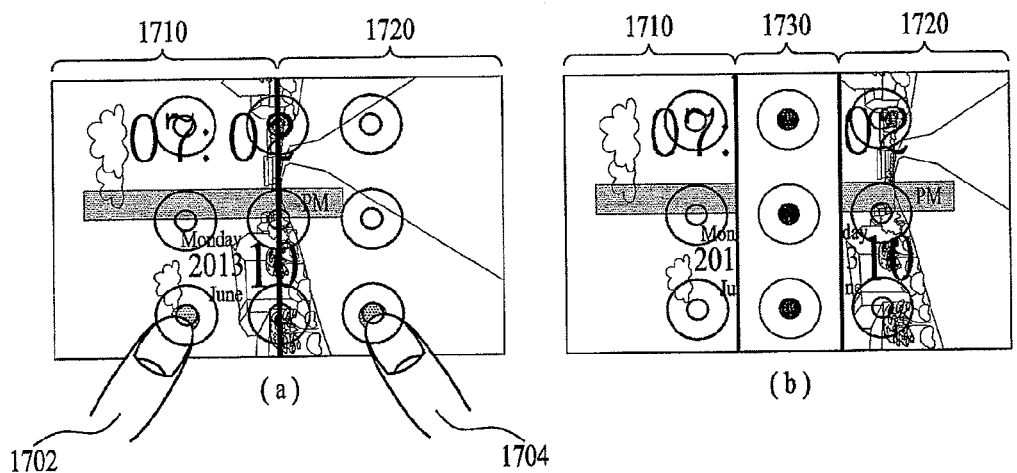

For instance, FIG. 17A and FIG. 17B are diagrams illustrating one example of clearly displaying a second home screen and at least one portion of a password input object on a third display region. For clarity of the description with reference to FIG. 17B, assume that a password input object includes nine figure objects configured to receive a password input object pattern.

Referring to FIG. 17A, while a password for unlocking the display unit 151 is not set, if a first touch region and a second touch region are touched with a first pointer 1702 and a second pointer 1704, respectively, like the example shown in FIG. 17A (a), the controller 180 partitions the display unit 151 into a first display region 1710 and a second display region 1720, respectively, and can display a second home screen unclearly across the first display region 1710 and the second display region 1720.

In particular, the controller 180 can control the second home screen to be unclearly displayed by semi-transparently displaying a lock screen displayed through the first display region 1710 and the second display region 1720 and overlapping the semitransparent lock screen and the second home screen. Thereafter, if the first pointer 1702 and the second pointer 1704 are dragged to move in directions opposite to each other, respectively, like the example shown in FIG. 17A (b), the controller 180 can control the semi-transparent lock screen to gradually disappear along the first display region 1710 and the second display region 1720 and can also control at least one portion of the second home screen to be clearly displayed through a newly appearing third display region 1730.

Further, referring to FIG. 17B, while a password for unlocking the display unit 151 is set, if a first touch region and a second touch region are touched with a first pointer 1702 and a second pointer 1704, respectively, like the example shown in FIG. 17B (a), the controller 180 partitions the display unit 151 into a first display region 1710 and a second display region 1720, respectively, and can display a password input object unclearly across the first display region 1710 and the second display region 1720. In particular, the controller 180 can control the password input object to be unclearly displayed by semi-transparently displaying a lock screen displayed through the first display region 1710 and the second display region 1720 and overlapping the semitransparent lock screen and the password input object each other.

Thereafter, if the first pointer 1702 and the second pointer 1704 are dragged to move in directions opposite to each other, respectively, like the example shown in FIG. 17B (b), the controller 180 can control the semi-transparent lock screen to gradually disappear along the first display region 1710 and the second display region 1720 and can also control at least one portion of the password input object to be clearly displayed through a newly appearing third display region 1730.

As a spaced distance between a first pointer and a second pointer increases, the mobile terminal 100 according to an embodiment of the present invention can control a display method in a third display region to be changed. For instance, as the first pointer and the second pointer are dragged to move in opposite directions, respectively, if the spaced distance between the first pointer and the second pointer increases more, the controller 180 can control resolution or brightness of a second home screen or a password input object, which is output through the third display region, to increase gradually.

In the foregoing examples described with reference to FIG. 16A, FIG. 16B, FIG. 17A and FIG. 17B, the information output through the display unit 151 is changed depending on whether a password for unlocking the display unit 151 is set. For instance, in the examples shown in FIG. 16A and FIG. 16B, one of the second home screen and the password input object is selectively displayed through the third display region depending on whether the password for unlocking the display unit 151 is set. In addition, in the examples shown in FIG. 17A and FIG. 17B, one of the second home screen and the password input object can be unclearly displayed depending on whether the password for unlocking the display unit 151 is set.

Unlike the former description with reference to FIG. 16B, although the password for unlocking the display unit 151 is set, the mobile terminal 100 according to an embodiment of the present invention can display a portion of the second home screen through the third display region. Unlike the former description with reference to FIG. 17B, if the first touch region is touched with the first pointer and the second touch region is touched with the second pointer, although the password for unlocking the display unit 151 is set, the controller 180 can control the second home screen to be output unclearly instead of the password input object. Thus, an image, which will be output when the display unit 151 is unlocked owing to an input of a correct password, can be guided to a user. Yet, before the second home screen is dully displayed on the display unit 151, as mentioned in the description of Embodiment 2, a screen for inputting a password for unlocking the display unit 151 should be displayed. Although FIG. 16A, FIG. 16B, FIG. 17A and FIG. 17B show the examples that the mobile terminal 100 is in landscape mode, the present embodiment can apply to a case that the mobile terminal 100 is in portrait mode as well.

Embodiment 2-2

The controller 180 discriminates unlocking the display unit 151 of the mobile terminal 100 in landscape mode from unlocking the display unit 151 of the mobile terminal 100 in portrait mode. When the display unit 151 is unlocked during the landscape mode, the controller 180 can display a second home screen. When the display unit 151 is unlocked during the portrait mode, the controller 180 can display a third home screen.

Figure 18A:
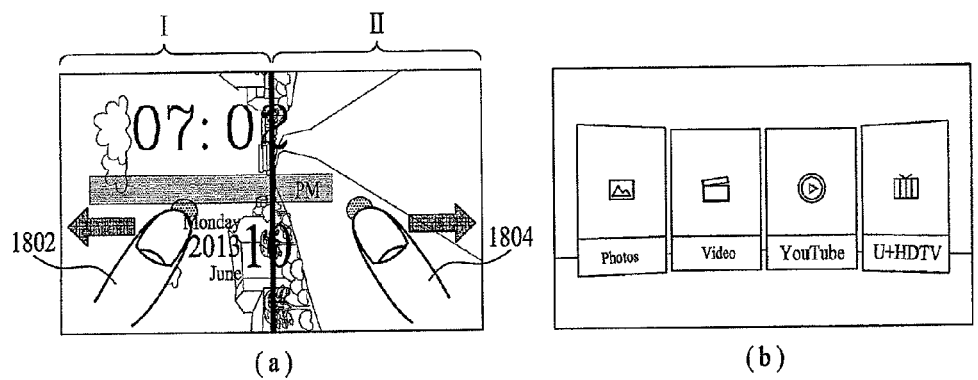
FIG. 18A and FIG. 18B are diagrams illustrating one example of displaying a different home screen per operation mode of a mobile terminal.
Figure 18B:
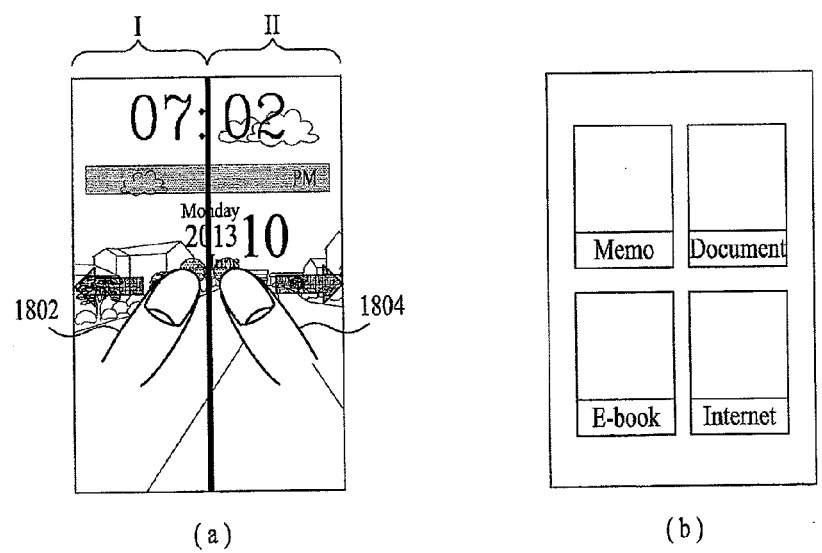

For instance, FIG. 18A and FIG. 18B are diagrams illustrating one example of displaying a different home screen per operation mode of the mobile terminal 100. For clarity of the following description, a password for unlocking the display unit 151 is not set. In particular, FIG. 18A is a diagram illustrating one example of unlocking when the mobile terminal 100 operates in landscape mode and FIG.

18B is a diagram illustrating one example of unlocking when the mobile terminal 100 operates in portrait mode.

Referring to FIG. 18A, when the mobile terminal 100 operates in landscape mode, like the example shown in FIG. 18A (a), the controller 180 can configure a first touch region I and a second touch region II on a left side and a right side of the display unit 151, respectively. After the first touch region I and the second touch region II have been touched with a first pointer 1802 and a second pointer 1804, respectively, as the first pointer 1802 and the second pointer 1804 are dragged to move in opposite directions, respectively, if a distance between the first pointer 1802 and the second pointer 180 increases, like the example shown in FIG. 18A (b), the controller 180 can unlock the display unit 151 and can also display a second home screen.

Further, Referring to FIG. 18B, when the mobile terminal 100 operates in a portrait mode, like the example shown in FIG. 18B (a), the controller 180 can configure a first touch region I and a second touch region II on a left side and a right side of the display unit 151, respectively. After the first touch region I and the second touch region II have been touched with a first pointer 1802 and a second pointer 1804, respectively, as the first pointer 1802 and the second pointer 1804 are dragged to move in opposite directions, respectively, if a distance between the first pointer 1802 and the second pointer 180 increases, like the example shown in FIG. 18B (b), the controller 180 can unlock the display unit 151 and can also display a third home screen.

For clarity of the description, in FIG. 18A and FIG. 18B, it is assumed that a password for unlocking the display unit 151 is not set. However, if a password for unlocking the display unit 151 is set, a password input object may be displayed before the second or third home screen is displayed. Moreover, based on a sensing signal of the sensing unit 140 configured to sense an inclination of the mobile terminal 100, the controller 180 can control the display unit 151 to operate in one of a landscape mode and a portrait mode.

Embodiment 2-3

The mobile terminal 100 can change a screen, which is to be output, in accordance with a spaced distance between a first pointer initially touching a first touch region and a second pointer initially touching a second touch region while unlocking the display unit 151. For instance, if a spaced distance between a first pointer initially touching a first touch region and a second pointer initially touching a second touch region is shorter than a prescribed threshold, the controller 180 can control a second home screen to be output while unlocking the display unit.

If a spaced distance between a first pointer initially touching a first touch region and a second pointer initially touching a second touch region is longer than the prescribed threshold, the controller 180 unlocks the display unit and can also control a fourth home screen to be output. For instance, FIG. 19A and FIG. 19B are diagrams illustrating one example of outputting a second home screen and one example of outputting a fourth home screen, respectively.

Figure 19A:
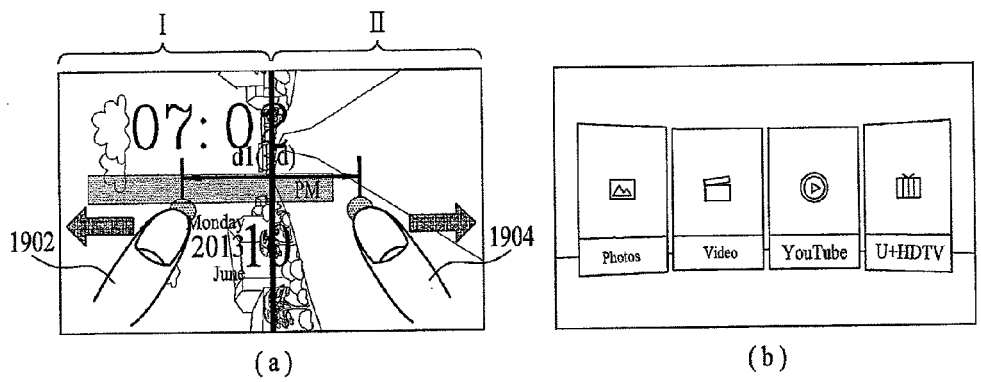
FIG. 19A and FIG. 19B are diagrams illustrating one example of outputting a second home screen and one example of outputting a fourth home screen, respectively.

Like the example shown in FIG. 19A (a), a spaced distance d1 between a first pointer 1902 initially touching a first touch region I and a second pointer 1904 initially touching a second touch region II may be smaller than a prescribed threshold d. Thereafter, as the first pointer 1902 and the second pointer 1904 are moved in opposite directions, respectively, if a spaced distance of at least one of the first pointer 1902 and the second pointer 1904 becomes equal to or greater than a prescribed distance or a size of at least one of the first display region and the second display region becomes equal to or smaller than a prescribed size, like the example shown in FIG. 19A (b), the controller 180 unlocks the display unit 151 and can also control a second home screen to be output.

Figure 19B:
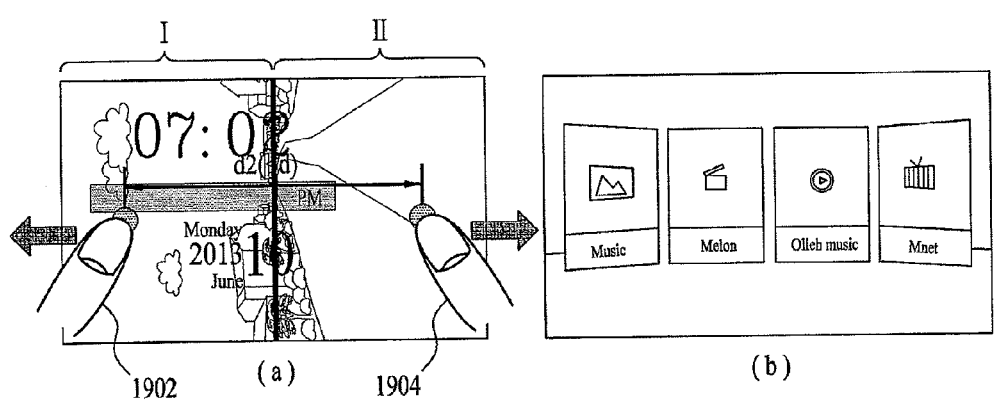

Like the example shown in FIG. 19B (a), a spaced distance d1 between a first pointer 1902 initially touching a first touch region I and a second pointer 1904 initially touching a second touch region II may be equal to or greater than a prescribed threshold d. Thereafter, as the first pointer 1902 and the second pointer 1904 are moved in opposite directions, respectively, if a spaced distance of at least one of the first pointer 1902 and the second pointer 1904 becomes equal to or greater than a prescribed distance or a size of at least one of the first display region and the second display region becomes equal to or smaller than a prescribed size, like the example shown in FIG. 19B (b), the controller 180 unlocks the display unit 151 and can also control a fourth home screen to be output.

For clarity of the description, in FIG. 19A and FIG. 19B, it is assumed that a password for unlocking the display unit 151 is not set. Yet, if a password for unlocking the display unit 151 is set, a password input object may be displayed before the second or fourth home screen is displayed. Although FIG. 19A and FIG. 19B show the examples that the mobile terminal 100 is in landscape mode, the present embodiment can apply to a case that the mobile terminal 100 is in portrait mode as well.

Embodiment 2-4

According to Embodiment 2 and its subordinate embodiments (i.e., Embodiment 2-1, Embodiment 2-2, Embodiment 2-3), a pattern, a text, a fingerprint, a user's face, a user's voice, a puzzle (or quiz) and the like can be set as the passwords for unlocking the display unit 151 for example. According to one embodiment of the present invention, touch positions on first and second touch regions, touch traces on the first and second touch regions and the like can be set as passwords for unlocking the display unit 151. When the touch positions on first and second touch regions or the touch traces on the first and second touch regions are set as the password for unlocking the display unit 151, the display unit 151 can be unlocked by only applying appropriate touch inputs to the first touch region and the second touch region using a first pointer and a second pointer, respectively. Hence, before unlocking the display unit 151, it can skip the step S1108 of displaying the password input object for unlocking the display unit 151.

Figure 20:
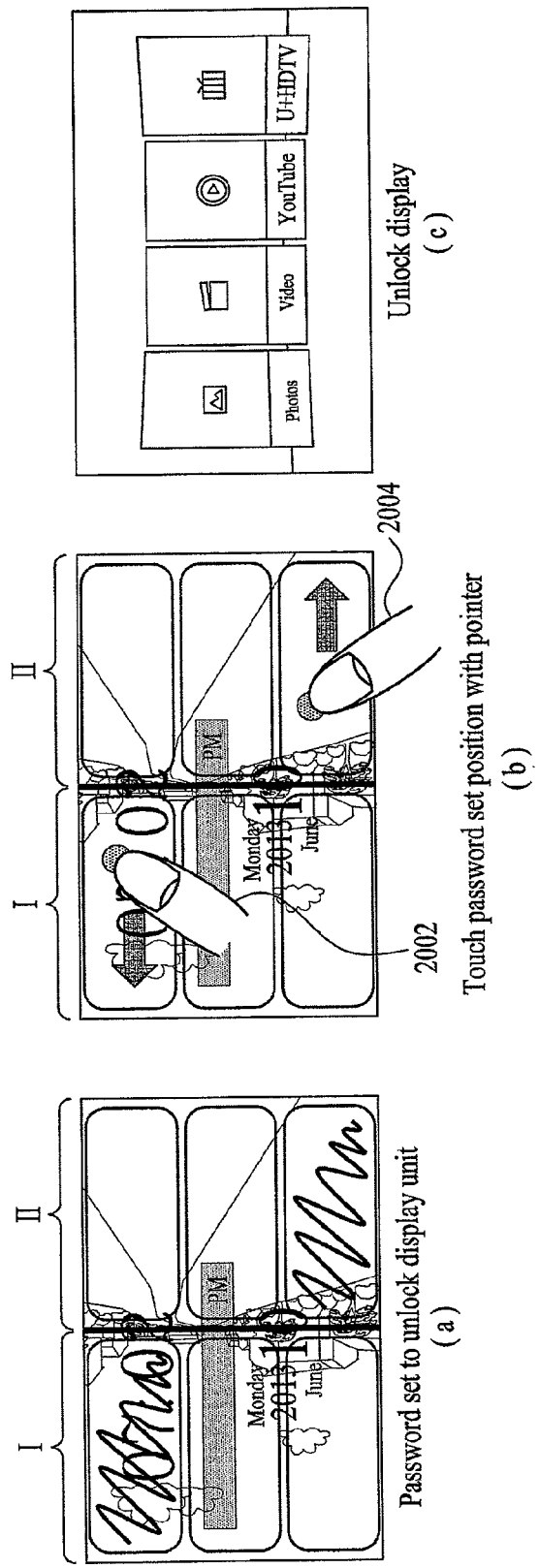
FIG. 20 is a diagram illustrating one example of an operation of a mobile terminal if a touch position on a first touch region and a touch position on a second touch region are set as a password.

For instance, FIG. 20 is a diagram illustrating one example of an operation of a mobile terminal if a touch position on a first touch region and a touch position on a second touch region are set as a password. Referring to FIG. 20, in order to unlock the display unit 151, a first touch region I and a second touch region II can be touched with a first pointer 2002 and a second pointer 2004, respectively. In this instance, the controller 180 can determine whether touch positions of the first and second pointers 2002 and 2004 match a preset password.

For instance, like the example shown in FIG. 20(a), each of the first touch region I and the second touch region II is virtually partitioned into a top part, a middle part and a bottom part and an action of touching the top part of the first touch region I and the bottom part of the second touch region II can be set as a password. If the first touch region I is touched with the first pointer 2002 and the second touch region II is touched with the second pointer 2004, the controller 180 can determine whether the touch position of the first pointer 2002 and the touch position of the second pointer 2004 match the touch positions set as the password. For instance, like the example shown in FIG. 20(*b*), if the first pointer 2002 touches the top part of the first touch region I and the second pointer 2004 touches the bottom part of the second touch region II, the controller 180 can determine that the touch position of the first pointer 2002 and the touch position of the second pointer 2004 match the touch positions set as the password.

Thereafter, if a moving distance of at least one of the first pointer 2002 and the second pointer 2004 becomes equal to or greater than a preset moving distance or a size of at least one of the first display region and the second display region becomes equal to or smaller than a preset size, like the example shown in FIG. 20(*c*), the controller 180 unlocks the display unit 151 and can also control a second home screen to be output.

Figure 21:
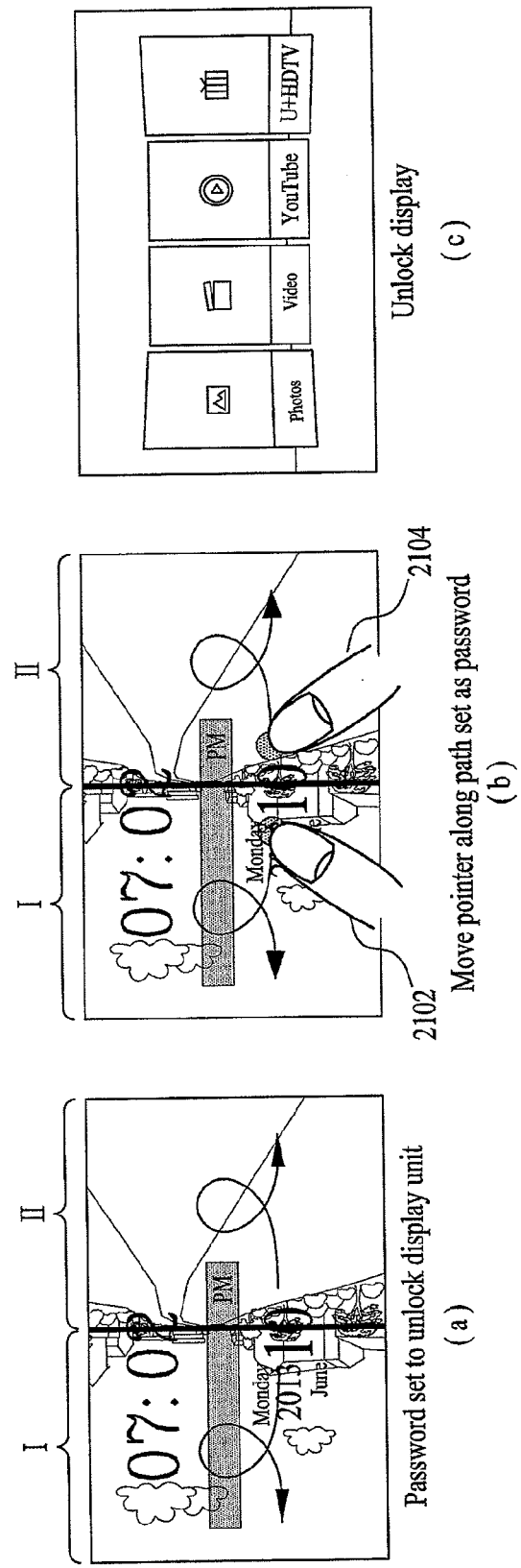
FIG. 21 is a diagram illustrating one example of an operation of a mobile terminal if a touch trace on a first touch region and a touch trace on a second touch region are set as a password.

In another instance, FIG. 21 is a diagram illustrating one example of an operation of a mobile terminal if a touch trace on a first touch region and a touch trace on a second touch region are set as a password. Referring to FIG. 21, in order to unlock the display unit 151, a first touch region I and a second touch region II can be touched with a first pointer 2002 and a second pointer 2004, respectively. Subsequently, if the first pointer 2002 and the second pointer 2004 are moved in opposite directions, respectively, the controller 180 can determine whether a touch trace of the first pointer 2102 and a touch trace of the second pointer 2004 match a preset password. For instance, like the example shown in FIG. 21(*a*), an action of drawing circular traces on the first touch region I and the second touch region II with pointers moving in opposite directions can be set as a password for unlocking the display unit 151.

If the first pointer 2102 touches the first touch region I and then moves along one prescribed trace and if the second pointer 2104 touches the second touch region II and then moves along another prescribed trace, the controller 180 can determine whether the moving traces of the first and second pointers 2102 and 2104 match a trace set as a password. For instance, like the example shown in FIG. 21(*b*), if the first pointer 2102 moves by drawing a circle in a left direction and the second pointer 2104 moves by drawing a circle in a right direction, the controller 180 can determine that the moving traces of the first and second pointers 2102 and 2104 match the touch trace set as the password. Thereafter, like the example shown in FIG. 21(*c*), the controller 180 unlocks the display unit 151 and can also control a second home screen to be output.

According to the example shown in FIG. 21, the touch traces set as the password for unlocking the display unit 151 are configured horizontally symmetric to each other, by which the present invention is non-limited. For instance, the touch traces set as the password for unlocking the display unit 151 can include an action of drawing a straight line on the first touch region I and an action of drawing a circle on the second touch region II. Like the examples shown in FIG. 20 and FIG. 21, although a password for unlocking the display unit 151 has been set already, if a password can be directly input onto the first touch region and the second touch region, it can skip the step of displaying the password input object.

Embodiment 2-5

According to Embodiment 2 in the foregoing description, if a password for unlocking the display unit 151 is already set, a password input object is displayed before displaying a second home screen. In particular, according to the examples described with reference to FIG. 14B (*c*), FIG. 15A (*c*) and FIG. 15B (*c*), if a set password includes a fingerprint, a fingerprint input window can be displayed to suggest a user to input a fingerprint. Unlike the foregoing description, if a fingerprint recognition sensor is built in the display unit 151, it can skip the step of displaying a fingerprint input window.

For instance, in order to unlock the display unit 151, if a first touch region is touched with one finger and a second touch region is touched with another finger, the controller 180 receives an input of a fingerprint from at least one of the two fingers currently touching the display unit 151 and can then determine whether the input fingerprint matches a preset password. Thus, the controller 180 can receive a fingerprint through one of the first touch region and the second touch region or may receive fingerprints through both of the first touch region and the second touch region. In order to input a fingerprint, a user may need to fix a finger onto the display unit 151 momentarily without movement. However, the user is unable to accurately recognize how long the finger should be fixed without movement. Hence, if the fingerprint input is completed, the controller 180 can output information, which indicates that the fingerprint input is complete.

Figure 22:
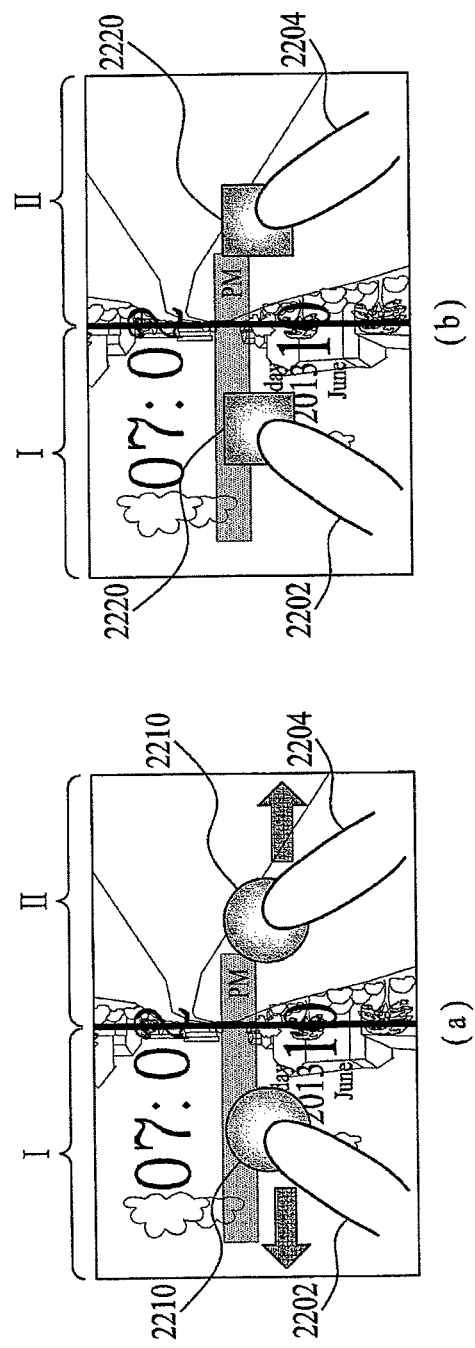
FIG. 22 is a diagram illustrating one example of displaying an indicator indicating that a fingerprint input is complete.

For instance, FIG. 22 is a diagram illustrating one example of displaying an indicator indicating that a fingerprint input is complete. Referring to FIG. 22, if a user touches a first touch region with one finger and also touches a second touch region with another finger, like the example shown in FIG. 22(*a*), the controller 180 can display a first indicator 2210 centering on each of the finger touched points. Subsequently, if a fingerprint input from at least one of the two fingers is complete, the controller 180 can control the first indicator 2210 to be changed into a second indicator 2220. In this instance, the first indicator 2210 and the second indicator 2220 may differ from each other in at least one of color, shape and size.

According to the examples shown in FIG. 22(*a*) and FIG. 22(*b*), a shape of the first indicator 2210 is circular and a shape of the second indicator 2220 is rectangular. If a user sees that the first indicator 2210 has changed into the second indicator 2220, the user can recognize that it is unnecessary to fix the fingers anymore owing to the completion of the fingerprint input. If the input fingerprint does not match the preset password, the controller 180 can change the first indicator into a third indicator. In this instance, the third indicator may differ from each of the first indicator and the second indicator in at least one of color, shape and size. Depending on whether the first indicator has been changed into the second indicator or the third indicator, the user may be able to recognize whether the input fingerprint matches the preset password.

Unlike the example shown in FIG. 22, the controller 180 outputs a popup window which indicates that a fingerprint is input, thereby informing a user that the fingerprint input is complete. If an input fingerprint is determined as matching a password and if a moving distance of at least one of two fingers respectively moving in opposite directions becomes equal to or smaller than a preset size or a size of at least one of a first display region and a second display region becomes equal to or smaller than a preset size, the controller 180 can display a second home screen. In another instance, if an input fingerprint is determined as a set password, the controller 180 can display a second home screen in direct.

Embodiment 2-6

First of all, according to the former example of Embodiment 2, if a password for unlocking the display unit 151 is set already, a password input object for receiving an input of a password from a user can be displayed before outputting a second home screen. In another example, the controller 180 can display a guide window, which indicates moving directions of first and second pointers, instead of a password input window. The controller 180 determines whether the first pointer and the second pointer are moving in the directions indicated by the guide window. If the first pointer and the second pointer are determined as moving in the directions indicated by the guide window, the controller 180 unlocks the display unit 151 and can also control a second home screen to be output.

Figure 23:
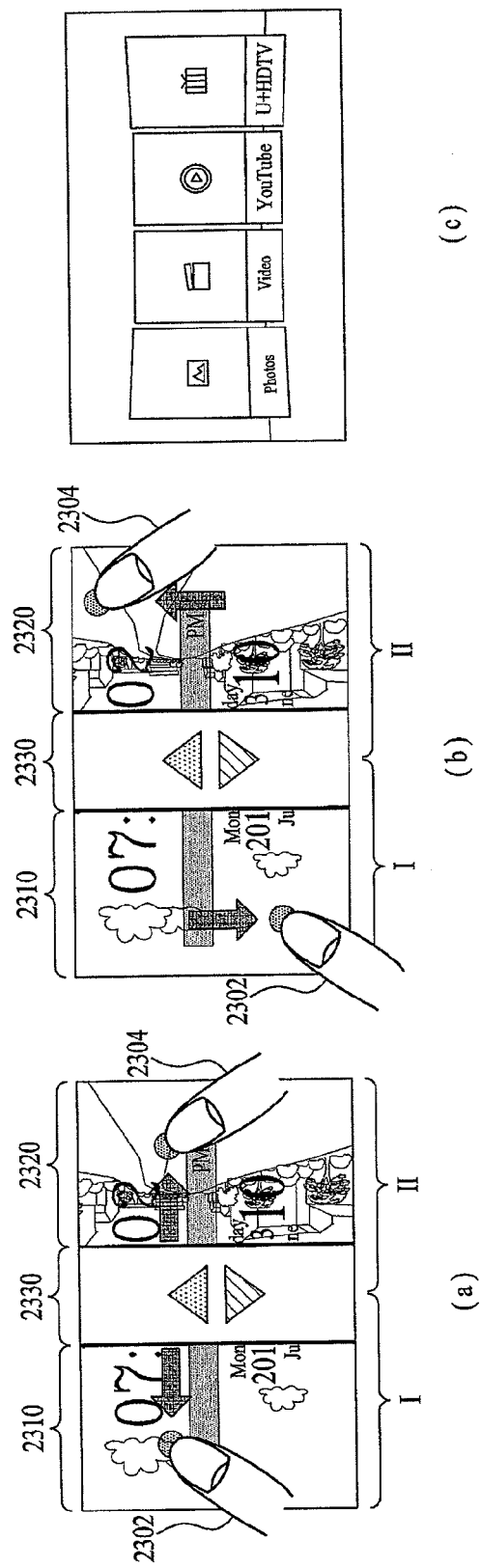
FIG. 23 is a diagram illustrating one example of an operation of a mobile terminal if a first pointer and a second pointer move in directions indicated by a guide window.

For instance, FIG. 23 is a diagram illustrating one example of an operation of a mobile terminal if a first pointer and a second pointer move in directions indicated by a guide window. If the first pointer and the second pointer move in directions opposite to each other, respectively, as mentioned in the foregoing description with reference to FIG. 13, a first display region and a second display region are reduced in size and a third display region can newly appear. Thus, the controller 180 can display a guide window, which indicates the moving directions of the first pointer and the second pointer, through the third display region.

For instance, FIG. 23(*a*) shows one example that top and bottom directions are indicated by the guide window. Thereafter, if the first pointer and the second pointer move in the directions indicated by the guide window, respectively, the controller 180 unlocks the display unit 151 and can also control a second home screen to be output. For instance, referring to FIG. 23(*b*), if one of the first pointer and the second pointer moves in the top direction indicated by the guide window and the other moves in the bottom direction indicated by the guide window, like the example shown in FIG. 23(*c*), the controller can control a second home screen to be output through the display unit 151.

Embodiment 3

Figure 24:
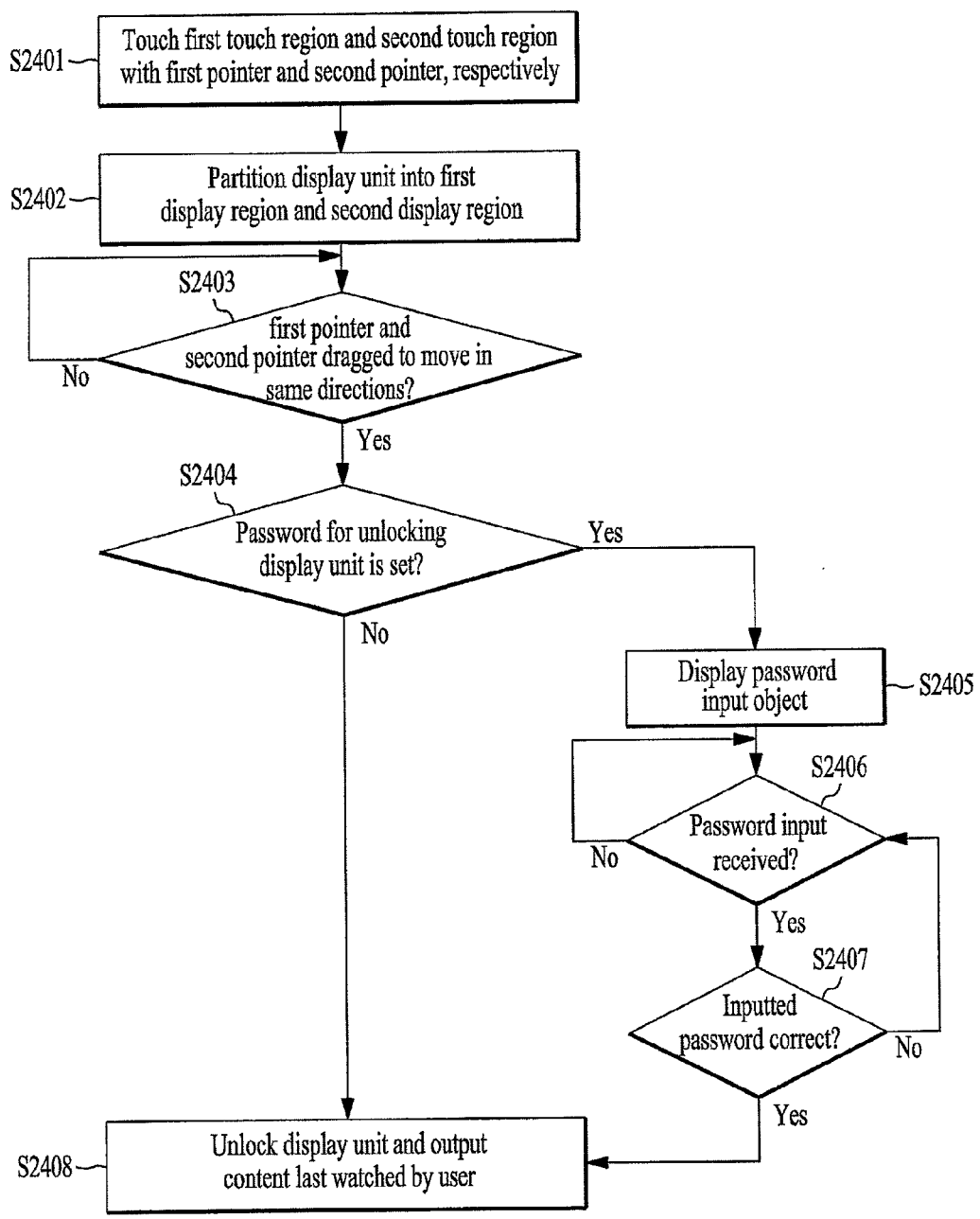
FIG. 24 is a flowchart illustrating an operation of a mobile terminal according to one embodiment of the present invention.

FIG. 24 is a flowchart illustrating an operation of the mobile terminal 100 according to one embodiment of the present invention. In particular, FIG. 24 relates to another method of unlocking the display unit 151 using two pointers. The method shown in FIG. 24 differs from the former unlocking method shown in FIG. 10 in that a first pointer and a second pointer are dragged to move by maintaining a spaced distance between the first pointer and the second pointer.

Like the example shown in FIG. 24, if a first touch region and a second touch region of the display unit 151 are touched with a first pointer and a second pointer, respectively (S2401), the controller 180 can control the display unit 151 to be partitioned into a first display region and a second display region (S2402). Subsequently, if the first pointer currently touching the first touch region and the second pointer currently touching the second touch region are dragged to move over a prescribed distance in the same direction in parallel with each other (S2403), the controller 180 can display a last watched content and a password input object depending on whether a password for unlocking the display unit 151 is set. In particular, if the password for unlocking the display unit 151 is not set (S2404), the controller 180 unlocks the display unit 151 and can display a content last watched by a user on the display unit 151 (S2408). In this instance, the content last watched by the user may include a video, a photo, a music, a document or the like, which was played last through the mobile terminal 100, before the display unit 151 is locked.

Further, if the password for unlocking the display unit 151 is set (S2404), the controller 180 can display a password input object before outputting the content last watched by the user (S2405). As mentioned in the foregoing description with reference to FIG. 1, in accordance with a type of the set password, the password input object can include a plurality of objects for a pattern input, a virtual keypad for a numeral or text input, a fingerprint input window for receiving an input of a fingerprint, a preview image input from a camera, a voice input window for guiding a voice input, a quiz question and the like, of which details shall be omitted from the following description.

Figure 25A:
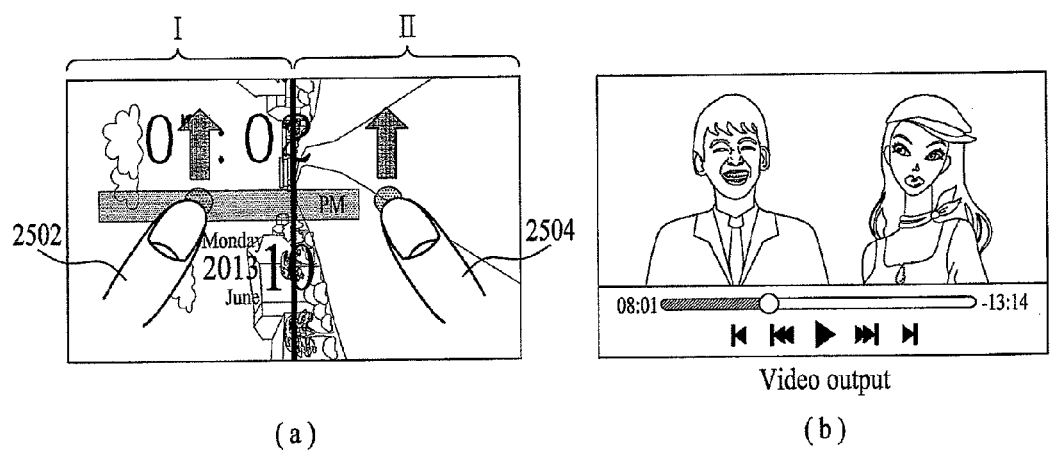

For instance, FIG. 25A and FIG. 25B are diagrams illustrating examples of unlocking the display unit 151 when a first pointer 2502 and a second pointer 2504 move in the same direction. Referring to FIG. 25A, if a first pointer 2502 currently touching a first touch region I and a second pointer 2504 currently touching a second touch region II move over a prescribed distance in a prescribed direction (e.g., a top direction in FIG. 25A (a)) and a password for unlocking the display unit 151 is not set (FIG. 25A (a)), the controller 180 unlocks the display unit 151 and can display a content last watched by a user (FIG. 25A (b)).

For example, if the content last watched by the user is a video, like the example shown in FIG. 25A (b), the controller 180 can control the video last watched by the user to be played through the display unit 151. In addition, the controller 180 can resume the play of the video in continuation with a play timing point corresponding to the play stop of the video last watched by the user. Further, although a first pointer 2502 currently touching a first touch region I and a second pointer 2504 currently touching a second touch region II move over a prescribed distance in a prescribed direction but a password for unlocking the display unit 151 is set, like the examples shown in FIG. 25B (a) to 25B (f), the controller 180 can display a password input object.

For instance, if the set password is a pattern password, like the example shown in FIG. 25B (a), the controller 180 can display a plurality of figure objects through the display unit to enable a user to draw a pattern before displaying the content last watched by the user. In the example shown in FIG. 25B (a), nine figure objects are displayed to enable a user to input a pattern password. A user can draw a pattern by connecting at least one or more of the nine figure objects to one another. Based on whether the pattern drawn through the nine figure objects matches a preset password, the controller 180 can determine whether to unlock the display unit 151. If the pattern drawn through the nine figure objects matches the preset password, the controller 180 unlocks the display unit 151 and can display the content last watched by the user like the example shown in FIG. 25A (b).

If the set password is a PIN (personal identification number), like the example shown in FIG. 25B (b), the controller 180 can display a virtual keypad through the display unit 151 to enable a user to input numerals. If numerals are input through the virtual keypad, the controller 180 checks whether the input numerals matches the set password and can then determine whether to unlock the display unit 151. If the input numerals matches the preset password, the controller 180 unlocks the display unit 151 and can display the content last watched by the user like the example shown in FIG. 25A (b). Moreover, if the set password includes a text, keys for inputting texts can be further included in the virtual keypad.

If the set password is a fingerprint, like the example shown in FIG. 25B (c), the controller 180 can display a fingerprint input window, which suggests a user to input a fingerprint. If a fingerprint is input, the controller 180 checks whether the input fingerprint matches the set password and can then determine whether to unlock the display unit 151. If the input fingerprint matches the preset password, the controller 180 unlocks the display unit 151 and can display the content last watched by the user like the example shown in FIG. 25A (b).

If the set password is a user's face, like the example shown in FIG. 25B (d), the controller 180 can display an image input through a camera. As a result from analyzing the image input from the camera, if it is determined that the user's face set as the password is recognized, the controller 180 unlocks the display unit 151 and can display the content last watched by the user like the example shown in FIG. 25A (b). A preview image shown in FIG. 25B (d) preferably includes an image input through the camera exposed from a front side of the mobile terminal so that a user can check an output of the display unit 151. However, an image input from a rear camera can be output as the preview image.

If the set password is an input of a voice corresponding to a preset text, like the example shown in FIG. 25B (e), the controller 180 can display a voice input window, which suggests to input a voice. If a user's voice is input through a microphone, the controller 180 analyzes the input voice, checks whether the input voice matches the set password, and can then determine whether to unlock the display unit 151. If the input voice matches the preset password, the controller 180 unlocks the display unit 151 and can display the content last watched by the user like the example shown in FIG. 25A (b).

If the set password is a correct answer of a quiz, like the example shown in FIG. 25B (f), the controller 180 can display a quiz question. For instance, in the example shown in FIG. 25B (f), matching a displayed block to a mini-block of the same pattern is the quiz question. If a user solves the quiz correctly, the controller 180 unlocks the display unit 151 and can display the content last watched by the user like the example shown in FIG. 25A (b). Although FIG. 25A and FIG. 25B show the example that the mobile terminal 100 is in landscape mode, the present embodiment can apply to a case that the mobile terminal 100 is in portrait mode as well.

Embodiment 3-1

Figure 26A:
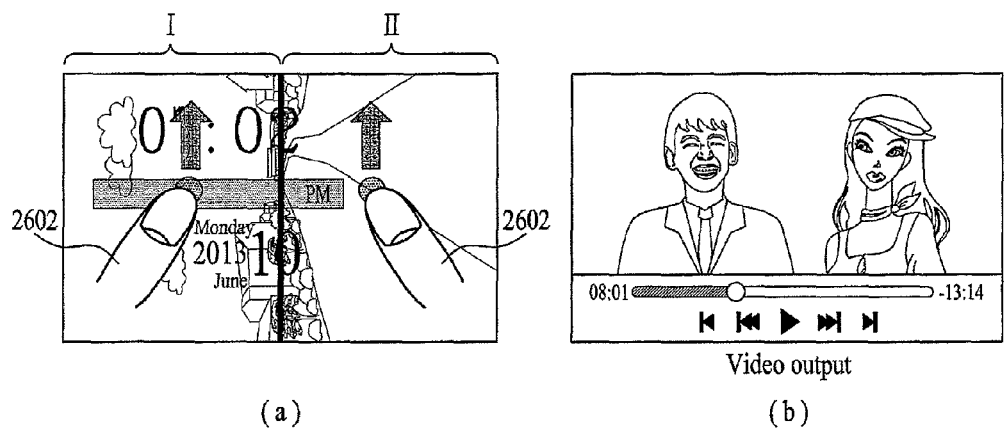
FIG. 26A and FIG. 26B are diagrams to describe examples of varying a type of a displayed content depending on a moving direction of first and second pointers.
Figure 26B:
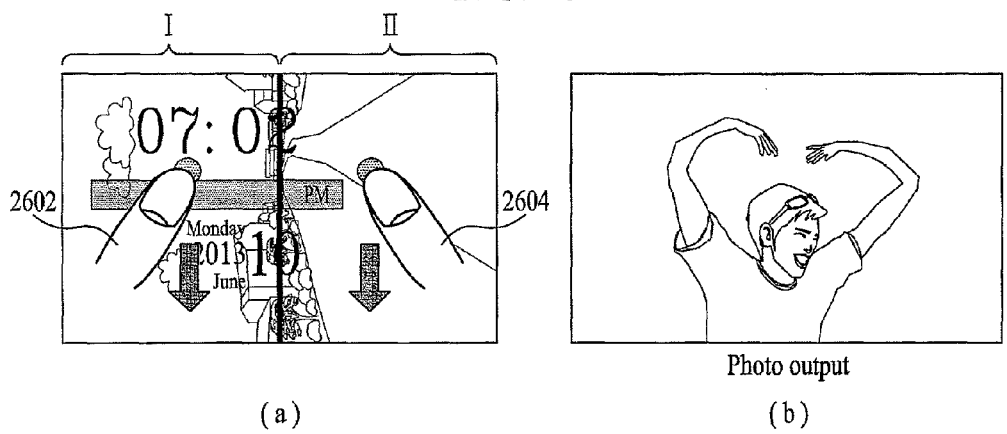

The mobile terminal 100 according to an embodiment of the present invention can determine a type of a content to display in accordance with moving directions of first and second pointers. This is described in detail with reference to FIG. 26A and FIG. 26B as follows. In particular, FIG. 26A and FIG. 26B are diagrams illustrating examples of varying a type of a displayed content depending on a moving direction of first and second pointers. Like the example shown in FIG. 26A (a) and FIG. 26A (b), when a first pointer and a second pointer move in a first direction (e.g., a top direction) over a prescribed distance, the controller 180 unlocks the display unit 151 and can control a video most recently watched by a user to be output. Further, like the example shown in FIG. 26B (a) and FIG. 26B (b), when a first pointer and a second pointer move in a first direction (e.g., a bottom direction) over a prescribed distance, the controller 180 unlocks the display unit 151 and can control a photo most recently watched by a user to be output.

In addition, if a password for unlocking the display unit 151 is set, a password input object for inputting a password can be output before outputting the content most recently watched by the user. In particular, when a first pointer and a second pointer move over a prescribed distance in the same direction, the mobile terminal 100 according to an embodiment of the present invention can determine a type of a content to display depending on the moving direction of the first and second pointers.

In the example shown in FIG. 24, if a first pointer and a second pointer touch a first touch region and a second touch region, respectively, the display unit 151 is partitioned into a first display region and a second display region. Further, the controller 180 can control the display unit to be partitioned into the first display region and the second display region from a timing point at which the first and second pointers start to be dragged to move in the same direction. Although FIG. 26A and FIG. 26B show the examples that the mobile terminal 100 is in landscape mode, the present embodiment can apply to a case that the mobile terminal 100 is in portrait mode as well.

Embodiment 3-2

The aforementioned Embodiment 2 (and its subordinate Embodiments 2-1 to 2-6) and Embodiment 3 (and its subordinate Embodiment 3-1) can simultaneously apply to the mobile terminal 100 according to an embodiment of the present invention. Thus, for user's input convenience, the controller 180 can control a first guide information, which guides a screen to be output in each moving direction of a pointer, to be displayed on the display unit 151.

Figure 27:
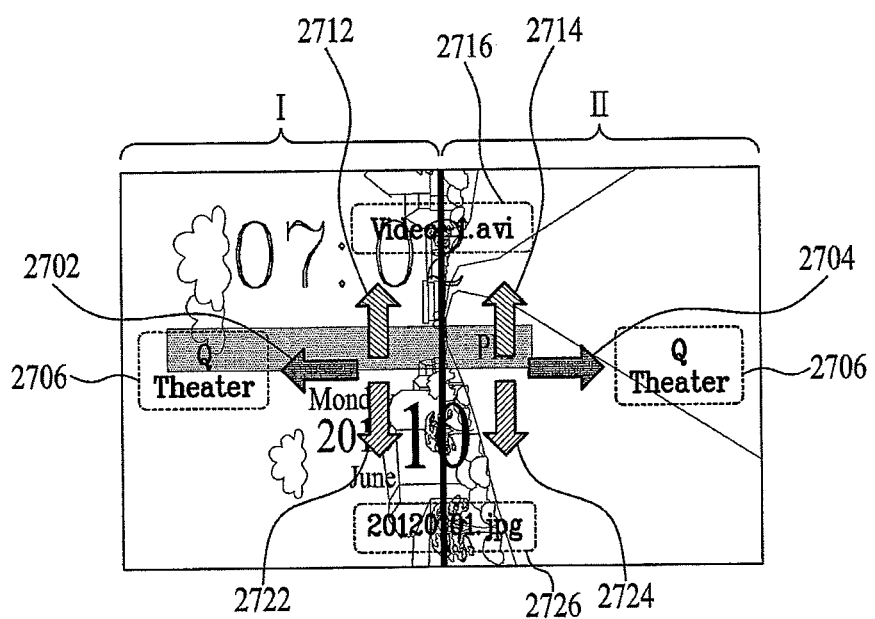
FIG. 27 is a diagram illustrating one example of displaying a first guide information on a display unit.

For instance, FIG. 27 is a diagram illustrating one example of displaying a first guide information on the display unit 151. In this instance, like the example shown in FIG. 27, the first guide information can include an arrow indicator configured to guide a moving direction of a pointer and a first preview information guiding a screen to be output in accordance with the moving direction of the pointer.

Referring to FIG. 27, a preview information is displayed to indicate that a second home screen named 'Q theater' 2706 can be output to correspond to a pair of arrow indicators 2702 and 2704 respectively facing left and right. In addition, a first preview information (e.g., a title of a video file, a thumbnail of a video file, etc.) is displayed to indicate a video 2716 most recently watched by a user to correspond to a pair of arrow indicators 2712 and 2714 facing top together. Moreover, a first preview information (e.g., a title of a photo file, a thumbnail of a photo file, etc.) is displayed to indicate a photo 2726 most recently watched by a user to correspond to a pair of arrow indicators 2722 and 2724 facing bottom together.

Meanwhile, the controller 180 discriminates a case that a spaced distance between a first pointer and a second pointer is equal to or greater than a prescribed distance from a case that a spaced distance between the first pointer and the second pointer is smaller than the prescribed distance (cf. Embodiment 2-3). If a spaced distance between the first pointer and the second pointer is smaller than the prescribed distance, the controller 180 can map a first preview information, which indicates that a second home screen can be output, to correspond to a pair of the arrow indicators 2702 and 2704 respectively facing left and right. If a spaced distance between the first pointer and the second pointer is equal to or greater than the prescribed distance, the controller 180 can map a first preview information, which indicates that a third home screen can be output, to correspond to a pair of the arrow indicators 2702 and 2704 respectively facing left and right.

The above-described first guide information may be displayed only if the first pointer and the second pointer currently touch a first touch region and a second touch region, respectively. Although FIG. 27 shows the example that the mobile terminal 100 is in landscape mode, the present embodiment can apply to when the mobile terminal 100 is in portrait mode as well.

Embodiment 4

Figure 28:
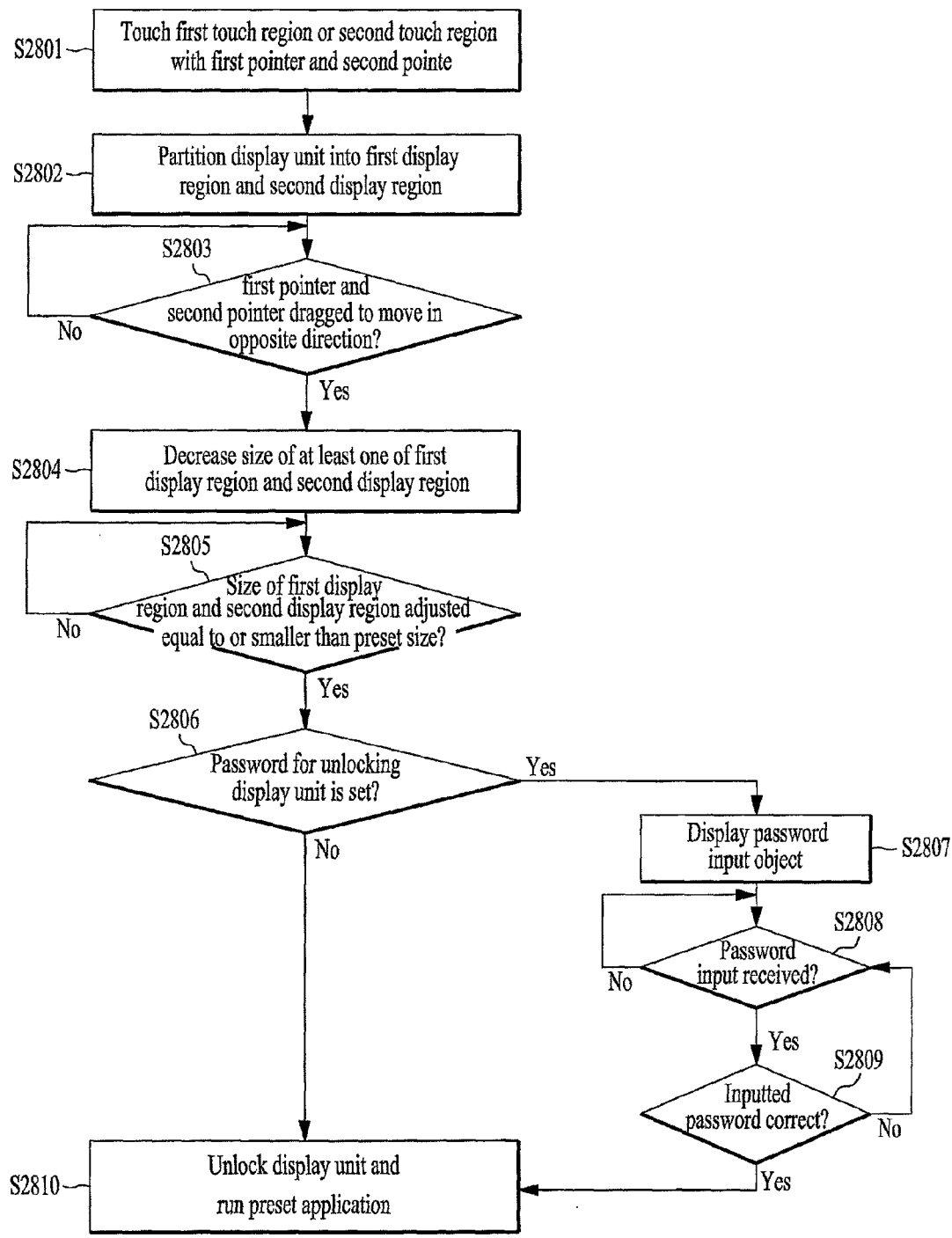
FIG. 28 is a flowchart illustrating an operation of a mobile terminal according to one embodiment of the present invention.

FIG. 28 is a flowchart illustrating an operation of the mobile terminal 100 according to one embodiment of the present invention. In particular, FIG. 28 relates to another method of unlocking the display unit 151 using two pointers. The embodiment shown in FIG. 28 differs from Embodiment 2 or Embodiment 3 in that a first pointer and a second pointer touch either a first touch region or a second touch region.

Referring to FIG. 28, if one of a first touch region and a second region is touched with a first pointer and a second pointer (S2801), the controller 180 can partition the display unit 151 into a first display region and a second display region (S2802). Further, the controller 180 can control a boundary between the first display region and the second display region to be formed between a touch point of the first pointer and a touch point of the second pointer or can control a boundary between the first display region and the end display region to be formed on a preset position.

Figure 29:
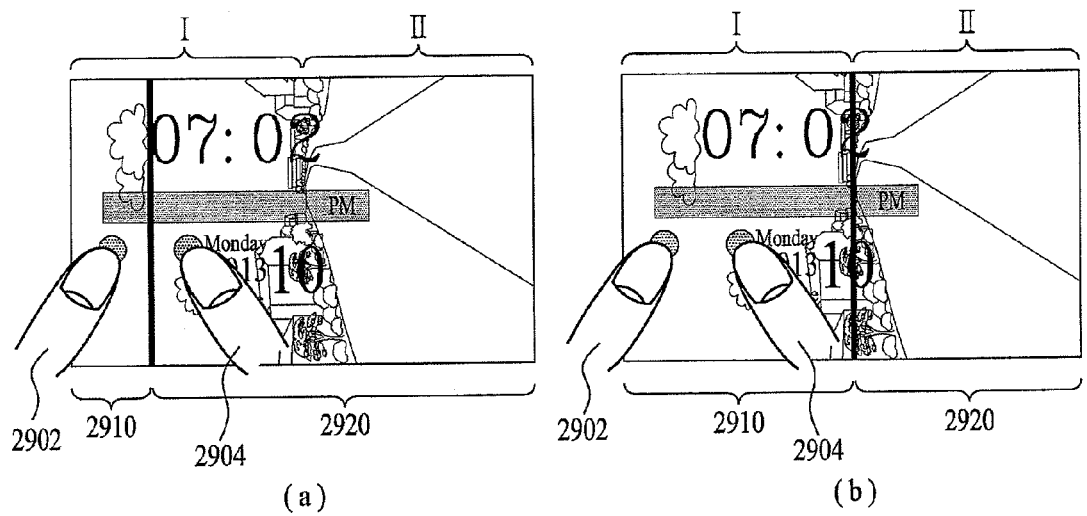
FIG. 29 is a diagram illustrating one example of a case that one of a first touch region and a second touch region is touched with a first pointer and a second pointer.

For instance, FIG. 29 is a diagram illustrating one example of when one of a first touch region and a second touch region is touched with a first pointer and a second pointer. Referring to FIG. 29, if one of a first touch region I and a second touch region II is touched with a first pointer 2902 and a second pointer 2904, the controller 180 can partition the display unit 151 into a first display region 2910 and a second display region 2920. Further, like the example shown in FIG. 29(a), the controller 180 can control a boundary between the first display region 2910 and the second display region 2920 to be formed between a touch point of the first pointer 2902 and a touch point of the second pointer 2904.

Also, like the example shown in FIG. 29(b), the controller 180 can control a boundary between the first display region 2910 and the second display region 2920 to be formed on a preset position (e.g., FIG. 29(b) shows one example that the boundary between the first display region 2910 and the second display region 2920 is formed in the middle of a screen).

Thereafter, as the first and second pointers currently touching one of the first touch region and the second touch region is dragged to move in opposite directions, respectively, if a spaced distance between the first pointer and the second pointer increases (Yes in S2803), the controller 180 can control a size of at least one of the first display region and the second display region to be reduced (S2804). Subsequently, if a moving distance of at least one of the first pointer and the second pointer becomes equal to or greater than a preset moving distance or a size of one of the first display region and the second display region becomes equal to or smaller than a preset size (Yes in S2805), the controller can display an active screen of a prescribed application or a password input object depending on whether a password for unlocking the display unit 151 is set.

In particular, if the password for unlocking the display unit 151 is not set (No in S2806), the controller 180 unlocks the display unit 151 and can also display an active screen of a preset prescribed application (S2810). In particular, the controller 180 stops displaying the first display region and the second display region and can also display the active screen of the prescribed application through the display unit 151.

Further, if the password for unlocking the display unit 151 is set already (Yes in S2806), the controller 180 can display a password input object before outputting an active screen of a prescribed application (S2807). Thereafter, if a password is input (Yes in S2808), the controller 180 checks the input password (S2809). If the input password is correct (Yes in S2809), the controller 180 can display an active screen of a preset prescribed application on the display unit 151 (S2810). For instance, FIG. 30A and FIG. 30B are diagrams illustrating one example of outputting an active screen of a prescribed application as the display unit 151 is unlocked. For clarity of the following description, assume that a running application according to unlocking the display unit 151 is a photo application for watching photos.

Referring to FIG. 30A, while a first pointer 3002 and a second pointer 3004 touch one of a first touch region I and a second touch region II, if the first pointer 3002 and the second pointer are dragged to move in opposite directions, respectively (FIG. 30A (a)), the controller 180 can control a first display region 3010 and a second display region 3020 to be reduced in size (FIG. 30A (b)).

Thereafter if a size of one of the first display region 3010 and the second display region 3020 becomes equal to or smaller than a preset size and a password for unlocking the display unit 151 is not set yet, the controller 180 unlocks the display unit 151 and can also control an active screen of a photo application to be output to the display unit 151 (FIG. 30A (c)). As the photo application is running, referring to FIG. 30A (c), a photo list is displayed for example.

On the contrary, if a size of one of the first display region 3010 and the second display region 3020 becomes equal to or smaller than a preset size bit the password for unlocking the display unit 151 is set, the controller 180 can display a password input object like the examples shown in FIGS. 30B (a) to 30B (f). For instance, if the set password is a pattern password, like the example shown in FIG. 30B (a), the controller 180 can display a plurality of figure objects through the display unit to enable a user to draw a pattern before displaying the active screen of the prescribed application. In the example shown in FIG. 30B (a), nine figure objects are displayed to enable a user to input a pattern password.

A user can draw a pattern by connecting at least one or more of the nine figure objects to one another. Based on whether the pattern drawn through the nine figure objects matches a preset password, the controller 180 can determine whether to unlock the display unit 151. If the pattern drawn through the nine figure objects matches the preset password, the controller 180 unlocks the display unit 151 and can display the active screen of the prescribed application like the example shown in FIG. 30A (b).

If the set password is a PIN (personal identification number), like the example shown in FIG. 30B (b), the controller 180 can display a virtual keypad through the display unit 151 to enable a user to input numerals. If numerals are input through the virtual keypad, the controller 180 checks whether the input numerals matches the set password and can then determine whether to unlock the display unit 151. If the input numerals matches the preset password, the controller 180 unlocks the display unit 151 and can display the active screen of the prescribed application like the example shown in FIG. 30A (b). Moreover, if the set password includes a text, keys for inputting texts can be further included in the virtual keypad.

If the set password is a fingerprint, like the example shown in FIG. 30B (c), the controller 180 can display a fingerprint input window, which suggests a user to input a fingerprint. If a fingerprint is input, the controller 180 checks whether the input fingerprint matches the set password and can then determine whether to unlock the display unit 151. If the input fingerprint matches the preset password, the controller 180 unlocks the display unit 151 and can display the active screen of the prescribed application like the example shown in FIG. 30A (b).

If the set password is a user's face, like the example shown in FIG. 30B (d), the controller 180 can display an image input through a camera. As a result from analyzing the image input from the camera, if it is determined that the user's face set as the password is recognized, the controller 180 unlocks the display unit 151 and can display the active screen of the prescribed application like the example shown in FIG. 30A (b). A preview image shown in FIG. 30B (d) preferably includes an image input through the camera exposed from a front side of the mobile terminal so that a user can check an output of the display unit 151. Yet, it is a matter of course that an image input from a rear camera can be output as the preview image.

If the set password is an input of a voice corresponding to a preset text, like the example shown in FIG. 30B (e), the controller 180 can display a voice input window, which suggests to input a voice. If a user's voice is input through a microphone, the controller 180 analyzes the input voice, checks whether the input voice matches the set password, and can then determine whether to unlock the display unit 151. If the input voice matches the preset password, the controller 180 unlocks the display unit 151 and can display the active screen of the prescribed application like the example shown in FIG. 30A (b).

If the set password is a correct answer of a quiz, like the example shown in FIG. 30B (f), the controller 180 can display a quiz question. For instance, in the example shown in FIG. 30B (f), matching a displayed block to a mini-block of the same pattern is the quiz question. If a user solves the quiz correctly, the controller 180 unlocks the display unit 151 and can display the active screen of the prescribed application like the example shown in FIG. 30A (b).

Figure 31:
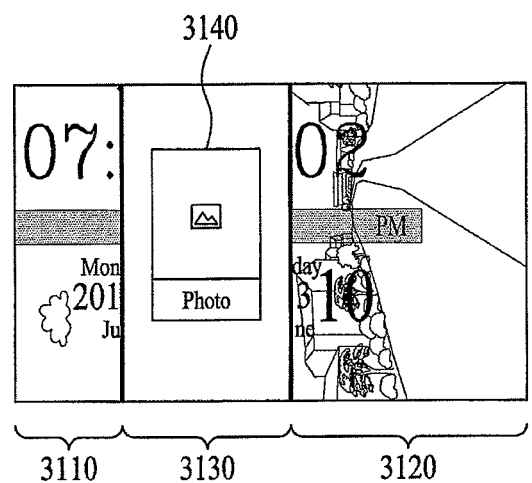
FIG. 31 is a diagram illustrating one example that information on a prescribed application is displayed on a third region.

As the display unit 151 is unlocked, the controller 180 can display information on the prescribed application, which is to be run, on a third display region 3030 that newly appears in accordance with the reduced first and second display regions 3010 and 3020. For instance, FIG. 31 is a diagram illustrating one example that information on a prescribed application is displayed on a third region. referring to FIG. 31, as a first pointer and a second pointer are dragged to move in opposite directions, respectively, if a first display region 3110 and a second display region 3120 are reduced in size, a third display region 3130 can newly appear in response to the reduced sizes of the first and second display regions 3110 and 3120. Therefore, like the example shown in FIG. 31, the controller 180 can display information on a prescribed application, which is to be run according to unlocking the display unit 151 on the third display region 3130. Although FIG. 31 shows one example that an icon 3140 of the prescribed application is displayed on the third display region 3130, unlike the example, a title of the prescribed application, a screen estimated as output in accordance with running the application or the like can be displayed on the third display region 3130.

In this instance, the prescribed application, which is to be run according to unlocking the display unit 151, can be manually set by a user. In the example shown in FIG. 28, if a first pointer and a second pointer touch a first touch region or a second touch region, the display unit 151 is partitioned into a first display region and a second display region. Further, the controller 180 can control the display unit 151 to be partitioned into the first display region and the second display region from a timing point at which the first and second pointers start to be dragged to move in directions opposite to each other. Although FIGS. 29 to 31 show the examples that the mobile terminal 100 is in landscape mode, the present embodiment can apply to a case that the mobile terminal 100 is in portrait mode as well.

Embodiment 4-1

The mobile terminal 100 according to an embodiment of the present invention can control a different application to be run depending on whether touch positions of first and second pointers belong to a first touch region or a second touch region. In particular, while the first and second pointers touch the first touch region, if the display unit 151 is unlocked, the controller runs or executes a preset first application to. Further, while the first and second pointers touch the second touch region, if the display unit 151 is unlocked, the controller runs or executes a preset second application.

Figure 32A:
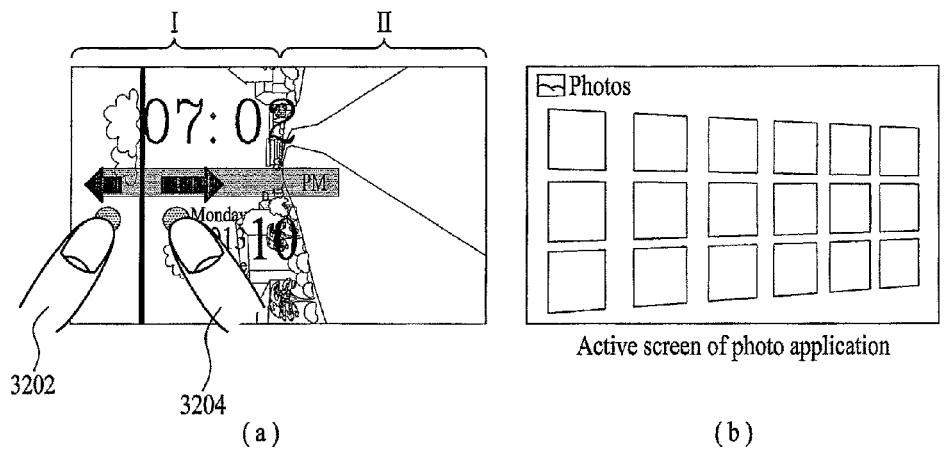
FIG. 32A and FIG. 32B are diagrams illustrating examples of running a different application depending on touch positions of first and second pointers.
Figure 32B:
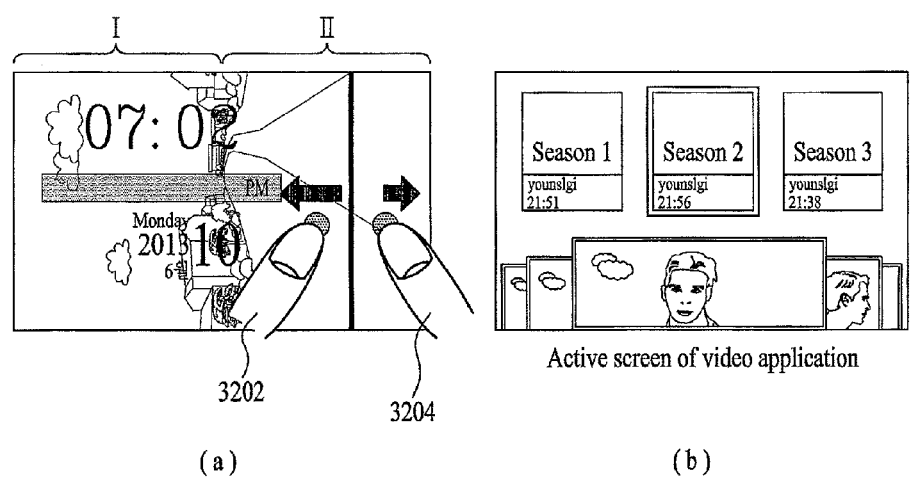

For instance, FIG. 32A and FIG. 32B are diagrams illustrating examples of running or executing a different application depending on touch positions of first and second pointers. In particular, FIG. 32A shows one example that a first pointer 3202 and a second pointer 3204 touch a first touch region I. In addition, FIG. 32B shows one example that a first pointer 3202 and a second pointer 3204 touch a second touch region II. For clarity of the following description, assume that a first application, which is run automatically in response to a touch to the first touch region I, is a photo application. In addition, assume that a second application, which is run automatically in response to a touch to the second touch region II, is a video application. Moreover, assume that a password for unlocking the display unit 151 is not set.

Referring to FIG. 32A, if the first and second pointers 3202 and 3204 currently touching the first region I are dragged to move in opposite directions, respectively (FIG. 32A (a)), the controller 180 unlocks the display unit 151 and can display an active screen of a photo application on the display unit 151 (FIG. 32A (b)).

Referring to FIG. 32B, if the first and second pointers 3202 and 3204 currently touching the second region II are dragged to move in opposite directions, respectively (FIG. 32B (a)), the controller 180 unlocks the display unit 151 and can display an active screen of a video application on the display unit 151 (FIG. 32B (b)). In addition, if a password for unlocking the display unit 151 is set already, the controller 180 can display a password input object before displaying the active screen of the photo or video application.

Like the examples shown in FIG. 32A and FIG. 32B, depending on whether the first and second pointers 3202 and 3204 touch the first touch region I or the second touch region II, the controller 180 can determine an application to run by unlocking the display unit 151. Although FIG. 32A and FIG. 32B show the examples that the mobile terminal 100 is in landscape mode, the present embodiment can apply to a case that the mobile terminal 100 is in portrait mode as well.

Embodiment 4-2

The aforementioned Embodiment 2 and the aforementioned Embodiment 4 (and its subordinate Embodiment 4-1)

can simultaneously apply to the mobile terminal 100 according to an embodiment of the present invention. Further, for user's input convenience, the controller 180 can display a second guide information on a lock screen to guide a screen to be output per user's touch position.

Figure 33:
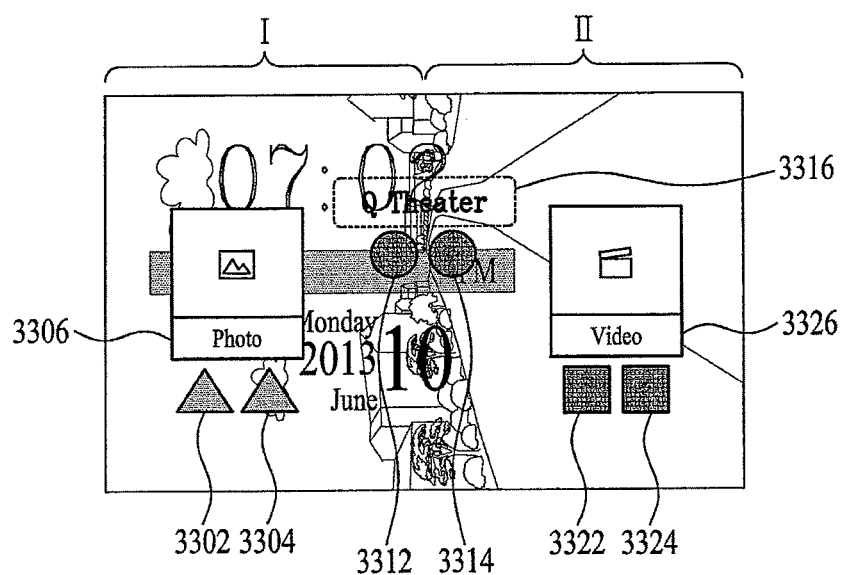
FIG. 33 is a diagram illustrating one example that a second guide information is displayed on a display unit.

For instance, FIG. 33 is a diagram illustrating one example that a second guide information is displayed on the display unit 151. Like the example shown in FIG. 33, the second guide information can include a touch position indicator configured to guide a user's touch position and a second preview information corresponding to the touch position indicator. Referring to FIG. 33, a touch position indicator can be configured in a manner that two objects form a pair. According to the example shown in FIG. 33, since a touch position indicator 3302 and 3304 having a pair of objects exist on a first touch region I is matched to an icon 3306 of a photo application, if a user touches the first touch region I with two pointers and then unlocks the display unit 151, the user can recognize that the photo application can be run.

Since a touch position indicator 3312 and 3314 having a pair of objects exist on the first touch region I and a second touch region II respectively is matched to a second home screen 3316 named 'Q theater', if a user touches the first touch region I and the second touch region II with two pointers, respectively and then unlocks the display unit 151, the user can recognize that the second home screen named 'Q theater' can be output.

Moreover, since a touch position indicator 3322 and 3324 having a pair of objects exist on 5h3 second touch region II is matched to a video application icon 3326, if a user touches the second touch region II with two pointers and then unlocks the display unit 151, the user can recognize that the video application can be run. Meanwhile, in order to discriminate a case of touching a first touch region and a second touch region with a first pointer and a second pointer, respectively from a case of touching either the first touch region or the second touch region with the first pointer and the second pointer, the mobile terminal 100 according to an embodiment of the present invention can control a different visual effect to be applied to at least one of a first display region and a second display region.

For instance, if the first pointer and the second pointer touch the first touch region and the second touch region, respectively, the controller controls at least one of the first display region and the second display region to be in first color. If the first pointer and the second pointer touch the first touch region only, the controller 180 can control at least one of the first display region and the second display region to be in second color. Moreover, by adjusting a pattern, a transparency level of a lock screen and/or the like, which is to be applied to at least one of the first display region and the second display region as well as a color, the controller 180 can control a different visual effects to applied for each of the touch positions of the first pointer and the second pointer. Although FIG. 33 shows the example that the mobile terminal 100 is in landscape mode, the present embodiment can apply to a case that the mobile terminal 100 is in portrait mode as well.

Embodiment 5

According to the foregoing Embodiments 1 to 4 (and their subordinate embodiments), in response to a user's touch input type, a screen output after unlocking the display unit 151 is determined. In particular, a screen output after unlocking the display unit 151 for each of the embodiments is described as follows.

Embodiment 1: If the display unit is unlocked, a first home screen is output.

Embodiment 2: If the display unit is unlocked, a second home screen is output.

Embodiment 3: If the display unit is unlocked, a content last watched by a user is output.

Embodiment 4: If the display unit is unlocked, an active screen of a preset application is output.

In this instance, a type of a screen output after unlocking the display unit 151 through a touch input mentioned in the description of each of the embodiments can be interchangeably applied. For instance, if the display unit 151 is unlocked by the touch input (i.e., an action performed by touching the first touch region and the second touch region with the first pointer and the second pointer and then moving the first pointer and the second pointer in opposite directions, respectively) mentioned in the description of Embodiment 2, a content last watched by a user or an active screen of a preset application can be output. In another instance, if the display unit 151 is unlocked by the touch input (i.e., an action performed by touching the first touch region and the second touch region with the first pointer and the second pointer, respectively and then moving the first pointer and the second pointer in the same direction) mentioned in the description of Embodiment 3, a first home screen or a second home screen can be output.

In particular, various kinds of examples can be derived from combinations of the above-described embodiments, which come within the scope of the appended claims and their equivalents. Moreover, Embodiments 1 to 4 (and their subordinate embodiments) can entirely apply to one mobile terminal 100. In this instance, based on the number of pointers touching the display unit 151, an operation mode (e.g., a portrait mode, a landscape mode, etc.) of the display unit 151, a spaced distance between pointers and/or the like, the controller 180 unlocks the display unit 151 and can also output one of a first home screen, a second home screen, a third home screen, a fourth home screen, a prescribed application, a content last watched by a user and the like.

Embodiment 6

Various kinds of input examples for unlocking the display unit 151 are described with reference to Embodiments 1 to 4 (and their subordinate embodiments). According to the above-described embodiments, a type of information, which is to be output to the display unit 151, can be changed by a touch pattern input to unlock the display unit 151 for example.

If the display unit 151 is unlocked by one of the touch patterns of the above-described embodiments including Embodiments 1 to 4 (and their subordinate embodiments), the mobile terminal 100 according to an embodiment of the present invention controls to log in by a user mode. If the display unit 151 is unlocked by another touch pattern, the mobile terminal 100 according to an embodiment of the present invention can also control to log in by a guest mode.

When logging in by the user mode, the controller 180 allows a user to use all functions of the mobile terminal 100. When logging in by the guest mode, the controller 180 can allow a user to use basic functions of the mobile terminal 100 only. In particular, for instance, while the mobile terminal 100 is operating in portrait mode, if the display unit 151 is unlocked with a single pointer or two pointers, the controller 180 controls to log in by the user mode. In another instance, while the mobile terminal 100 is operating in landscape mode, if the display unit 151 is unlocked with a single pointer or two pointers, the controller 180 can control to log in by the guest mode.

Embodiment 7

When the mobile terminal 100 includes Dual-SIM, if the display unit 151 is unlocked by one of the touch patterns of the above-described embodiments including Embodiments 1 to 4 (and their subordinate embodiments), the controller 180 uses a first SIM. If the display unit 151 is unlocked by another touch pattern, the controller 180 can control a second SIM to be activated.

In particular, for instance, while the mobile terminal 100 is operating in portrait mode, if the display unit 151 is unlocked with a single pointer or two pointers, the controller 180 controls the first SIM to be activated. In another instance, while the mobile terminal 100 is operating in landscape mode, if the display unit 151 is unlocked with a single pointer or two pointers, the controller 180 can control the second SIM to be activated.

Embodiment 8

According to the Embodiment 2-2, the case that the mobile terminal 100 is operating in portrait mode is discriminated from the case that the mobile terminal 100 is operating in landscape mode. While the mobile terminal 100 is operating in landscape mode, if the touchscreen is unlocked, a second home screen can be output. While the mobile terminal 100 is operating in portrait, if the touchscreen is unlocked, a third home screen can be output.

Unlike the former Embodiment 2-2, when the mobile terminal 100 according to an embodiment of the present invention is in portrait mode, the mobile terminal 100 may allow an unlocking method with a single pointer only (cf. Embodiment 1). Since a user generally grips the mobile terminal 100 with both hands in order to control the mobile terminal 100 to operate in landscape mode, a touch input may be facilitated using two pointers. Yet, since a user generally grips the mobile terminal 100 with one hand in order to control the mobile terminal 100 to operate in portrait mode, a touch input may not be facilitated using two pointers. Hence, the controller 180 can allow an unlocking method with a single pointer only while the mobile terminal 100 is operating in portrait mode.

In particular, only if the mobile terminal 100 operates in landscape mode, the controller 180 can control a first touch region I and a second touch region II to be configured in the display unit 151. In this instance, whether the mobile terminal 100 operates in landscape mode or portrait mode can be determined based on a sensing signal of the sensing unit 140 configured to sense an inclination of the mobile terminal 100.

Embodiment 9

Figure 34:
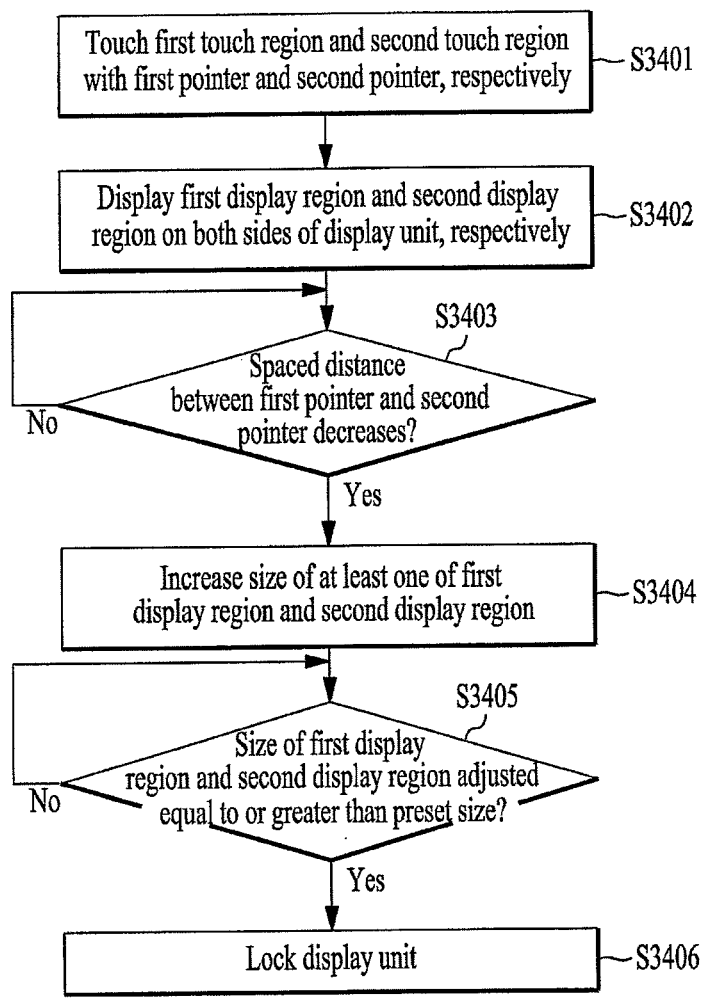
FIG. 34 is a flowchart illustrating an operation of a mobile terminal according to one embodiment of the present invention.

FIG. 34 is a flowchart illustrating an operation of the mobile terminal 100 according to one embodiment of the present invention and in particular a method of locking an unlocked display unit 151. In particular, while the display unit 151 is unlocked, if a first touch region and a second touch region of the display unit 151 are touched with a first pointer and a second pointer, respectively (S3401), the controller 180 can control a first display region and a second display region to be exposed on both sides of the display unit 151, respectively (S3402). Subsequently, if the first pointer and the second pointer are dragged to move in a direction of decreasing a spaced distance between the first pointer and the second pointer (Yes in S3403), the controller 180 can control a size of at least one of the first display region and the second display region to increase (S3404).

In particular, the controller 180 can control a size of the first display region to increase in proportion to a drag moving distance of the first pointer. In addition, the controller 180 can control a size of the second display region to increase in proportion to a drag moving distance of the second pointer. Moreover, the controller 180 can control the sizes of the first and second display regions to increase at the same rate with reference to a longer (or shorter) one of the drag moving distance of the first pointer and the drag moving distance of the second pointer.

If the moving distance of at least one of the first pointer and the second pointer becomes equal to or greater than a preset moving distance or the size of at least one of the first display region and the second display region becomes equal to or greater than a preset size (Yes in S3405), the controller 180 can control the display unit 151 to enter a locked state (S3406).

Figure 35:
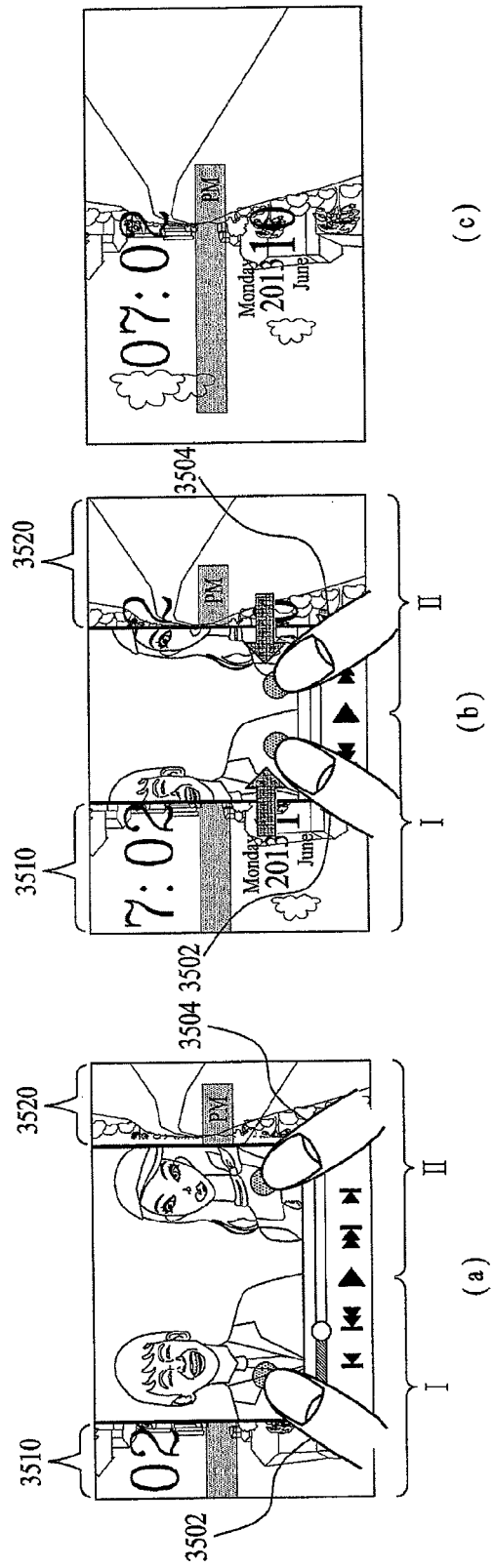
FIG. 35 is a diagram illustrating one example that a display unit is set to enter a locked state.

For instance, FIG. 35 is a diagram illustrating one example that the display unit 151 is set to enter a locked state. Referring to FIG. 35, if a first pointer 3502 and a second pointer 3504 touch a first display region I and a second display region II on the display unit 151 in an unlocked state, respectively, like the example shown in FIG. 35(*a*), the controller 180 can control a first display region 3510 and a second display region 3520 to be exposed on both sides of the display unit 151, respectively. Subsequently, if the first pointer 3502 and the second pointer 3504 are dragged to move so that a spaced distance between the first pointer 3502 and the second pointer 3504 can decrease, like the example shown in FIG. 35(*b*), the controller 180 can control sizes of the first display region 3510 and the second display region 3520 to increase.

If a moving distance of at least one of the first pointer 3502 and the second pointer 3504 becomes equal to or greater than a prescribed distance or a size of at least one of the first display region 3510 and the second display region 3520 becomes equal to or greater than a preset size, the controller 180 can control the display unit 151 to enter a locked state. In particular, like the example shown in FIG. 35(*c*), the controller 180 can display a locked screen across the display unit 151 by merging together the first display region 3510 and the second display region 3520. FIG. 35(*c*) shows one example that the locked screen is displayed through the display unit 151 if the display unit 151 enters the locked state. However, the controller 180 can control the display unit 151 to directly enter a power saving state (i.e., a state that the display unit 151 is turned off).

According to the example shown in FIG. 34, if a first pointer touches a first touch region and a second pointer touches a second touch region, a first display region and a second display region are exposed on both sides of the display unit 151, respectively. Further, from a timing point at which a first pointer and a second pointer start to be dragged to move in directions for decreasing a spaced distance between the first pointer and the second pointer, the controller 180 can control a first display region and a second display region to be exposed on the display unit 151. Although FIG. 35 shows the example that the mobile terminal 100 is in landscape mode, the present embodiment can apply to a case that the mobile terminal 100 is in portrait mode as well.

Embodiment 9-1

The Embodiment mentioned in the foregoing description is applicable only if the display unit 151 is unlocked by two pointers. In particular, if the display unit 151 is unlocked by a single pointer, the display unit 151 may not enter a locked state despite that a spaced distance between two pointers decreases.

Embodiment 10

Figure 36:
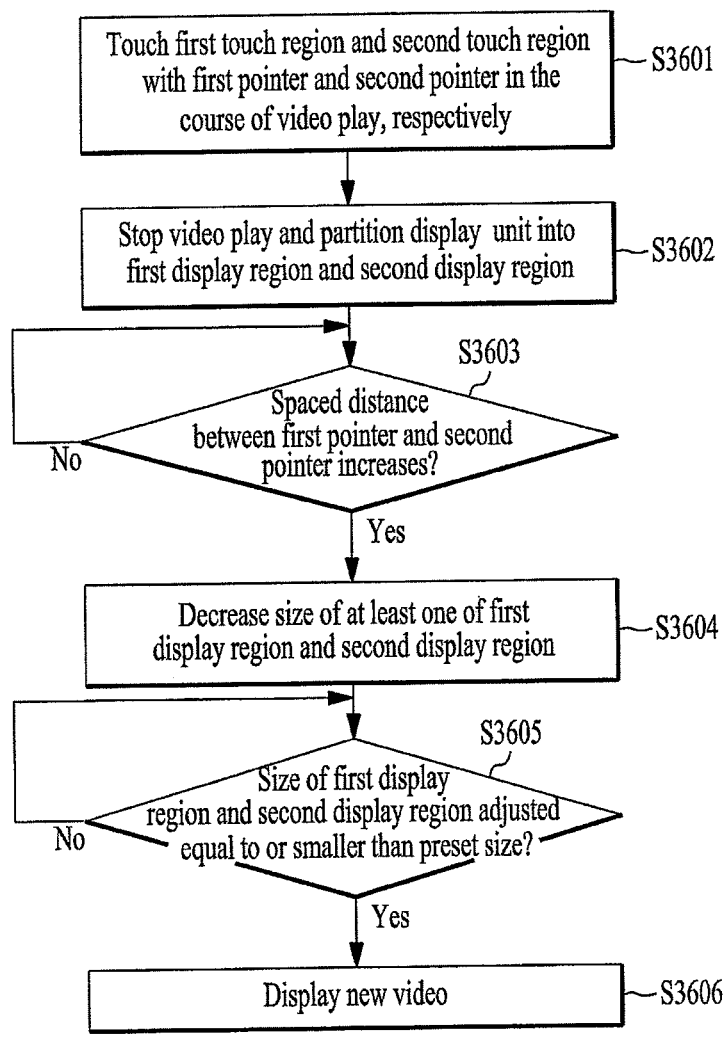
FIG. 36 is a flowchart illustrating an operation of a mobile terminal according to one embodiment of the present invention.

FIG. 36 is a flowchart illustrating an operation of the mobile terminal 100 according to one embodiment of the present invention and in particular relates to an operation of the mobile terminal 100 if the display unit 151 is touched with two pointers while playing a video. In particular, while a video is played, if a first touch region and a second touch region of the display unit 151 are touched with a first pointer and a second pointer, respectively (S3601), the controller 180 stops playing the video and can partition the display unit 151 into a first display region and a second display region (S3602). When the display unit 151 is partitioned into the two display regions, the controller 180 can control a still cut at the timing point of interrupting the play of the video to be divided into two parts. For instance, a left part of the still cut can be displayed through the first display region and a right part of the still cut can be displayed through the second display region.

Thereafter, as the first pointer and the second pointer move in opposite directions, respectively, and if a spaced distance between the first pointer and the second pointer increases (Yes in S3603), the controller 180 can control a size of at least one of the first display region and the second display region to decrease (S3604). In particular, the controller 180 can control a size of the first display region to decrease in proportion to a drag moving distance of the first pointer. In addition, the controller 180 can control a size of the second display region to decrease in proportion to a drag moving distance of the second pointer. Moreover, the controller 180 can control the sizes of the first and second display regions to decrease at the same rate with reference to a longer (or shorter) one of the drag moving distance of the first pointer and the drag moving distance of the second pointer. As mentioned in the foregoing description with reference to FIG. 14, as the sizes of the first and second display regions decrease, a third display region can newly appear on the display unit 151.

Thereafter, if a moving distance of at least one of the first pointer and the second pointer becomes equal to or greater than a preset moving distance or a size of at least one of the first display region and the second display region becomes equal to or smaller than a preset size (Yes in S3605), the controller 180 can play a new video (S3606). In particular 180, the controller 180 stops displaying the first display region and the second display region and can display a new video through the third display region by extending the third display region to a full region of the display unit 151.

For instance, FIG. 37 is a diagram illustrating one example of starting to play a new video by stopping playing a video. For clarity of the following description, assume that a video played before a user's touch input is named a first video. In addition, assume that a video played after a user's touch input is named a second video. Referring to FIG. 37, while a first video is played, if a first touch region I is touched with a first pointer 3702 and a second touch region II is touched with a second pointer 3704, the controller 180 stops playing the first video and can partition the display unit 151 into a first display region 3710 and a second display region 3720 (FIG. 37(a)). Further, a left image of a still cut at the timing point of stopping the play of the first video can be displayed through the first display region 3710 and a right image of the still cut at the timing point of stopping the play of the first video can be displayed through the second display region 3720.

Thereafter, as the first pointer 3702 and the second pointer 3704 are dragged to move in opposite directions, respectively, if a spaced distance between the first pointer 3702 and the second pointer 3704 increases, like the example shown in FIG. 37(b), the controller 180 can control the first display region 3710 and the second display region 3720 to be reduced in size. As the sizes of the first display region 3710 and the second display region 3720 are reduced, a third display region 3730 amounting to a sum of the reduced sizes of the first display region 3710 and the second display region 3720 may newly appear on the display unit 151.

Thereafter, if a moving distance of at least one of the first pointer 3702 and the second pointer 3704 becomes equal to or greater than a preset moving distance or a size of at least one of the first display region 3710 and the second display region 3720 becomes equal to or smaller than a preset size, like the example shown in FIG. 37(c), the controller 180 can control a second video to be output through the display unit 151. When a previous play record of the second video exists, the controller 180 can control a play of the second video to start in continuation with a previous stop timing point.

In this instance, the second video may include a video most recently watched by a user before watching the first video or a video in play order next to that of the first video. As the first display region and the second display region are reduced, if the third display region newly appears, the controller 180 can display a still cut of the second video or information on the second video through the third display region.

For instance, FIG. 38 is a diagram illustrating one example that a still cut of a second video or information on the second video is displayed on a third display region. Like the example shown in FIG. 38(a), the controller 180 can control at least one portion of a still cut, which corresponds to a timing point of resuming a play of a second video, to be output through the display unit 151. In another instance, like the example shown in FIG. 38(b), the controller 180 can display information on a second video (e.g., a file name of the second video, a total play time of the second video, etc.) through a third display region 3830.

In the example shown in FIG. 36, if a first pointer and a second pointer touch a first touch region and a second touch region, respectively, the display unit 151 is partitioned into a first display region and a second display region. Further, the controller 180 can control the display unit 151 to be partitioned into the first display region and the second display region from a timing point at which the first and second pointers start to be dragged to move in directions opposite to each other, respectively. Although FIG. 37 and FIG. 38 show the examples that the mobile terminal 100 is in landscape mode, the present embodiment can apply to a case that the mobile terminal 100 is in portrait mode as well.

Embodiment 10-1

According to the example shown in FIG. 36, a user input is applied by increasing a spaced distance between a first pointer currently touching a first touch region and a second pointer currently touching a second touch region by moving the first pointer and the second pointer in directions opposite to each other, respectively. Unlike the example shown in FIG. 36, when a first pointer currently touching a first touch region and a second pointer currently touching a second touch region are dragged to move in the same direction by maintaining an equivalent level of a spaced distance between the first pointer and the second pointer, the controller 180 can activate a search function of searching for information related to a currently played video or can display a video list, which is related to a currently played video.

In particular, while a video is played, if a first pointer and a second pointer are dragged to move in a first direction by maintaining an equivalent level of a spaced distance in-between, the controller 180 can activate a search function to search for information related to the currently played video. Further, while a video is played, if a first pointer and a second pointer are dragged to move in a second direction by maintaining an equivalent level of a spaced distance in-between, the controller 180 can display a video list, which is related to the currently played video. This is described in detail with reference to FIG. 39 and FIG. 40 as follows.

FIG. 39 is a diagram to describe one example of activating a search function for searching for a related information on a currently played video. For clarity of the following description, assume that a top direction of the display unit 151 shall be named a first direction. Referring to FIG. 39, while a video is played, if a first pointer and a second pointer move in a first direction (FIG. 39(a)), the controller 180 can display a keypad in order for a user to input a search word related to a video (FIG. 39(b)). If a keyword for receiving information on a subject appearing in a currently played video is input through the keypad, the controller 180 can display the information requested by a user by overlaying the video. For instance, if a keyword (e.g., actor) for receiving information on a subject appearing in a currently played video is input (FIG. 39(b)), the controller 180 can display information (e.g., a name of a character, an acted film of a character, an age of a character, etc.) on a character appearing in the currently played video by overlaying the corresponding video (FIG. 39(c)).

In addition, if a keyword (e.g., place) for receiving information on a video shooting location is input, the controller 180 can display information of the video shooting location by overlaying the video. If a keyword (e.g., cloth) for receiving information on clothes worn by characters is input, the controller 180 can display the information on the clothes worn by the characters by overlaying the video.

In another instance, the controller 180 can search a currently played video for a target corresponding to a keyword. For example, if a name of a prescribed character is input through a virtual keypad, the controller 180 can control a play timing point of a currently played video to be changed into an interval in which a character indicated by the input keyword appears.

Figure 40:
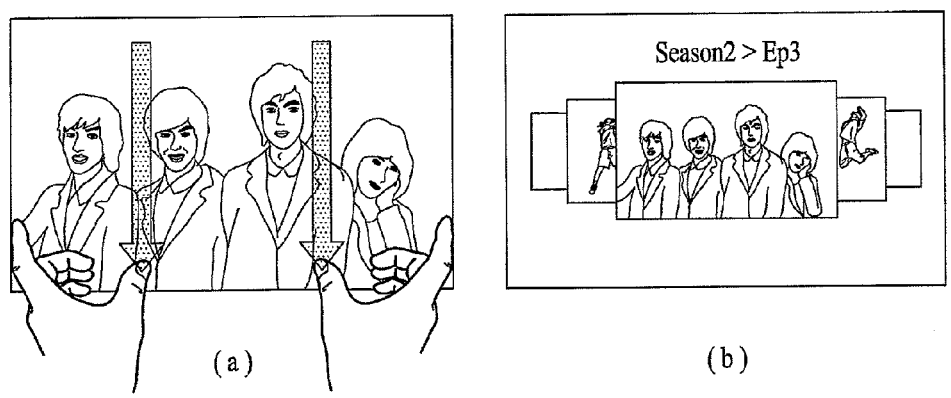
FIG. 40 is a diagram illustrating one example of activating a search function for searching for a related information on a currently played video.

FIG. 40 is a diagram to describe one example of activating a search function for searching for related information of a currently played video. For clarity of the following description, assume that a bottom direction of the display unit 151 shall be named a second direction. Referring to FIG. 40, while a video is played, if a first pointer and a second pointer move in a second direction (FIG. 40(a)), the controller 180 can display a video list, which is related to a currently played video, (FIG. 40(b)). In this instance, the video related to the currently played video may include a video having a file name equal to that of the currently played video in part at least, a video configuring one series with the currently played video, or the like. For instance, if the currently played video corresponds to one episode of a drama series, a video of another episode can be handled as the video related to the currently played video. Although FIG. 39 and FIG. 40 show the examples that the mobile terminal 100 is in a landscape mode, the present embodiment can apply to when the mobile terminal 100 is in the portrait mode as well.

Embodiment 10-2

If an event occurs while playing a video, the controller 180 can display an indicator, which indicates that an event has occurred, by overlaying a video play screen. In this instance, the event may include one of an occurrence of an incoming call, an occurrence of a reception of a message (e.g., a text message, an instant message, etc.), an occurrence that a current hour reaches a preset alarm time, and the like.

Figure 41:
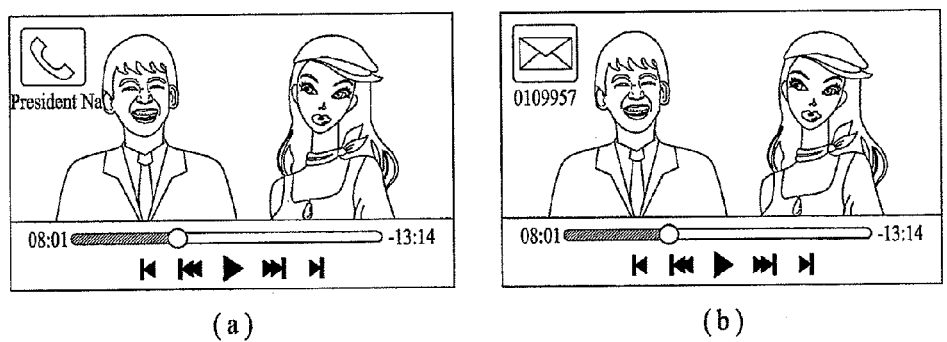
FIG. 41 is a diagram illustrating one example that an indicator is displayed by overlaying a video if an event occurs while playing the video.

For instance, FIG. 41 is a diagram illustrating one example that an indicator is displayed by overlaying a video if an event occurs in the course of playing the video. Referring to FIG. 41, if an event occurs in the course of playing a video, like the examples shown in FIG. 41(a) and FIG. 41(b), the controller 180 can display an indicator by overlaying the video. If the occurring event includes an incoming call, like the example shown in FIG. 41(a), the controller 180 can display an indicator, which includes an icon indicating a presence of the incoming call and information (e.g., a name of a counterpart, a phone number of the counterpart, etc.) on a counterpart having made the phone call, by overlaying the video.

If the occurring event includes a reception of a message, like the example shown in FIG. 41(b), the controller 180 can display an indicator, which includes an icon indicating the occurrence of the reception of the message and information (e.g., a name of a counterpart, a phone number of the counterpart, etc.) on a counterpart having sent the message, by overlaying the video.

If the indicator is touched, the controller 180 stops playing the video and can control an operation for processing the occurring event to be executed. For instance, if the indicator indicating the presence of the incoming call is touched, the controller 180 stops playing the video and can control a call to be connected. If the indicator indicating the occurrence of the reception of the message is touched, the controller 180 stops playing the video and can control a message application to be run to check the received message. Although FIG. 41 shows the example that the mobile terminal 100 is in landscape mode, the present embodiment can apply to a case that the mobile terminal 100 is in portrait mode as well.

Embodiment 10-3

The aforementioned Embodiments 10, 10-1 and 10-2 can apply only to a case that a video application is run from a home screen (e.g., a second home screen) displayed according to unlocking the display unit 151 using two pointers. In particular, if a video application is run from a first home screen output according to unlocking the display unit 151 using a single pointer, Embodiment 10 and Embodiment 10-1 may not be applicable.

Embodiment 11

Figure 42:
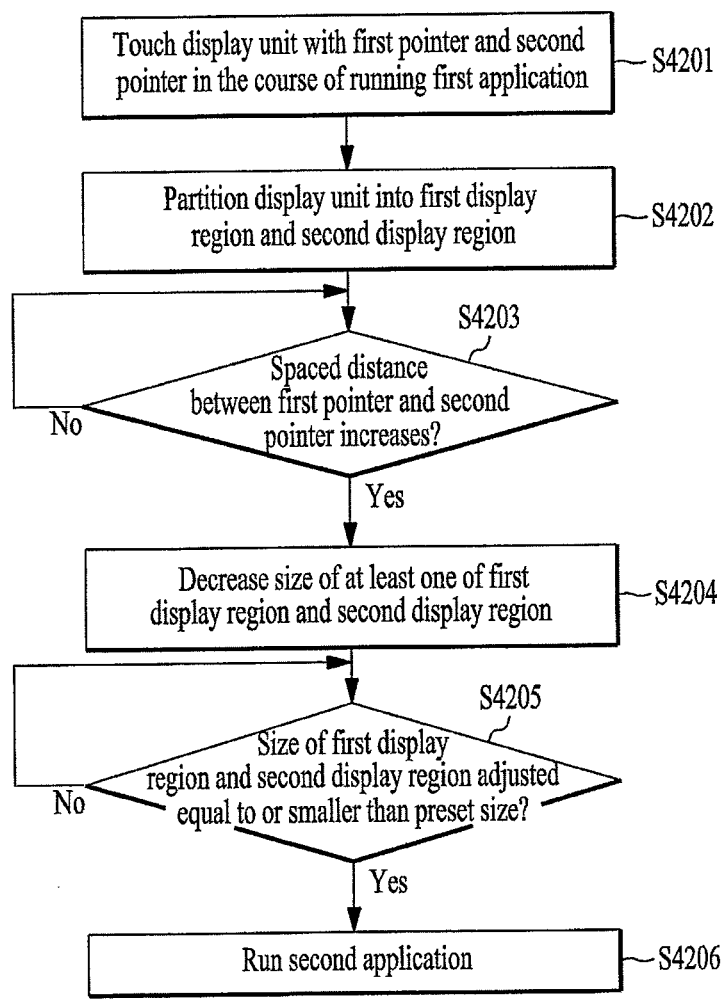
FIG. 42 is a flowchart illustrating an operation of a mobile terminal according to one embodiment of the present invention.

FIG. 42 is a flowchart illustrating an operation of the mobile terminal 100 according to one embodiment of the present invention. FIG. 42 relates to an operation of the mobile terminal 100 if the display unit 151 is touched with two pointers in the course of running a prescribed application. In particular, while a first application is running, if the display unit 151 is touched with a first pointer and a second pointer, (S4201), the controller 180 can control the display unit 151 to be partitioned into a first display region and a second display region (S4202). The controller 180 partitions an active screen of the first application into two active screens and can display the partitioned active screens through the first display region and the second display region, respectively.

Thereafter, as the first pointer and the second pointer move in opposite directions, respectively, if a spaced distance between the first pointer and the second pointer increases (Yes in S4203), the controller 180 can control a size of at least one of the first display region and the second display region to decrease (S4204). In particular, the controller 180 can control a size of the first display region to decrease in proportion to a drag moving distance of the first pointer. In addition, the controller 180 can control a size of the second display region to decrease in proportion to a drag moving distance of the second pointer. Moreover, the controller 180 can control the sizes of the first and second display regions to decrease at the same rate with reference to a longer (or shorter) one of the drag moving distance of the first pointer and the drag moving distance of the second pointer. As mentioned in the foregoing description with reference to FIG. 14, as the sizes of the first and second display regions decrease, a third display region can newly appear on the display unit 151.

Thereafter, if a moving distance of at least one of the first pointer and the second pointer becomes equal to or greater than a preset moving distance or a size of at least one of the first display region and the second display region becomes equal to or smaller than a preset size (Yes in S4205), the controller 180 can control an active screen of a second application to be output (S4206). In this instance, the second application may include at least one of a predefined prescribed application, a most recently run application before running the first application, a most frequently run application and the like.

Figure 43:
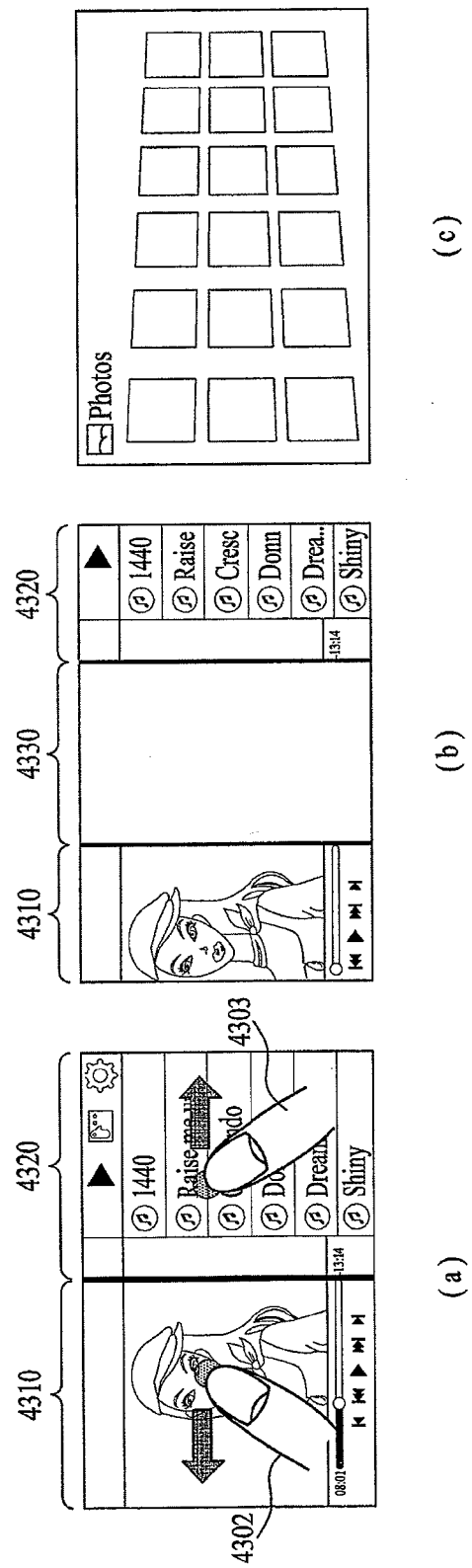
FIG. 43 is a diagram illustrating one example of newly running a second application by stopping running a first application.

Although the second application is newly run, the first application may continue to run in a background state without stopping. For instance, if the first application is a music application, the controller 180 can run the second application in foreground state by continuing to play a music file in background state. For instance, FIG. 43 is a diagram illustrating one example of newly activating a second application by stopping running a first application. For clarity of the following description, assume that the first application includes a music application for listening to a music file. In addition, assume that the second application includes a photo application for watching a photo file.

Referring to FIG. 43, while a first application is running, the display unit 151 can be touched with a first pointer 4302 and a second pointer 4304. If the display unit 151 is touched with the first pointer 4302 and the second pointer 4304, like the example shown in FIG. 43(a), the controller 180 can partition the display unit 151 into a first display region 4310 and a second display region 4320.

Thereafter, as the first pointer 4302 and the second pointer 4304 are dragged to move in opposite directions, respectively, if a spaced distance between the first pointer 4302 and the second pointer 4304 increases, like the example shown in FIG. 43(b), the controller 180 can control the first display region 4310 and the second display region 4320 to be reduced in size. As the sizes of the first display region 4310 and the second display region 4320 are reduced, a third display region 4330 amounting to a sum of the reduced sizes of the first display region 4310 and the second display region 4320 may newly appear on the display unit 151.

Thereafter, if a moving distance of at least one of the first pointer 4302 and the second pointer 4304 becomes equal to or greater than a preset moving distance or a size of at least one of the first display region 4310 and the second display region 4320 becomes equal to or smaller than a preset size, like the example shown in FIG. 43(c), the controller 180 can control a second application to be output through the display unit 151. According to the example shown in FIG. 43(c), as a photo application is run, a list of photo files is displayed.

As the first display region and the second display region are reduced, if the third display region newly appears, the controller 180 can display an active screen of the second application or information on the second application through the third display region. For instance, FIG. 44 is a diagram illustrating one example that an active screen of a second application or information on the second application is displayed on a third display region.

Like the example shown in FIG. 44(a), the controller 180 can control at least one portion of an active screen of a second application to be output through a third display region 4430. In another instance, like the example shown in FIG. 44(b), the controller 180 can display information on a second application (e.g., a name of the second application, an icon of the second application, etc.) through the third display region 4430.

In the example shown in FIG. 42, if a first pointer and a second pointer touch the display unit 151, the display unit 151 is partitioned into a first display region and a second display region. Further, the controller 180 can control the display unit 151 to be partitioned into the first display region and the second display region from a timing point at which the first and second pointers start to be dragged to move in directions opposite to each other, respectively. Although FIG. 43 and FIG. 44 show the examples that the mobile terminal 100 is in landscape mode, the present embodiment can apply to a case that the mobile terminal 100 is in portrait mode as well.

Embodiment 11-1

According to the example shown in FIG. 42, the mobile terminal stops a first application and can newly run a second application. While the second application is running, if a prescribed user input is applied, the mobile terminal 100 according to an embodiment of the present invention stops the second application and can resume the first application.

Figure 45:
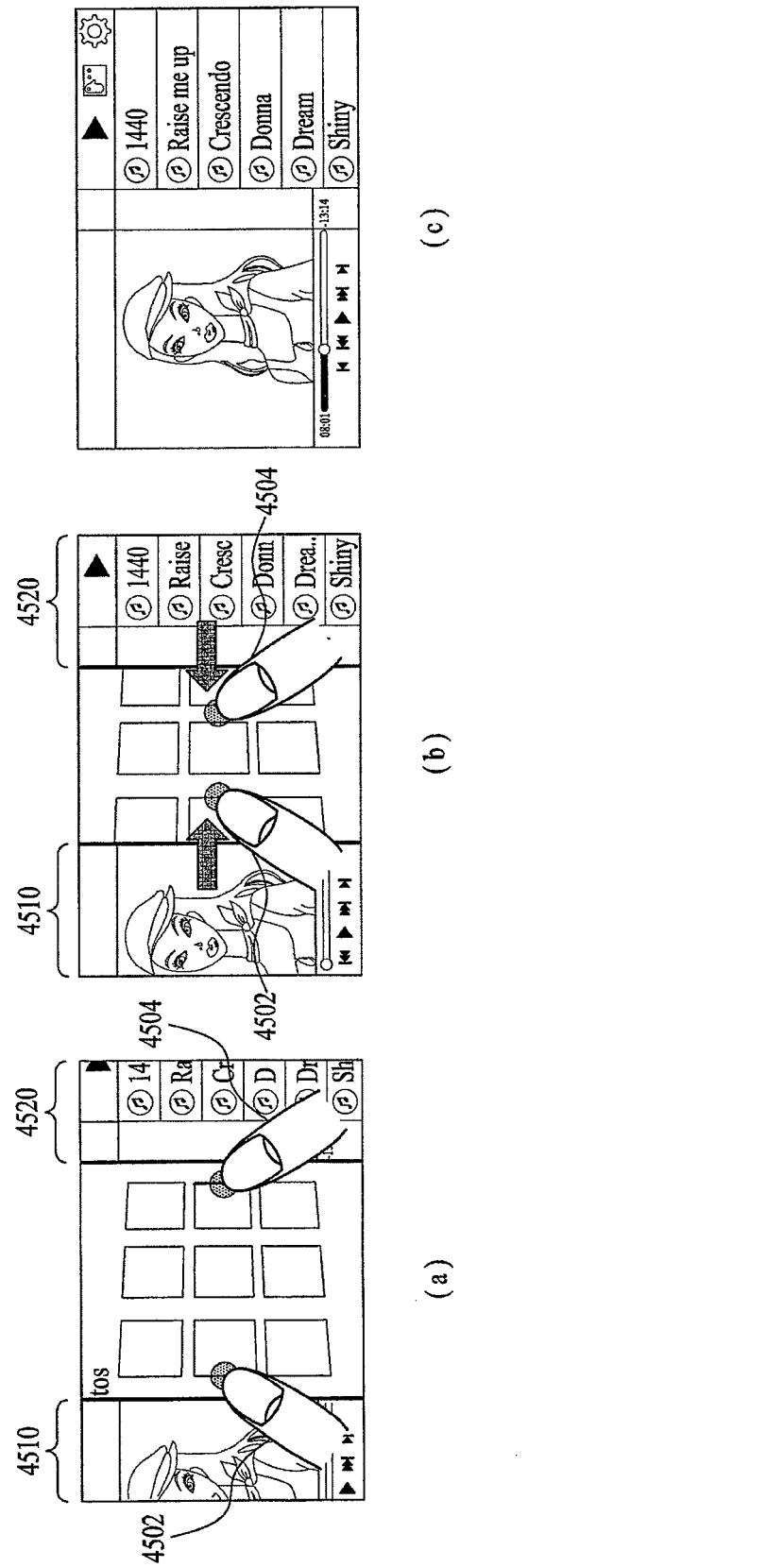
FIG. 45 is a diagram illustrating one example of resuming a first screen by stopping a second application.

For instance, FIG. 45 is a diagram to describe one example of resuming a first screen by stopping a second application. Referring to FIG. 45, while a second application is running, if the display unit 151 is touched with a first pointer 4502 and a second pointer 4504, like the example shown in FIG. 45(a), the controller 180 can control a first display region 4510 and a second display region 4520 to be exposed on both sides of the display unit 151, respectively. At least one portion of an active screen of a first application can be displayed through the first display region 4510 and the second display region 4520.

Thereafter, if the first pointer 4502 and the second pointer 4504 are dragged to move in a direction of decreasing a spaced distance between the first pointer 4502 and the second pointer 4504, the controller 180 can control sizes of the first display region 4510 and the second display region

4520 to increase. If a moving distance of the first pointer 4502 and the second pointer 4504 becomes equal to or greater than a prescribed distance or a size of at least one of the first display region 4510 and the second display region 4520 becomes equal to or greater than a preset size, like the example shown in FIG. 45(c), the controller 180 stops the second application and can control the first application to be resumed.

In the example shown in FIG. 45, if a first pointer and a second pointer touch the display unit 151, a first display region and a second display region are exposed on both sides of the display unit 151, respectively. Further, the controller 180 can control the first display region and the second display region to be exposed from a timing point at which the first and second pointers start to be dragged to move in directions for decreasing a spaced distance in-between. Although FIG. 45 shows the example that the mobile terminal 100 is in landscape mode, the present embodiment can apply to a case that the mobile terminal 100 is in portrait mode as well.

Embodiment 11-2

According to the description with reference to FIG. 42, the mobile terminal 100 can newly run a second application by stopping a first application. In this instance, if the first application is a calendar application, a specific day, week or month can be selected by a first pointer and a second pointer. If specific day, week or month is selected by the first pointer and the second pointer, the controller 180 runs the second application and can also display a content or a content list, which is related to the selected day, week or month. This is described in detail with reference to FIG. 46 as follows.

FIG. 46 is a diagram illustrating another example of newly running a second application by stopping running a first application. For clarity of the following description, assume that a first application is a calendar application. In addition, assume that a second application is a photo application for watching a photo file. Referring to FIG. 46, if a calendar application is run, like the example shown in FIG. 46(a), a calendar of a specific month can be basically displayed.

In addition, if specific days are selected by a first pointer 4602 and a second pointer 4604 of the display unit 151, respectively, like the example shown in FIG. 46(b), the controller 180 can display the day selected by the first pointer 4602 and the day 4608 selected by the second pointer 4604 in order for a user to recognize that photos taken between the day selected by the first pointer 4602 and the day 4608 selected by the second pointer 4604 can be displayed. Moreover, in order to indicate that a photo application can be run by stopping the calendar application, the controller 180 can display information on the photo application (i.e., an icon 4610 of the photo application).

Thereafter, if the first pointer 4602 and the second pointer 4604 are spaced apart from each other in opposite directions, respectively, like the example shown in FIG. 46(c), the controller 180 runs the photo application and can also display a list of the photo files, which are taken between the day selected by the first pointer 4602 and the day 4608 selected by the second pointer 4604. For instance, since 'January 5' is selected by the first pointer 4602 and 'January 16' is selected by the second pointer 4604 in FIG. 46(a), the controller 180 can control a list of photo files, which were taken between January 5 and January 16, to be specified and displayed while running the photo application. In another instance, the controller 180 can display a list of photo files, which were taken between a week including the day selected by the first pointer 4602 and a week including the day selected by the second pointer 4604. For example, the controller 180 can display a list of photo files, which were taken between the week (i.e., a first week of January) including the day selected by the first pointer 4602 and the week (i.e., a third week of January) including the day selected by the second pointer 4604.

Although FIG. 46(b) shows one example that a list of photo files taken between a day indicated by a first pointer and a day indicated by a second pointer is displayed, like the example shown in FIG. 46(c), the controller 180 can display one of the photos, which were taken between the day indicated by the first pointer and the day indicated by the second pointer, instead of a content list. Thus, when a plurality of photo files exist, the controller 180 can control a photo file output through the display unit to be automatically changed into a next photo file with the lapse of a prescribed time.

According to the description with reference to FIG. 46, photo files are mentioned. Yet, it is a matter of course that the description with reference to FIG. 46 can exactly apply to other contents as well as to photos. Although FIG. 46 shows the example that the mobile terminal 100 is in landscape mode, the present embodiment can apply to a case that the mobile terminal 100 is in portrait mode as well.

Embodiment 12

A list of prescribed contents can be displayed through the display unit 151. In this instance, the contents may mean such data files processed by the mobile terminal 100 as videos, photos, documents, music and the like. If it is unable to display all the runnable contents through the display unit 151, the controller 180 can scroll to move the content list in response to a user's scroll input.

When the content list is scrolled to move, the controller 180 can control an animation effect to be applied thereto by gradually decreasing a width of the content list toward a prescribed direction. For instance, FIG. 47 is a diagram illustrating one example to describe an animation effect applied to a content list. Like the example shown in FIG. 47(a), if a user input (e.g., an action of dragging a pointer in a prescribed direction, etc.) is applied to scroll a content list, the controller 180 can control the content list to be scrolled to move. Thus, the controller can set a height of the content list to gradually decrease along a prescribed direction. For instance, like the example shown in FIG. 47(b), a length of one side h2 of the content list can be set greater than that of another side h1.

Figure 48A:
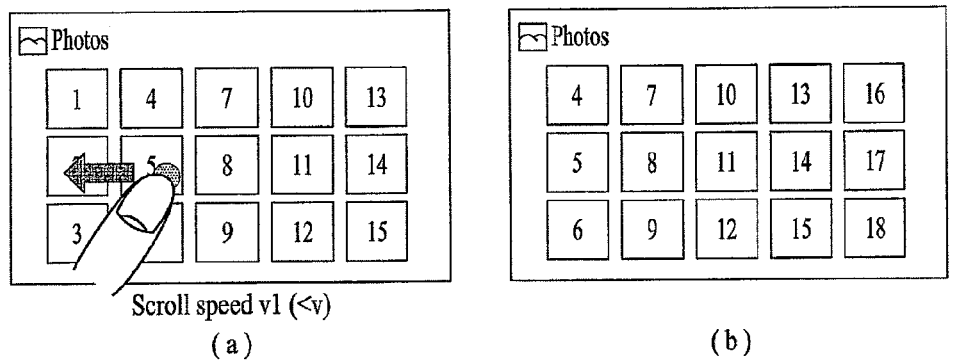
FIGS. 48A to 48C are diagrams illustrating one example of adjusting a scroll unit of a content list depending on a drag moving speed of a pointer.
Figure 48B:
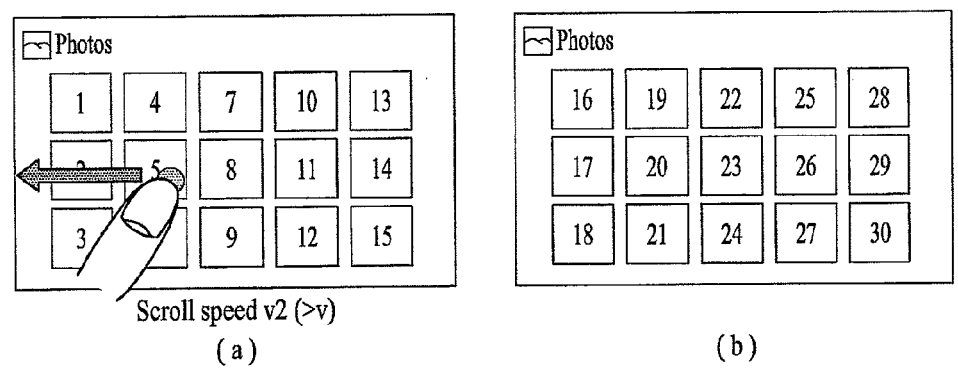
Figure 48C:
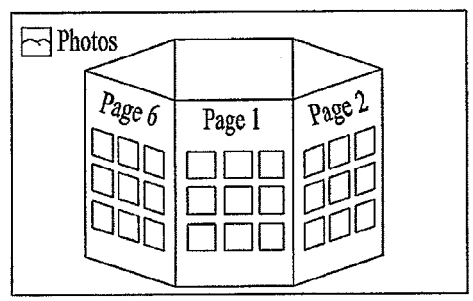

If a drag speed of a pointer for scrolling a content list is lower than a preset speed, the controller 180 can control the content list to be scrolled by column (or row) unit. Further, if a drag speed of the pointer is equal to or greater than the preset speed, the controller 180 can control the content list to be scrolled by page unit. For instance, FIGS. 48A to 48C are diagrams illustrating one example of adjusting a scroll unit of a content list depending on a drag moving speed of a pointer. FIG. 48A shows one example of a case that a drag moving speed v1 of a pointer is lower than a preset speed v. In addition, FIG. 48B shows one example of a case that a drag moving speed v1 of a pointer is equal to or higher than a preset speed v.

Referring to FIG. 48A, if a drag speed of a pointer for scrolling a content list is lower than a preset speed, the controller 180 can control the content list to be scrolled by column unit. In particular, in FIG. 48A, contents (i.e., contents #1 to #3) located in a first left column stop being displayed and new contents (i.e., contents #16 to #18) are output to a first right column. Referring to FIG. 48B, if a drag speed of a pointer for scrolling a content list is equal to or higher than a preset speed, the controller 180 can control the content list to be scrolled by page unit. In particular, in FIG. 48B, all contents (i.e., contents #1 to #15) disappear but new contents (i.e., contents #16 to #30) are output.

If a scroll speed of a pointer is equal to or greater than a preset speed, the controller 180 shows a user all selectable pages and can control a user to select one of the pages. If a prescribed page is selected from a page list, the controller 180 can display a list of contents, which are included in the selected page. Thus, a plurality of pages can be deployed as a 3-dimensional stereoscopic image. For instance, FIG. 48C is a diagram illustrating one example of deploying a plurality of pages as a 3-dimensional stereoscopic image. Referring to FIG. 48C, if a user selects a prescribed page, the controller 180 can display the selected page.

While a prescribed content is selected from a content list, if an inclination of the mobile terminal 100 is detected, the controller 180 can control at least one content, which has the same attribute of the selected content, to be arranged around the selected content. If the selected content is a photo file, a content attribute may include at least one of a photographed date, a photographed location, and information on a photographed subject. If the selected content is a music file, a content attribute may include at least one of an album, a singer, a composer and a genre. If the selected content is a video file, a content attribute may include at least one of a video taken date, a video taken location, and information on a taken subject.

Figure 49:
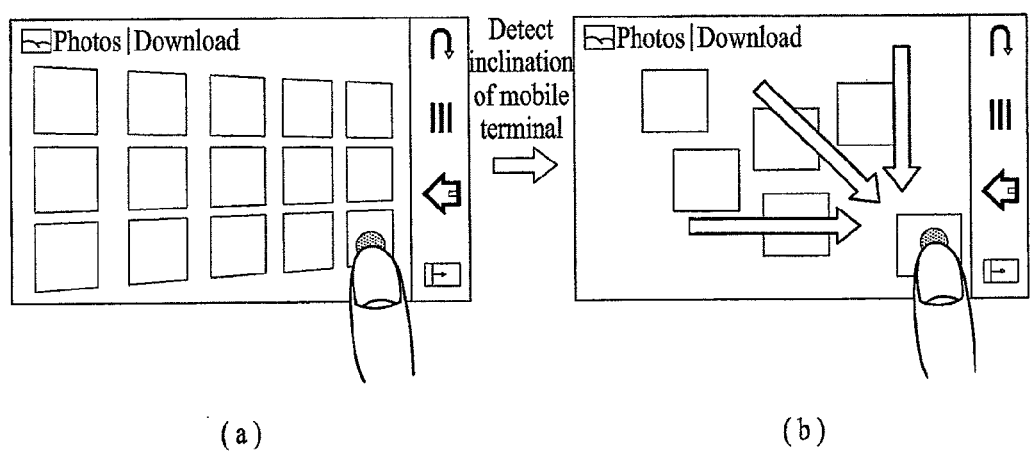
FIG. 49 is a diagram illustrating one example of if a prescribed content is selected from a content list, arranging a content having the same attribute of the selected content around the selected content.

For instance, FIG. 49 is a diagram illustrating one example of if a prescribed content is selected from a content list, arranging a content having the same attribute of the selected content around the selected content. For clarity of the following description, assume that a content list displayed through the display unit 151 is a photo file list. Like the example shown in FIG. 49(a), while a prescribed photo file in a latticed photo file list is touched, an inclination of the mobile terminal 100 can be detected. In particular, the controller 180 can determine whether the mobile terminal 100 inclines over a prescribed angle through a sensing signal of the sensing unit 180. If the mobile terminal 100 is determined as inclining over the prescribed angle, like the example shown in FIG. 49(b), the controller 180 can control photo files, which have the same attribute of the selected photo file, to be arranged around the selected photo file.

Thus, based on an inclining direction of the mobile terminal 100, the controller 180 can determine whether to rearrange photo files with reference to a prescribed attribute of the selected content. For instance, if the mobile terminal 100 inclines in a first direction, the controller 180 can control a photo file, which has the same attribute as a first attribute (e.g., a photographed date of a selected photo, etc.) of the selected photo file, to be arranged around the selected photo file. In another instance, if the mobile terminal 100 inclines in a second direction, the controller 180 can control a photo file, which has the same attribute as a second attribute (e.g., a photographed location of a selected photo, etc.) of the selected photo file, to be arranged around the selected photo file.

While a content list is displayed, a first touch region and a second touch region can be touched with a first pointer and a second pointer, respectively. Thereafter, as the first pointer and the second pointer are dragged to move in opposite directions, respectively, if a spaced distance between the first pointer and the second pointer increases, the controller 180 can control the display unit 151 to be virtually partitioned into a first virtual region and a second virtual region. if the display unit 151 is partitioned into the first virtual region and the second virtual region, the controller 180 controls a list, which targets a content set as Bookmarks (or Favorites), to be displayed through the first virtual region and can also control a list, which targets all contents, to be displayed through the second virtual region.

Figure 50:
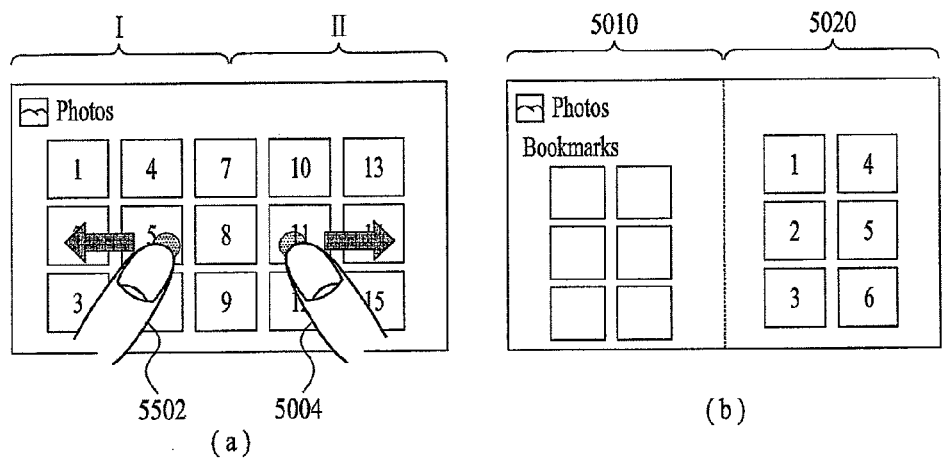
FIG. 50 is a diagram illustrating one example that a display unit is partitioned into a first virtual region and a second virtual region.

For instance, FIG. 50 is a diagram to describe one example that a display unit is partitioned into a first virtual region and a second virtual region. Referring to FIG. 50, while a content list is displayed, a first touch region I and a second touch region II can be touched with a first pointer and a second pointer, respectively. Thereafter, like the example shown in FIG. 50, as the first pointer 4402 and the second pointer 4404 move in opposite directions, respectively, if a spaced distance in-between becomes equal to or greater than a prescribed distance, like the example shown in FIG. 50(b), the controller 180 can control the display unit 151 to be partitioned into a first virtual region 4410 and a second virtual region 4420. The controller 180 controls a list, which targets a content set as Bookmarks, to be output through the first virtual region 4410 and can also control a list, which targets all contents, to be output through the second virtual region. Although FIGS. 47 to 50 show the examples that the mobile terminal 100 is in landscape mode, the present embodiment can apply to a case that the mobile terminal 100 is in portrait mode as well.

Embodiment 13

As mentioned in the foregoing description with reference to FIG. 4, the display unit 151 of the mobile terminal 100 according to an embodiment of the present invention may include a flexible display that is freely flexible. Moreover, a body of the mobile terminal can be configured to be flexible with prescribed resilience.

While a content or a content list is displayed through the display unit 151, if the mobile terminal 100 according to an embodiment of the present invention is detected as bent inward or outward, the mobile terminal 100 can control the content or the content list, which is displayed through the display unit 151, to be enlarged or reduced. In addition, the controller 180 can measure an inward or outward bent extent of the mobile terminal 100 based on a sensing signal of the sensing unit.

Figure 51A:
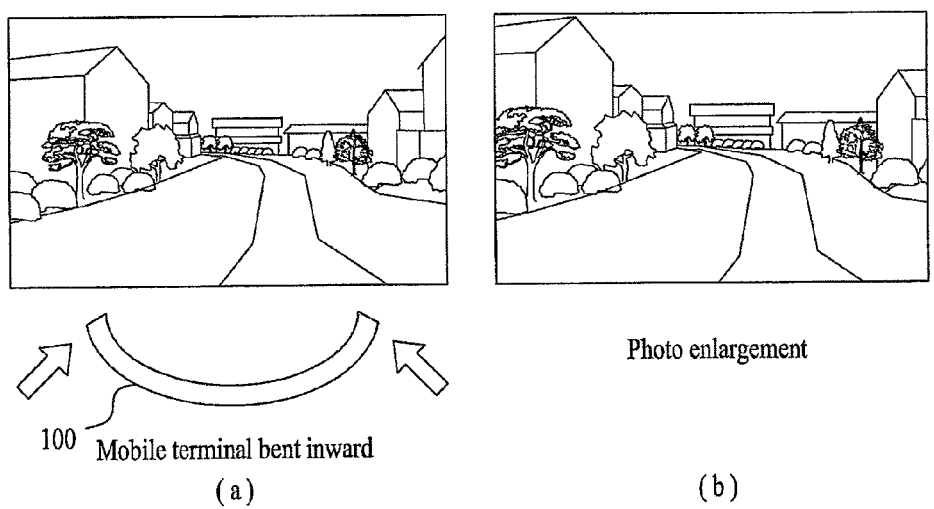
FIG. 51A and FIG. 51B are diagrams illustrating examples of an output of a display unit if a mobile terminal is bent inward or outward.
Figure 51B:
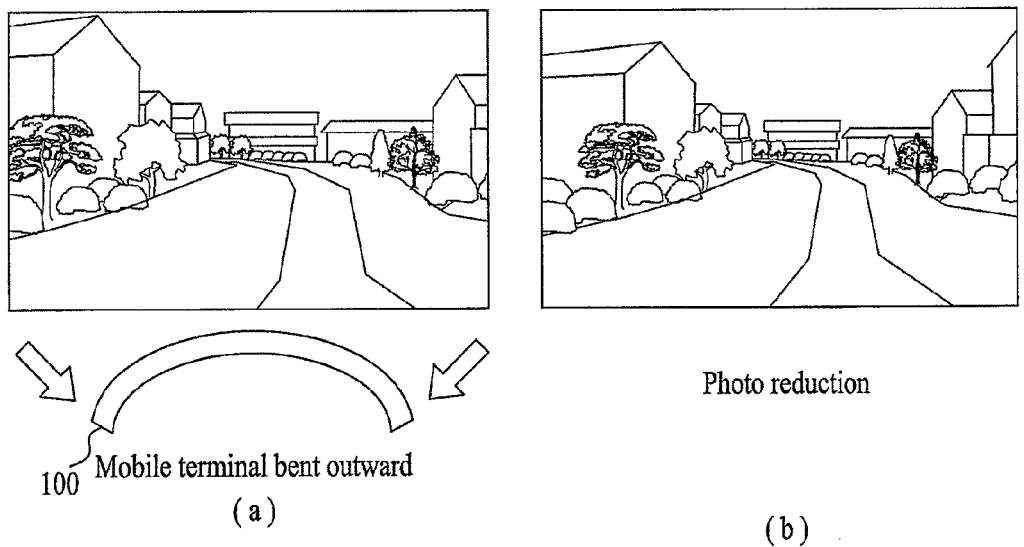

For instance, FIG. 51A and FIG. 51B are diagrams illustrating examples of an output of a display unit if a mobile terminal is bent inward or outward. In particular, FIG. 51A is a diagram illustrating one example of an operation when the mobile terminal 100 is bent inward. In addition, FIG. 51B is a diagram illustrating one example of an operation when the mobile terminal 100 is bent outward. For clarity of the following description, assume that a photo file is currently displayed through the display unit 151.

Referring to FIG. 51A, while a photo file is displayed, like the example shown in FIG. 51A (a), if the mobile terminal 100 is bent inward, like the example shown in FIG. 51A (b), the controller 180 can control the photo file to be enlarged. Thus, the controller 180 can determine an enlarged extent of the photo file in proportion to a bent extent of the mobile terminal 100. Further, referring to FIG. 51B, while a photo file is displayed, like the example shown in FIG. 51B (a), if the mobile terminal 100 is bent outward, like the example shown in FIG. 51B (b), the controller 180 can control the photo file to be reduced. Thus, the controller 180 can determine a reduced extent of the photo file in proportion to a bent extent of the mobile terminal 100.

In addition, if it is unable to further reduce the photo file, the controller 180 stops displaying the photo file and can control a list of photo files to be displayed. Although FIG. 51A and FIG. 51B show the examples that the mobile terminal 100 is in landscape mode, the present embodiment can apply to a case that the mobile terminal 100 is in portrait mode as well.

Embodiment 14

While the display unit 151 is unlocked, the controller 180 can run various applications based on a user input. Thus, if the mobile terminal 100 is bent inward (or outward), the controller 180 can control the display unit 151 to be virtually partitioned into a first virtual region 5210 and a second virtual region 5220. Thus, the controller 180 can measure an inward or outward bent extent of the mobile terminal 100 based on a sensing signal of the sensing unit. For instance, FIG. 52 is a diagram to describe one example that the mobile terminal 100 is partitioned into the first virtual region 5210 and the second virtual region 5220.

Referring to FIG. 52, if the mobile terminal 100 is bent inward (or outward) over a prescribed angle, the controller 180 can control the display unit 151 to be partitioned into the first virtual region 5210 and the second virtual region 5220. The controller 180 controls a touch input to the first virtual region 5210 to be effective within the first virtual region 5210 only and also controls a touch input to the second virtual region 5220 to be effective within the second virtual region 5220 only, thereby controlling multitasking to be performed through the first virtual region 5210 and the second virtual region 5220. Although FIG. 52 shows the example that the mobile terminal 100 is in landscape mode, the present embodiment can apply to a case that the mobile terminal 100 is in portrait mode as well.

Embodiment 15

The above-described Embodiment 13 and Embodiment 14 are simultaneously applicable to a single mobile terminal 100. Thus, in consideration of a bent extent of the mobile terminal 100, if the bent extent of the mobile terminal 100 is equal to or smaller (or greater) than a prescribed angle, as mentioned in the foregoing description of Embodiment 13, the controller 180 executes the content enlarging (or reducing) operation. Thus, if the bent extent of the mobile terminal 100 becomes equal to or greater (or smaller) than the prescribed angle, as mentioned in the foregoing description of Embodiment 14, the controller 180 can partition the display unit 151 into two virtual regions.

Accordingly, embodiments of the present invention provide various advantages. First, an embodiment of the present invention provides a mobile terminal that enhances the user's convenience. In particular, one embodiment of the present invention provides a mobile terminal and controlling method thereof, by which a display unit can be unlocked using a plurality of pointers. Moreover, one embodiment of the present invention provides a mobile terminal and controlling method thereof, by which a function activated on unlocking a display unit can be determined based on a pattern of a user input.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
   a wireless communication unit configured to provide wireless communication;
   a touchscreen configured to receive a touch input; and
   a controller configured to:
   partition the touchscreen into a first display region and a second display region, when the touchscreen is in a locked state and is touched with a first pointer and a second pointer,
   reduce sizes of the first and second display regions when the first and second pointers are dragged in opposite directions,
   unlock the touchscreen or display a password input object for unlocking the touchscreen based on whether a password for unlocking the touchscreen is set, when a moving distance of at least one of the first and second pointers is greater than a preset moving distance or a size of at least one of the first and second display regions is smaller than a preset size,
   output a video played recently when the first and second pointers move in a first direction, and
   output a photo played recently when the first and second pointers move in a second direction opposite to the first direction.

2. The mobile terminal of claim 1, further comprising:
   a fingerprint recognition sensor underlying the touchscreen, and configured to receive an input of a fingerprint from a user,
   wherein the password input object includes a fingerprint input window configured to input the fingerprint.

3. The mobile terminal of claim 2, wherein the controller is further configured to:
   when the touchscreen is touched with the first and second pointers, display a first home screen, which is to be output if the touchscreen is unlocked, or the password input object by overlaying a lock screen output by the touchscreen.

4. The mobile terminal of claim 1, further comprising:
   a camera,
   wherein the password input object includes a preview image input through the camera.

5. The mobile terminal of claim 4, wherein the controller is further configured to unlock the touchscreen when the preview image includes a face of a registered user.

6. The mobile terminal of claim 1, wherein the password input object includes at least one of a plurality of figure objects for drawing a pattern and a virtual keypad for inputting text.

7. The mobile terminal of claim 1, wherein the controller is further configured to:
display a third display region between the first and second display regions as the sizes of the first and second display regions are reduced, and
display at least one portion of a first home screen, which is to be output when the touchscreen is unlocked, on the third display region or display at least one portion of the password input object on the third display region.

8. The mobile terminal of claim 1, wherein while the mobile terminal is operating in a landscape mode and the touchscreen is unlocked, the controller is further configured to display a first home screen on the touchscreen, and
wherein while the mobile terminal is operating in a portrait mode and the touchscreen is unlocked, the controller is further configured to display a second home screen on the touchscreen.

9. The mobile terminal of claim 1, wherein the touchscreen includes a first touch region and a second touch region.

10. The mobile terminal of claim 9, wherein the controller is further configured to unlock the touchscreen and display a first home screen when initial touch positions of the first and second pointers are located within the first and second touch regions, respectively.

11. The mobile terminal of claim 10, wherein the controller is further configured to unlock the touchscreen and display an active screen of a first application if the initial touch positions of the first and second pointers are located within the first touch region.

12. The mobile terminal of claim 11, wherein the controller is further configured to unlock the touchscreen and display an active screen of a second application when the initial touch positions of the first and second pointers are located within the second touch region.

13. The mobile terminal of one of claim 12, wherein the controller is further configured to:
display a third display region between the first and second display regions as the sizes of the first and second display regions are reduced, and
display at least one of information on the first application and information on the second application on the third display region.

14. The mobile terminal of claim 1, wherein the controller is further configured to unlock the touchscreen and output a content played recently when the first and second pointers are dragged over a prescribed distance in a prescribed direction by maintaining an equal spaced distance.

15. The mobile terminal of claim 1, wherein the controller is further configured to output feedback to indicate that the touchscreen will be unlocked when a moving distance of at least one of the first and second pointers is greater than a preset moving distance or a size of at least one of the first and second display regions is smaller than a preset size.

16. A method of controlling a mobile terminal, the method comprising:
partitioning, via a controller of the mobile terminal, a touchscreen into a first display region and a second display region, when the touchscreen is in a locked state and is touched with a first pointer and a second pointer;
reducing, via the controller, sizes of the first and second display regions when the first and second pointers are dragged in opposite directions;
unlocking, via the controller, the touchscreen or displaying a password input object for unlocking the touchscreen based on whether a password for unlocking the touchscreen is set, when a moving distance of at least one of the first and second pointers is greater than a preset moving distance or a size of at least one of the first and second display regions is smaller than a preset size;
outputting a video played recently when the first and second pointers move in a first direction; and
outputting a photo played recently when the first and second pointers move in a second direction opposite to the first direction.

17. The method of claim 16, further comprising:
receiving, via a fingerprint recognition sensor underlying the touchscreen, an input of a fingerprint from a user, wherein the password input object includes a fingerprint input window configured to input the fingerprint.

18. The method of claim 16, wherein the password input object includes a preview image input through a camera of the mobile terminal.

19. The method of claim 18, further comprising:
unlocking the touchscreen when the preview image includes a face of a registered user.

\* \* \* \* \*